United States Patent
Elshafie et al.

(10) Patent No.: US 12,520,336 B2
(45) Date of Patent: Jan. 6, 2026

(54) CONFLICT RESOLUTION BETWEEN DATA TRANSMISSIONS AND NON-DATA SERVICE SIGNALS

(71) Applicant: QUALCOMM Incorporated, San Diego, CA (US)

(72) Inventors: Ahmed Elshafie, San Diego, CA (US); Marwen Zorgui, San Diego, CA (US); Hussein Metwaly Saad, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/189,111

(22) Filed: Mar. 23, 2023

(65) Prior Publication Data

US 2024/0323988 A1  Sep. 26, 2024

(51) Int. Cl.
*H04W 72/50* (2023.01)
*H04W 24/10* (2009.01)
*H04W 64/00* (2009.01)
*H04W 72/1268* (2023.01)
*H04W 72/566* (2023.01)

(52) U.S. Cl.
CPC ......... *H04W 72/535* (2023.01); *H04W 24/10* (2013.01); *H04W 64/00* (2013.01); *H04W 72/1268* (2013.01); *H04W 72/569* (2023.01)

(58) Field of Classification Search
None
See application file for complete search history.

(56) References Cited

U.S. PATENT DOCUMENTS

| | | | |
|---|---|---|---|
| 2023/0062805 A1 | 3/2023 | Baek et al. | |
| 2023/0269700 A1* | 8/2023 | Shimoda | H04W 76/28 |
| 2023/0422204 A1* | 12/2023 | Shin | H04L 5/0048 |

FOREIGN PATENT DOCUMENTS

| | | |
|---|---|---|
| EP | 4135443 A1 | 2/2023 |
| WO | 2022031889 A1 | 2/2022 |

OTHER PUBLICATIONS

International Search Report and Written Opinion—PCT/US2024/019989—ISA/EPO—Jul. 9, 2024.

\* cited by examiner

*Primary Examiner* — Hong S Cho
(74) *Attorney, Agent, or Firm* — Procopio, Cory, Hargreaves & Savitch LLP

(57) ABSTRACT

A wireless device (e.g., a user equipment (UE) or a network node) may receive a first configuration for transmitting at least one data transmission during a time period. The wireless device may receive a second configuration for transmitting a set of non-data service signals during the time period. The wireless device may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission.

30 Claims, 20 Drawing Sheets

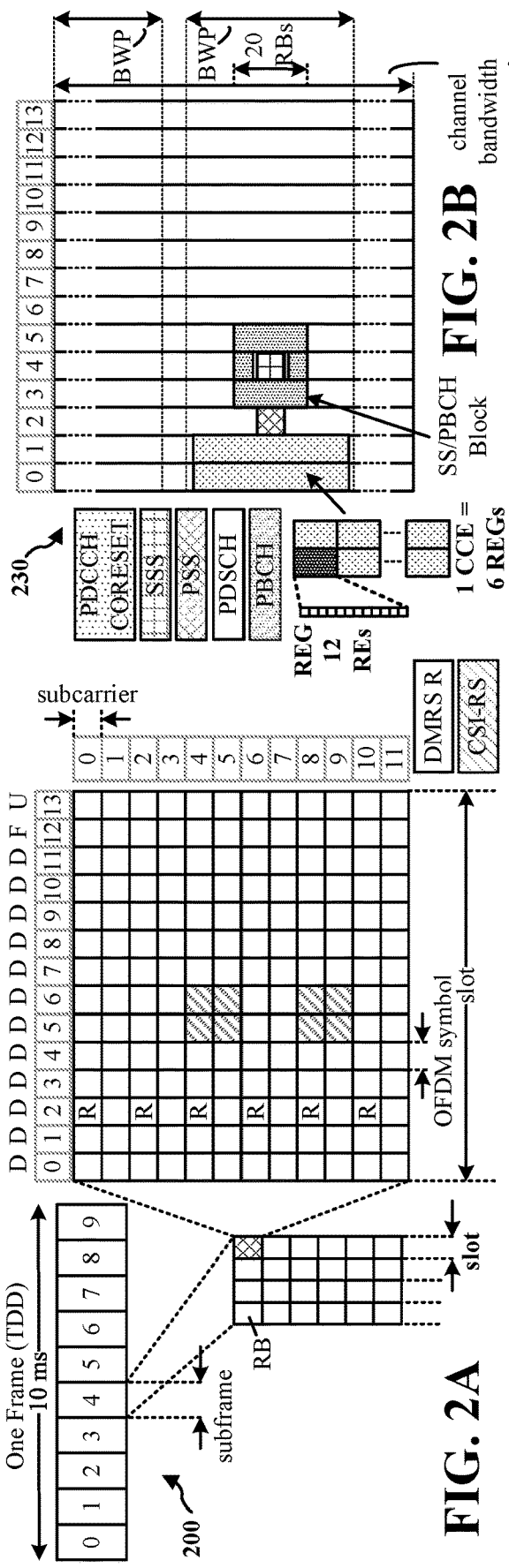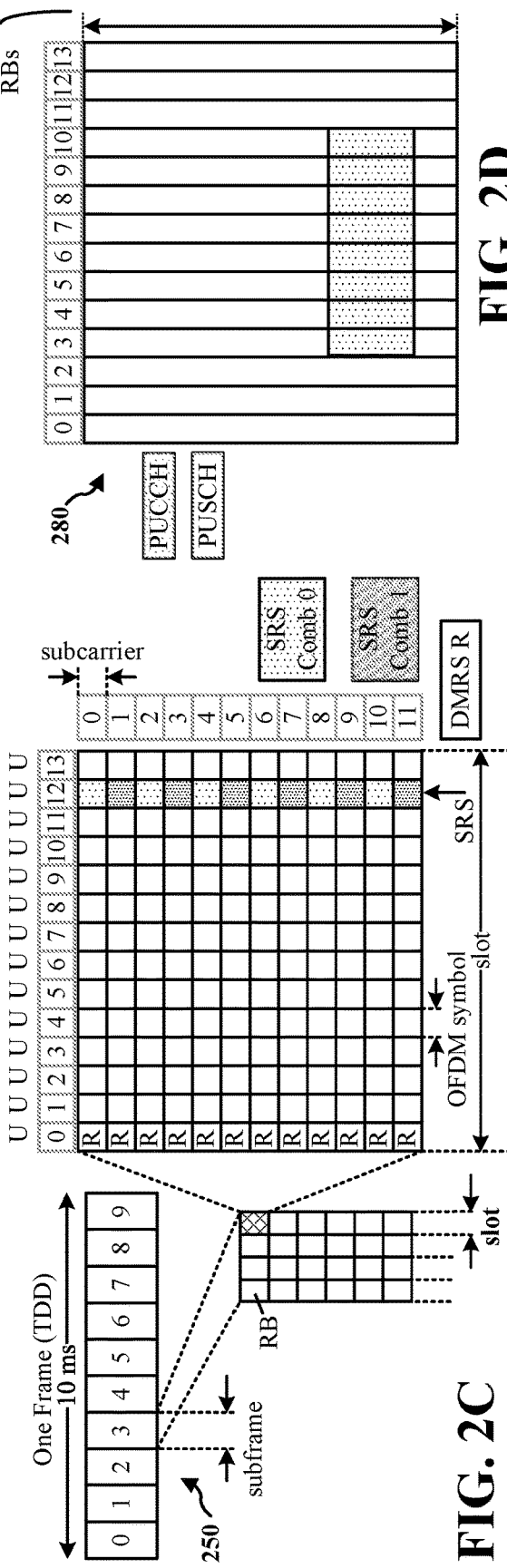

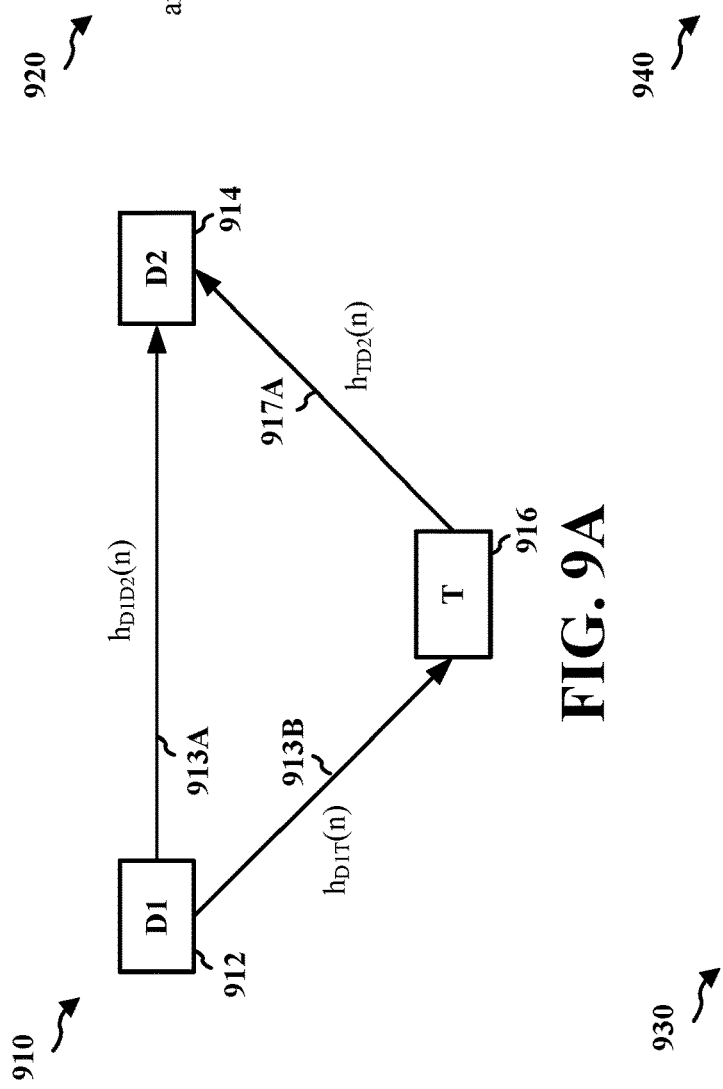
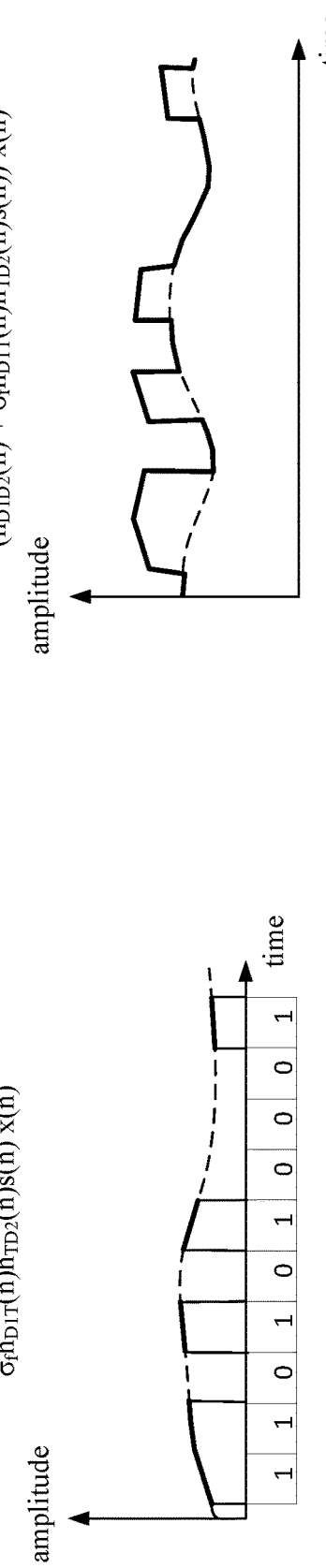
FIG. 9A
FIG. 9B
FIG. 9C
FIG. 9D

CONFLICT RESOLUTION BETWEEN DATA TRANSMISSIONS AND NON-DATA SERVICE SIGNALS

TECHNICAL FIELD

The present disclosure relates generally to communication systems, and more particularly, to a wireless system configured to transmit both data transmissions and non-data service signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The wireless device may be a user equipment (UE) or a network node. The apparatus may receive a first configuration for transmitting at least one data transmission during a time period. The apparatus may receive a second configuration for transmitting a set of non-data service signals during the same time period. The apparatus may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission.

In an aspect of the disclosure, a method, a computer-readable medium, and an apparatus are provided. The apparatus may include a wireless device. The wireless device may be a UE or a network node. The apparatus may receive a first configuration for receiving at least one data transmission during a time period. The apparatus may receive a first configuration for receiving at least one data transmission during a time period. The apparatus may receive (a) a third configuration of a schedule associated with the first configuration and the second configuration or (b) the at least one data transmission. The apparatus may decode the at least one data transmission or the set of non-data service signals based on (1) the third configuration or (2) a decoded portion of the at least one data transmission.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 9A is a diagram illustrating an example of a wireless communications system having an ambient-power communications device that may reflect or backscatter a signal from a first UE to a second UE.

FIG. 9B is a diagram illustrating an example of a radio wave transmitted by a wireless communications device.

FIG. 9C is a diagram illustrating an example of a back-scattered signal that modulates the radio wave of FIG. 9B.

FIG. 9D is a diagram illustrating an example of a superposition of the radio wave of FIG. 9B and the radio wave of FIG. 9C.

DETAILED DESCRIPTION

Figure 1:
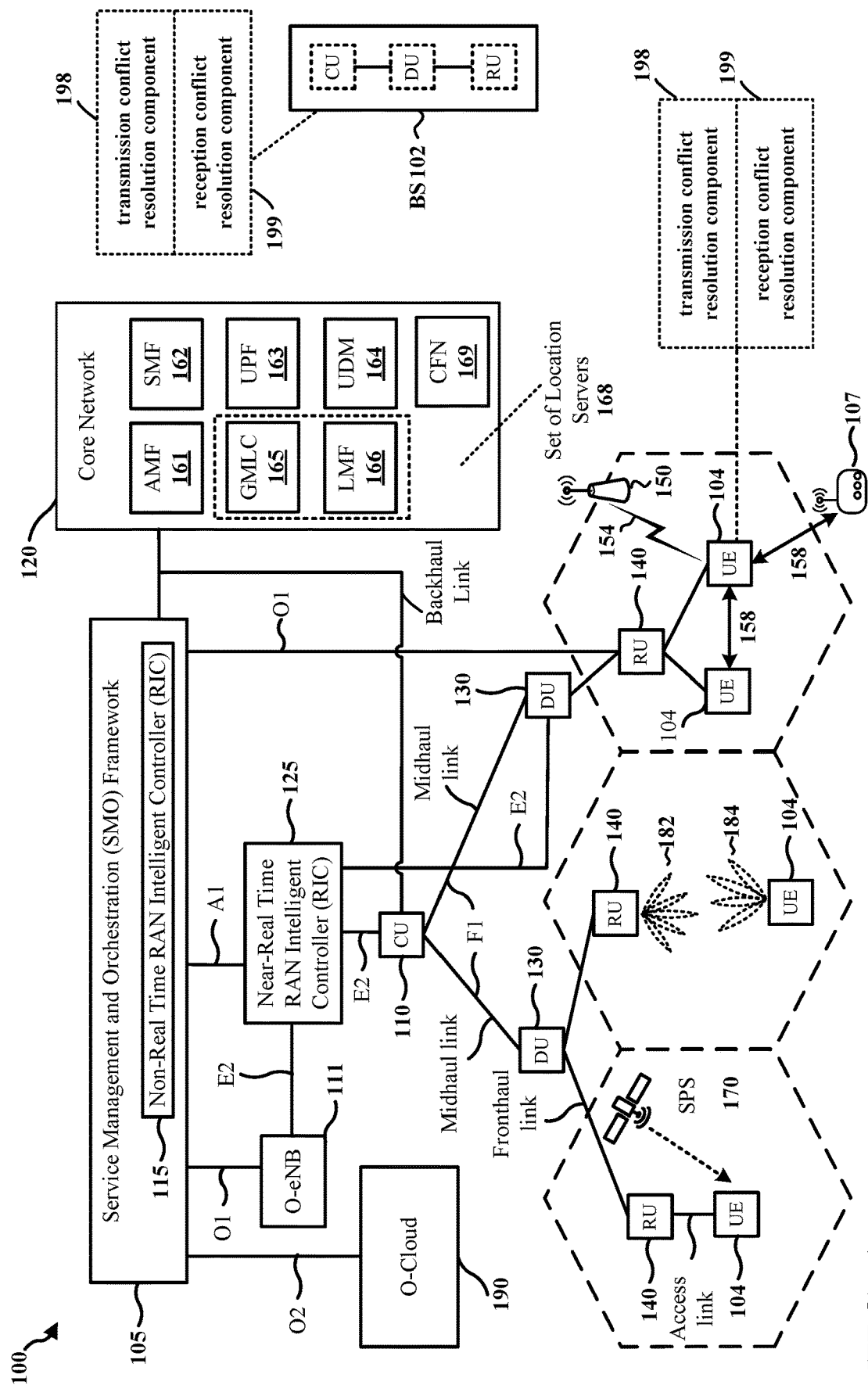
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

A wireless device (e.g., a user equipment (UE) or a network node) may be configured to transmit data transmissions to other devices, such as a physical uplink shared channel (PUSCH) message or a physical sidelink shared channel (PSSCH) message. The wireless device may also be configured to perform non-data services, such as transmitting positioning signals or sensing signals. In some aspects, a network may configure a wireless device to transmit both a data transmission and a non-data service signal during the same time period. While a network may be configured to resolve potential conflicts, less resources may be used if the wireless device was configured to resolve conflicts between data transmissions and non-data service signals scheduled by the network during the same time period. Moreover, if different network entities schedule transmissions for a wireless device, one network entity may not be aware of a transmission schedule of another network entity, such as when the network entities are controlled by different vendors, which prevents a network from being able to resolve such conflicts unless the transmission schedules are shared between network vendors.

Various aspects relate generally to systems that resolve conflicts between wireless transmissions from a wireless device. Some aspects more specifically relate to systems that resolve conflicts between data transmissions (e.g., PUSCH transmissions) and non-data service signals (e.g., positioning signals). Some aspects more specifically relate to prioritization between sidelink data signals and sensing and/or positioning signals. In some examples, a wireless device scheduled to transmit both data transmissions and non-data service signals during the same time period may be configured to resolve conflicts between such scheduled transmissions during the time period based on the importance (i.e., priority) of the data transmissions and/or the non-data service signals. In some aspects, a wireless device may be able to transmit both a data transmission and a non-data service signal during a same time period if there is enough time to space the data transmission from the non-data service signal by a minimum threshold gap. Such a wireless device may receive a first configuration for transmitting at least one data transmission during a time period. The wireless device may receive a second configuration for transmitting a set of non-data service signals during the same time period. The wireless device may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission.

In some examples, a wireless device scheduled to receive both data transmissions and non-data service signals may be configured to dynamically receive an updated schedule from a second wireless device transmitting both the data transmissions and non-data service signals during the same time period. In other aspects, the wireless device scheduled to receive both data transmissions and non-data service signals may be configured to decode a portion of an incoming data transmission to determine a priority of the data transmission as compared to the incoming non-data service signal. The wireless device may receive (a) a third configuration of a schedule associated with the first configuration and the second configuration or (b) the at least one data transmission. The wireless device may decode the at least one data transmission or the set of non-data service signals based on (1) the third configuration or (2) a decoded portion of the at least one data transmission.

In one aspect, when a wireless device is configured to perform a non-data service and transmit a data transmission (e.g., transmit a PSSCH CG) during the same time period, the wireless device may choose to perform the non-data services over transmitting the data transmission, the wireless device may choose to transmit the data transmission over performing the non-data service, or the wireless device may choose to do both if timing permits. In one aspect, to help a wireless device prioritize conflicts between different tasks, priority/QoS levels may be assigned to the tasks, or may be derived based on attributes of at least one or more of the tasks. In one aspect, a dynamic grant for a wireless device may be used to cancel a non-data service occasion to schedule a data transmission. In one aspect, a transmitting wireless device may indicate to other wireless devices (e.g., UEs, network nodes) that it is not able to transmit during a non-data service occasion, receive a transmission during a non-data service occasion, or perform sidelink channel sensing during a non-data service occasion. In one aspect, a transmitting wireless device may indicate to a receiving wireless device, the configuration of configure grants that the transmitting wireless device is planning to use with the receiving wireless device.

Particular aspects of the subject matter described in this disclosure can be implemented to realize one or more of the following potential advantages. In some examples, by configuring a wireless device that receives a schedule to transmit a data transmission and a non-data service signal during the same time period, the described techniques can be used to dynamically resolve conflicts between the data transmission and the non-data service signal.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUS 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the example slot structure of FIG. 4 may provide examples for sidelink communication in connection with 5G NR, the concepts described herein may be applicable to other similar areas, such as LTE, LTE-A, CDMA, GSM, and other wireless technologies.

In some aspects, a UE 104 may be configured to perform a federated learning (FL) task for a computing force network (CFN) server 169. For example, the UE 104 may be configured to transmit a FL message to another wireless device, to receive a FL message from another wireless device, or process information associated with a FL task. While the UE 104 performs the FL task, the UE 104 may be unable to transmit a data transmission, such as a PSSCH message, a PUSCH message, a configured grant (CG), or a dynamic grant (DG). The CFN server 169 may jointly schedule a plurality of CFN service requests to optimal service endpoints along a network path and guarantee the quality of service (QOS) for end users of the CFN service. In one aspect, the CFN server 169 may enable dynamic computing resource sharing among a plurality of UEs by dynamically scheduling resources between UEs to complete a set of FL tasks. In another example, the CFN server 169 may receive a request to schedule a number of resources within a maximum latency threshold to a plurality of UEs. In response, the CFN server 169 may distribute a set of FL tasks to a plurality of UEs, ensuring that the sum total of the UEs provide the number of resources requested, and jointly perform the CFN service within the maximum latency threshold. The CFN server may achieve computing and network convergence based on the perception, control, and management over computing resources at a plurality of UEs via wireless network connections with network nodes. In other words, the CFN server may leverage compute power of other devices to perform a computation.

Referring again to FIG. 1, in certain aspects, the UE 104 and/or the base station 102 may have a transmission conflict resolution component 198 that may be configured to receive a first configuration for transmitting at least one data transmission during a time period. The transmission conflict resolution component 198 may be configured to receive a second configuration for transmitting a set of non-data service signals during the time period. The transmission conflict resolution component 198 may be configured to transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. In certain aspects, the UE 104 and/or the base station 102 may have a reception conflict resolution component 199 that may be configured to receive a first configuration for receiving at least one data transmission during a time period. The reception conflict resolution component 199 may be configured to receive a second configuration for receiving a set of non-data service signals during the time period. The reception conflict resolution component 199 may be configured to receive (a) a third configuration of a schedule associated with the first configuration and the second configuration or (b) the at least one data transmission. The reception conflict resolution component 199 may be configured to decode the at least one data transmission or the set of non-data service signals based on (1) the third configuration or (2) a decoded portion of the at least one data transmission. The transmission conflict resolution component 198 and/or the reception conflict resolution component 199 may be configured to handle potential conflicts between data transmissions and non-data service signals during the same time period.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

In some aspects, a network node may schedule UL transmissions from a UE or DL transmissions to a UE without using DCI by scheduling transmissions using an RRC configuration. For example, a network node may schedule UL configured grant (CG) transmissions and may schedule DL semi-persistent scheduling (SPS) transmissions via an RRC configuration. A network node may schedule a type 1 CG by transmitting an RRC to the UE that schedules the UE to transmit a PUSCH without first receiving a lower layer trigger (e.g., a DCI trigger) from the network node. Such a PUSCH may also be referred to as a type 1 CG. A network node may schedule a type 2 CG by transmitting an RRC to the UE that schedules the UE to transmit a PUSCH in response to receiving a simple DCI without a PUSCH schedule (e.g., a configured scheduling (CS) radio network temporary identifier (CS-RNTI)). In response to receiving, for example, a DCI with a CS-RNTI, the UE may transmit the PUSCH as scheduled by the RRC. Such a PUSCH may also be referred to as a type 2 CG.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
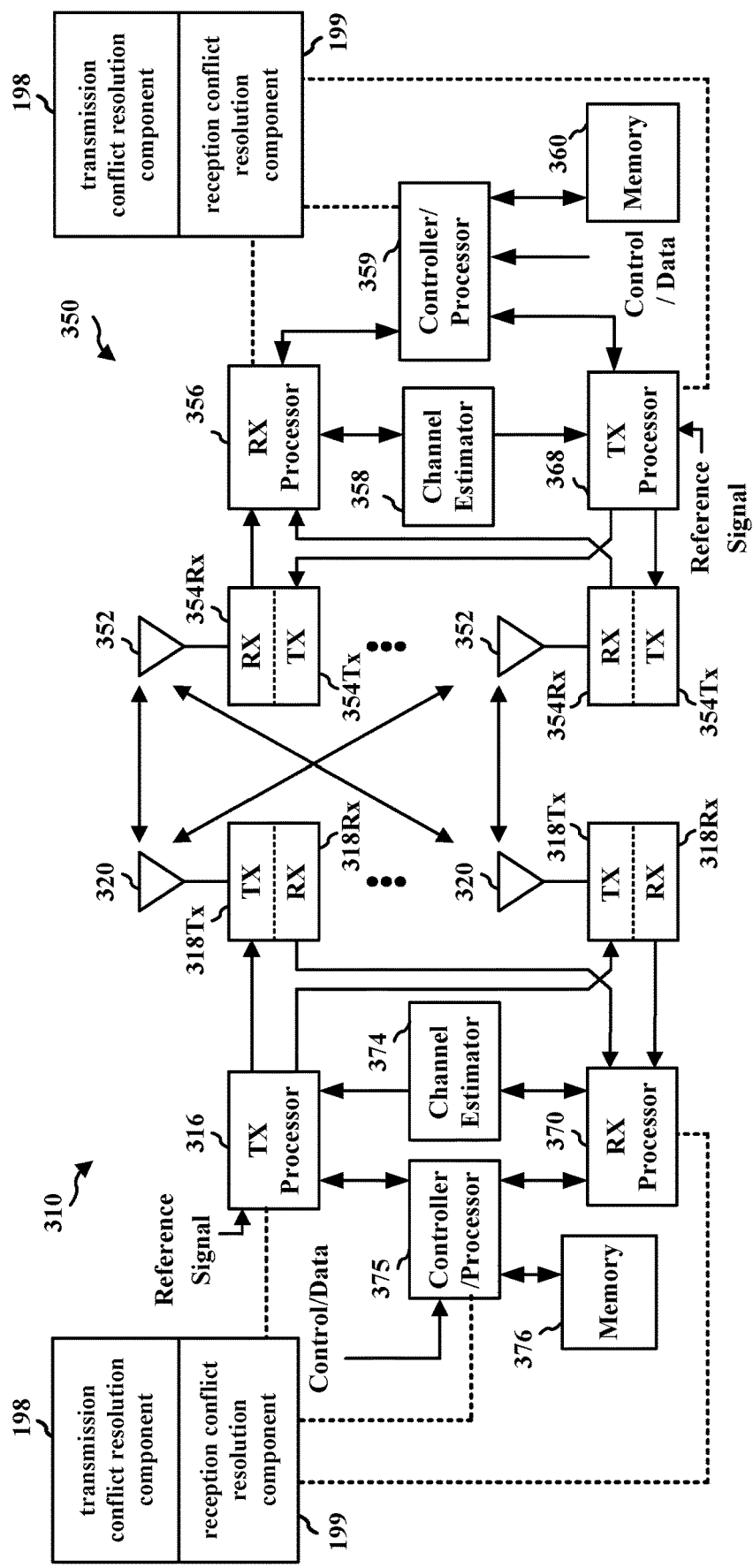
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the transmission conflict resolution component 198 of FIG. 1.

At least one of the TX processor 368, the RX processor 356, and the controller/processor 359 may be configured to perform aspects in connection with the reception conflict resolution component 199 of FIG. 1.

At least one of the TX processor 316, the RX processor 370, and the controller/processor 375 may be configured to perform aspects in connection with the transmission conflict resolution component 198 of FIG. 1.

At least one of the TX processor 316, the RX processor 370, and the controller/processor 375 may be configured to perform aspects in connection with the reception conflict resolution component 199 of FIG. 1.

Figure 4:
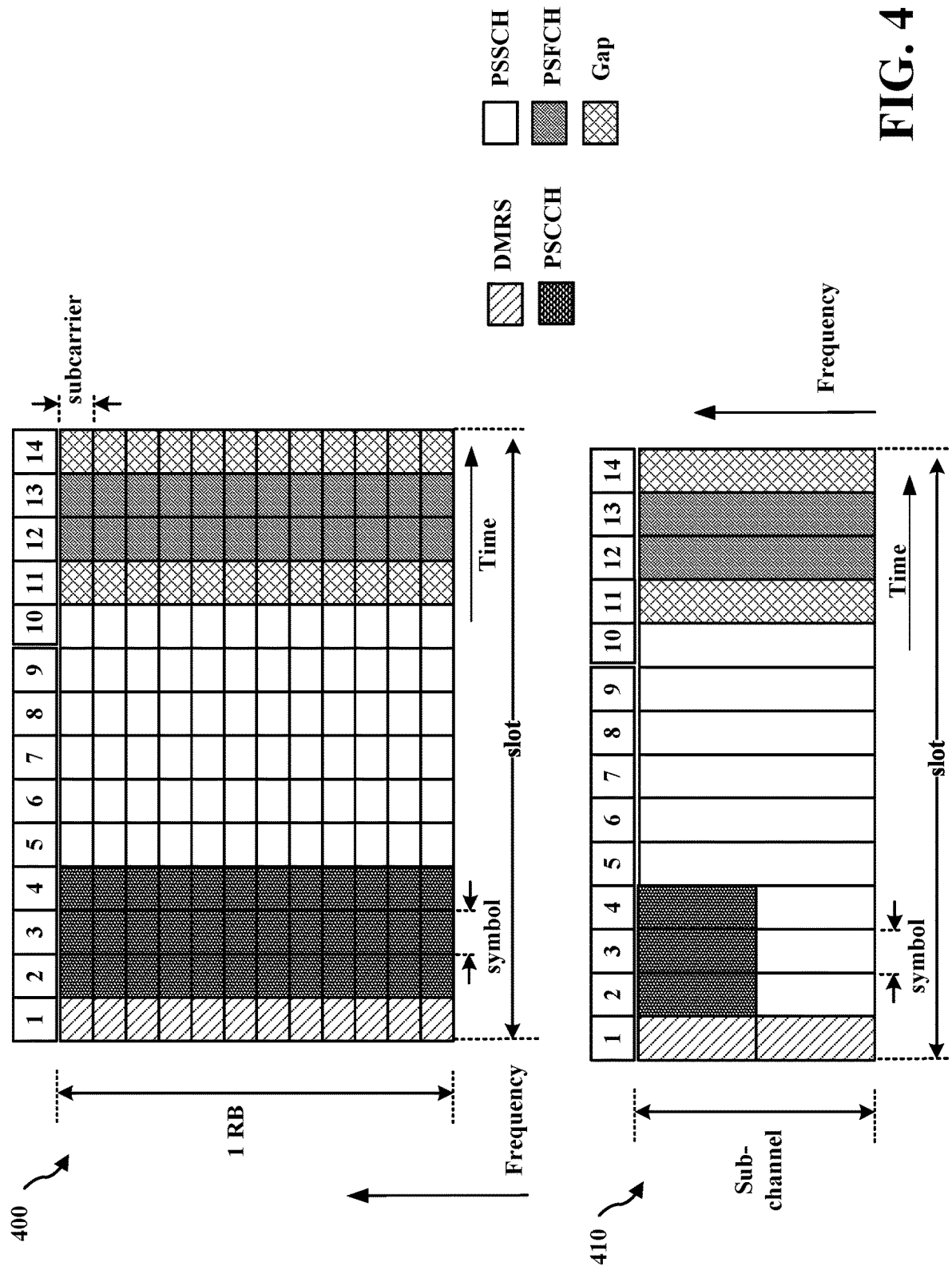
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). In a 5G network, a sidelink interface may be referred to as a 5G direct communication (PC5) interface. The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5:
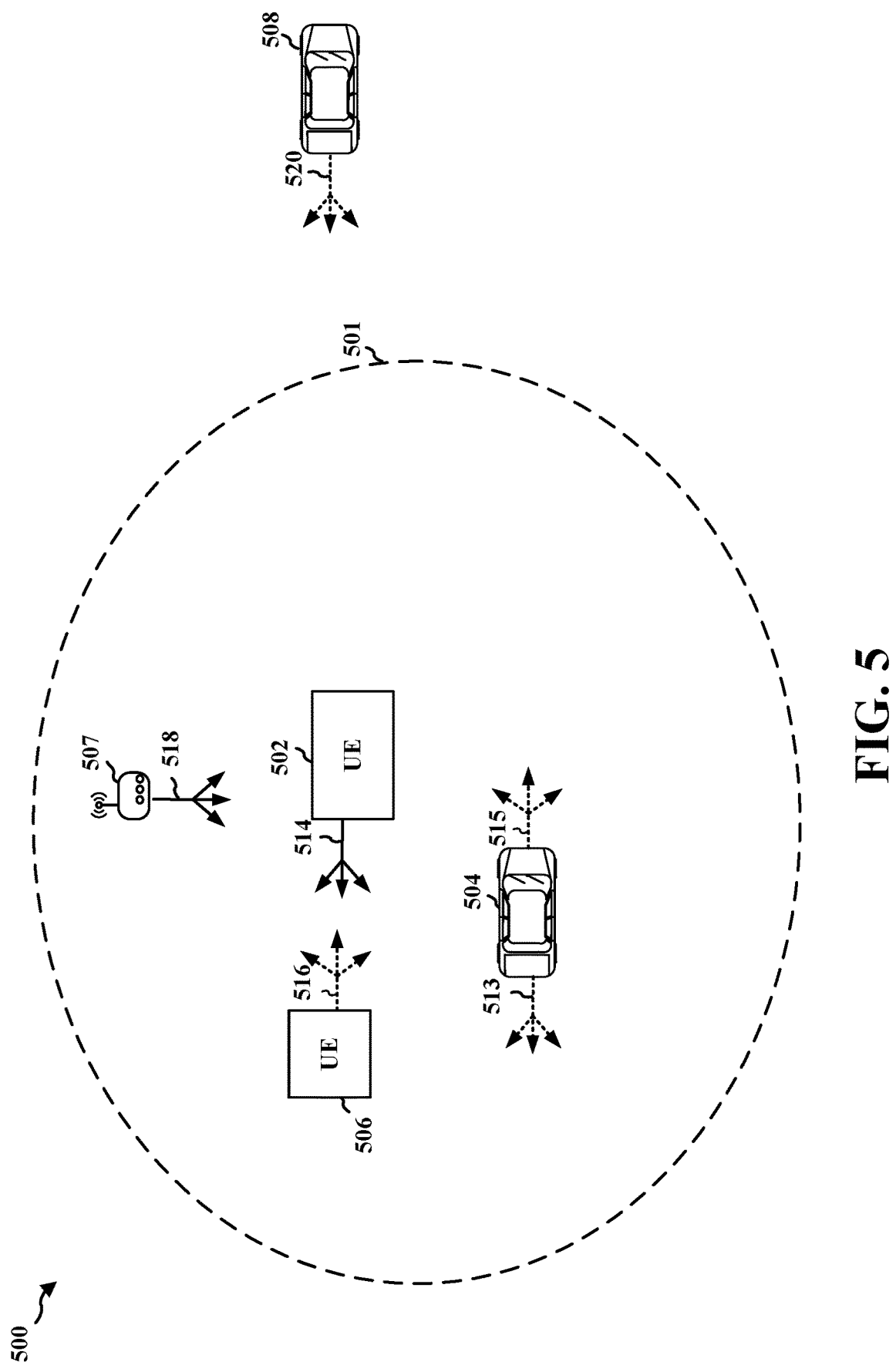
FIG. 5 illustrates example aspects of sidelink communication between devices, in accordance with aspects presented herein.

FIG. 5 illustrates an example 500 of sidelink communication between devices. The communication may be based on a slot structure including aspects described in connection with FIG. 4. For example, the UE 502 may transmit a sidelink transmission 514, e.g., including a control channel (e.g., PSCCH) and/or a corresponding data channel (e.g., PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting sidelink transmissions 513, 515, 516, 520. The sidelink transmissions 513, 514, 515, 516, 520 may be unicast, broadcast or multicast to nearby devices. For example, UE 504 may transmit sidelink transmissions 513, 515 intended for receipt by other UEs within a range 501 of UE 504, and UE 506 may transmit sidelink transmission 516. Additionally, or alternatively, RSU 507 may receive communication from and/or transmit communication 518 to UEs 502, 504, 506, 508. One or more of the UEs 502, 504, 506, 508 or the RSU 507 may include a transmission conflict resolution component 198 and/or a reception conflict resolution component 199 as described in connection with FIG. 1. Such components may enable dynamic prioritization between data transmissions and non-data service signals scheduled to be transmitted by a UE, for example sidelink data signals and sensing or positioning service signals. Sidelink communication may be based on different types or modes of resource allocation mechanisms. In a first resource allocation (RA) mode (which may be referred to herein as "Mode 1" or "mode 1 RA"), centralized resource allocation may be provided by a network entity (e.g., a serving cell for a set of UEs) or a sidelink controlling unit (e.g., a programmable logic controller (PLC) that controls a set of UEs). For example, a base station 102 may determine resources for sidelink communication and may allocate resources to different UEs 104 to use for sidelink transmissions. In this first mode, a UE receives the allocation of sidelink resources from the base station 102. In mode 1 RA, a network node may schedule dynamic grants (DGs) or configured grants (CGs) for the UE to transmit a PSSCH message. The network node may schedule a type 1 CG and/or a type 2 CG (the UE transmits the PSSCH message in response to receiving a DCI).

In a second resource allocation mode (which may be referred to herein as "Mode 2" or "mode 2 RA"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 6:
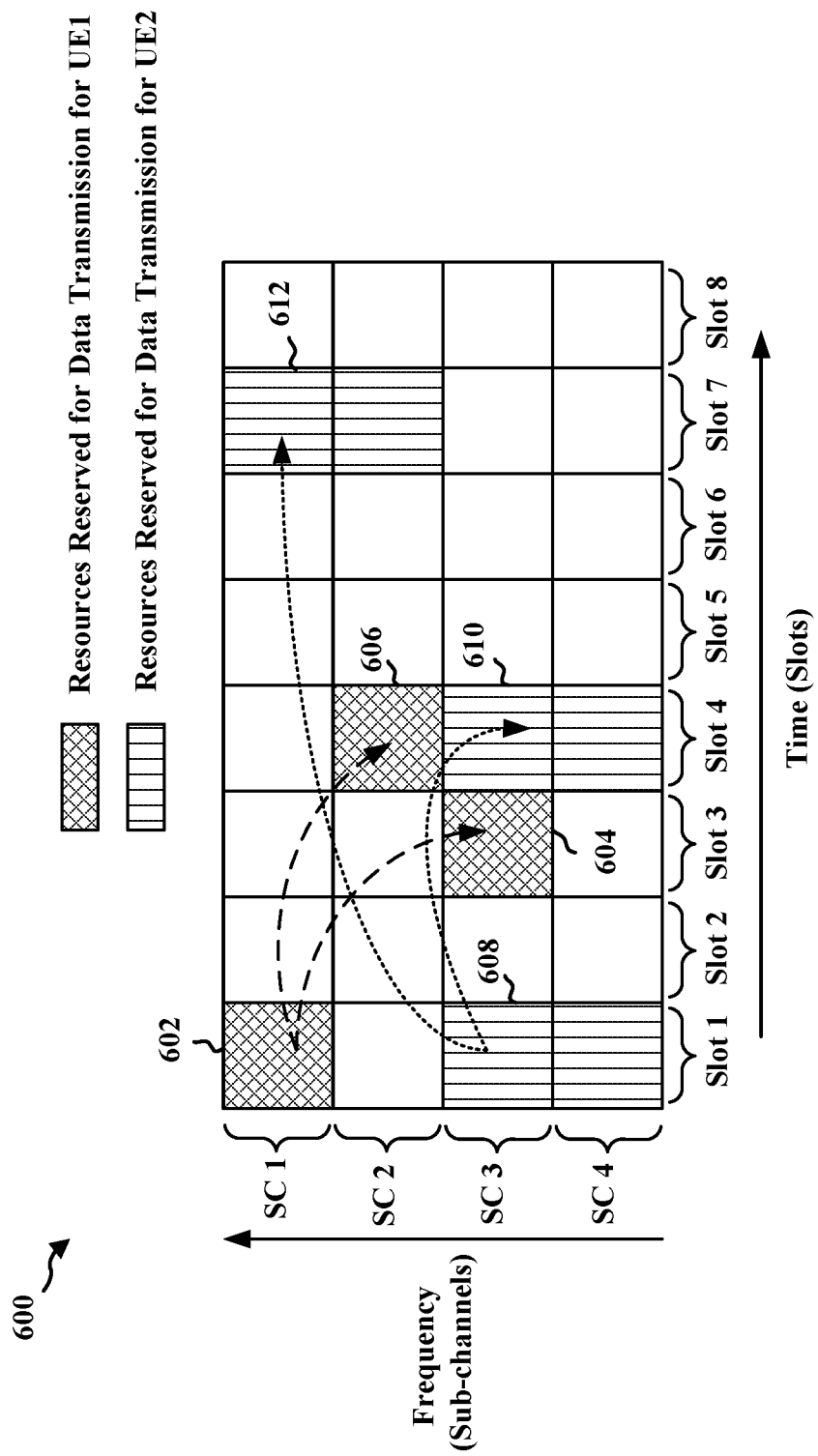
FIG. 6 illustrates examples of resource reservation for sidelink communication.

FIG. 6 is an example 600 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 600, which provides 32 available resource blocks in total. This window may also be referred to as a resource selection window.

A first UE ("UE1") may reserve a sub-channel (e.g., SC 1) in a current slot (e.g., slot 1) for its initial data transmission 602, and may reserve additional future slots within the window for data retransmissions (e.g., 604 and 606). For example, UE1 may reserve sub-channels SC 3 at slots 3 and SC 2 at slot 4 for future retransmissions. UE1 then transmits information regarding which resources are being used and/or reserved by it to other UE(s). UE1 may do by including the reservation information in the reservation resource field of the SCI, e.g., a first stage SCI.

FIG. 6 illustrates that a second UE ("UE2") reserves resources in sub-channels SC 3 and SC 4 at time slot 1 for the data transmission 608, and the data transmission 610 at time slot 4 using sub-channels SC 3 and SC 4, and the data transmission 612 at time slot 7 using sub-channels SC 1 and SC 2 as shown by FIG. 6. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 6 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 6, the UE may transmit SCI reserving resources for data transmissions 608, 610, and 612.

There may be a timeline for a sensing-based resource selection. For example, the UE may sense and decode the SCI received from other UEs during a sensing window. e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 7:
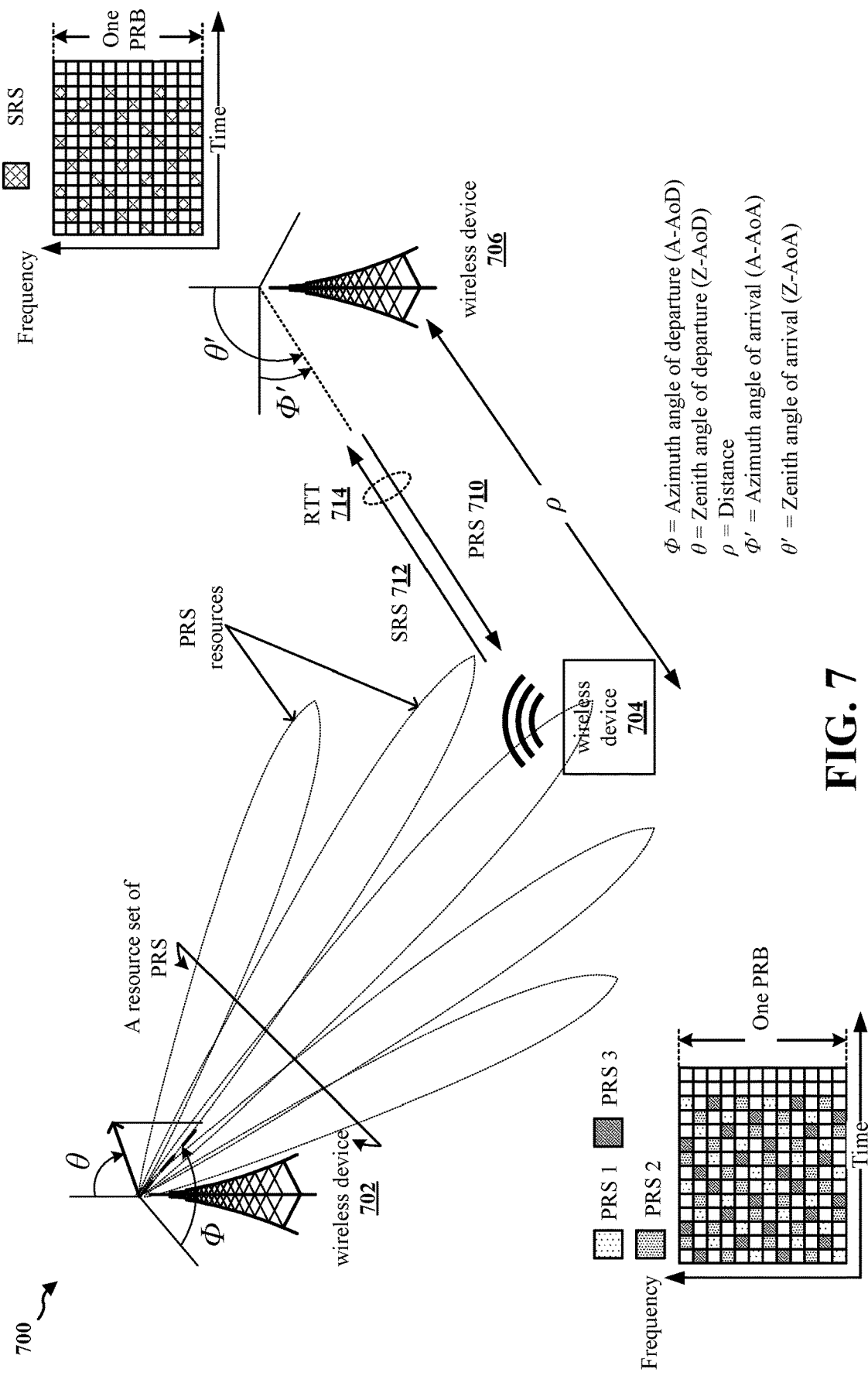
FIG. 7 is a diagram illustrating an example of positioning based on positioning signal measurements.

FIG. 7 is a diagram 700 illustrating an example of positioning based on measurements of positioning signals/reference signals. The wireless device 702 may be a UE, a base station, or a positioning reference unit (PRU). The wireless device 704 may be a UE, a base station, or a PRU. The wireless device 706 may be a UE, a base station, or a PRU. The wireless device 702 may be referred to as a positioning target wireless device, whose location may be calculated based on measurements of one or more reference signals. The wireless device 704 and the wireless device 706 may be referred to as positioning neighbor wireless devices, whose locations may be known, which may be used to calculate the location of the wireless device 702. The wireless device 704 may transmit SRS 712 at time $T_{SRS\_TX}$ to the wireless device 706. The wireless device 704 may receive positioning reference signals (PRS) 710 at time $T_{PRS\_RX}$ from the wireless device 706. The SRS 712 may be an UL-SRS. The PRS 710 may be a DL-PRS. In some aspects, the wireless device 702 may be a TRP and the wireless device 706 may be a TRP, which may be both configured to transmit DL-PRS to the wireless device 704. The wireless device 704 may be a UE configured to transmit UL-SRS to the wireless device 702 and the wireless device 706.

The wireless device 706 may receive the SRS 712 at time $T_{SRS\_RX}$ from the wireless device 704 and transmit the PRS 710 at time $T_{PRS\_TX}$ to the wireless device 704. The wireless device 704 may receive the PRS 710 before transmitting the SRS 712. The wireless device 704 may transmit the SRS 712 before receiving the PRS 710. The wireless device 704 may transmit the SRS 712 in response to receiving the PRS 710. The wireless device 706 may transmit the PRS 710 in response to receiving the SRS 712. A positioning server (e.g., location server(s) 168), the wireless device 704, or the wireless device 706 may determine the round-trip-time (RTT) 714 based on $||T_{SRS\_RX}-T_{PRS\_TX}|-|T_{SRS\_TX}-T_{PRS\_RX}||$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 702 and the wireless device 706, which are measured by the wireless device 704, and the measured Rx-Tx time difference measurements (i.e., $|T_{SRS\_RX}-T_{PRS\_TX}|$) and SRS-RSRP at multiple wireless devices, such as at the wireless device 702 and at the wireless device 706 of SRS transmitted from wireless device 704. The wireless device 704 may measure the Rx-Tx time difference measurements, and/or PRS-RSRP of the received signals, using assistance data received from the positioning server, the wireless device 702, and/or the wireless device 706. The wireless device 702 and the wireless device 706 may measure the Rx-Tx time difference measurements, and/or SRS-RSRP of the received signals, using assistance data received from the positioning server. The measurements may be used at the positioning server or the wireless device 704 to determine the RTT, which may be used to estimate the location of the wireless device 704. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 702 and the wireless device 706, and received at the wireless device 704. The AoD positioning may also be referred to as DL-AoD positioning where the PRS are DL signals. The wireless device 704 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 704 in relation to the neighboring wireless devices that transmitted the PRS, such as the wireless device 702 and the wireless device 706.

DL-TDOA positioning may make use of the DL reference signal time difference (RSTD), and/or PRS-RSRP of signals received from multiple wireless devices, such as the wireless device 702 and the wireless device 706, at the wireless device 704. The wireless device 704 may measure the RSTD, and/or the PRS-RSRP, of the received PRS signals using assistance data received from the positioning server, and the resulting measurements may be used along with other configuration information to locate the wireless device 704 in relation to the neighboring wireless devices that transmitted the PRS, such as the wireless device 702 and the wireless device 706.

UL-TDOA positioning may make use of the UL relative time of arrival (RTOA), and/or SRS-RSRP, at multiple wireless devices, such as the wireless device 702 and the wireless device 706, of signals transmitted from the wireless device 704. The wireless devices, such as the wireless device 702 and the wireless device 706, may measure the RTOA, and/or the SRS-RSRP, of the received signals using assistance data received from the positioning server, and the resulting measurements may be used along with other configuration information to estimate the location of the wireless device 704.

UL-AoA positioning may make use of the measured azimuth angle of arrival (A-AoA) and zenith angle of arrival (Z-AoA) at multiple wireless devices, such as the wireless device 702 and the wireless device 706, of signals transmitted from the wireless device 704. The wireless device 702 and the wireless device 706 may measure the A-AoA and the Z-AoA of the received signals using assistance data received from the positioning server, and the resulting measurements may be used along with other configuration information to estimate the location of the wireless device 704.

Additional positioning methods may be used for estimating the location of the wireless device 704, such as for example, UL-AoD and/or DL-AoA at the wireless device 704. Note that data/measurements from various technologies may be combined in various ways to increase accuracy, to determine and/or to enhance certainty, to supplement/complement measurements, and/or to substitute/provide for missing information.

Figure 8:
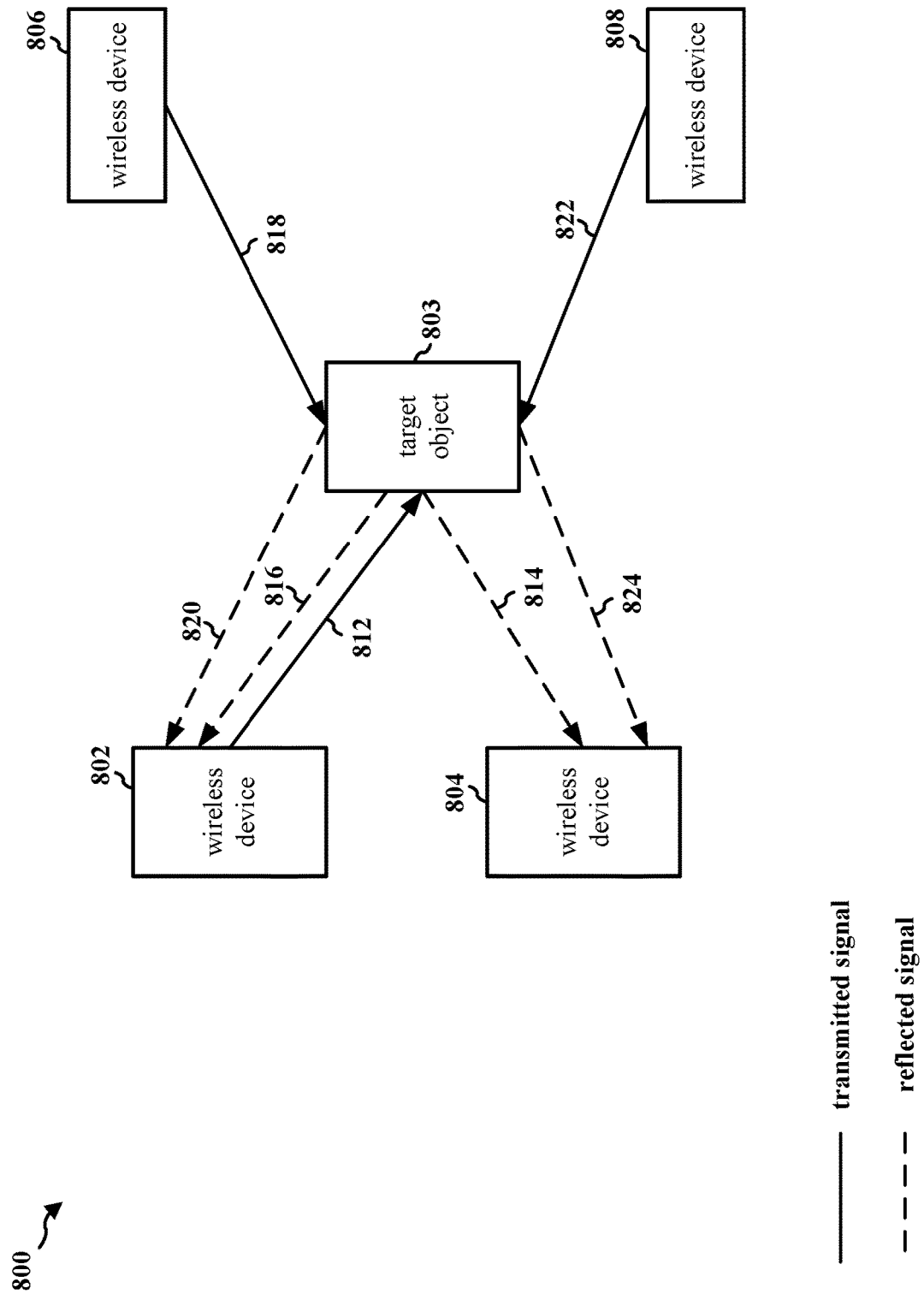
FIG. 8 is a diagram illustrating an example of sensing based on radio frequency (RF) signal measurements.

FIG. 8 is a diagram 800 illustrating an example of sensing based on measuring sensing signals transmitted by one or more sensing signals that reflect off of a target object 803. A wireless device that transmits a sensing signal that reflects off of a target object may be referred to as a transmitter node. A wireless device that receives a reflected sensing signal and measures the reflected sensing signal to perform sensing may be referred to as a receiver node. In one aspect, the wireless device 802 may perform monostatic sensing. The wireless device 802 may act as both a transmitter node and a receiver node. The wireless device 802 may transmit a set of sensing signals 812 at the target object 803, the target object 803 may reflect the set of sensing signals 812 as the reflected set of sensing signals 816 at the wireless device 802, and the wireless device 802 may measure the reflected set of sensing signals 816 from the target object 803. In another aspect, the wireless device 802 and the wireless device 804 may perform bistatic sensing. The wireless device 802 may act as a transmitter node and the wireless device 804 acts as a receiver node. The wireless device 802 may transmit a set of sensing signals 812 at the target object 803, the target object 803 may reflect the set of sensing signals 812 as the reflected set of sensing signals 814 at the wireless device 804, and the wireless device 804 may measure the reflected set of sensing signals 814 from the target object 803. In another aspect the wireless device 802 and the wireless device 806 may perform multi-static sensing. The wireless device 802 may act as both a transmitter node and a receiver node, for a first set of sensing signals, and the wireless device 806 acts as a transmitter node while the wireless device 802 acts as a receiver node for a second set of sensing signals. In addition to the wireless device 802 measuring the reflected set of sensing signals 816 from the target object 803 using monostatic sensing, the wireless device 806 may transmit a set of sensing signals 818 at the target object 803, the target object 803 may reflect the set of sensing signals 818 as the reflected set of sensing signals 820 at the wireless device 802, and the wireless device 802 may measure the reflected set of sensing signals 820 from the target object 803. In another aspect the wireless device 802, the wireless device 804, and the wireless device 808 may perform multi-static sensing. The wireless device 802 may act as a transmitter node and the wireless device 804 acts as a receiver node for a first set of sensing signals, and the wireless device 808 acts as a transmitter node and the wireless device 804 acts as a receiver node for a second set of sensing signals. In addition to the wireless device 804 measuring the reflected set of sensing signals 814 from the target object 803 using bistatic sensing, the wireless device 808 may transmit a set of sensing signals 822 at the target object 803, the target object 803 may reflect the set of sensing signals 822 as the reflected set of sensing signals 824 at the wireless device 804, and the wireless device 804 may measure the reflected set of sensing signals 824 from the target object 803. Each wireless device may be any wireless device configured to transmit or receive wireless signals, such as UEs, network nodes, TRPs, or base stations. For example, the wireless device 802 may be a network node configured to transmit the set of sensing signals 812 at the target object 803 and measure the reflected set of sensing signals 816 from the target object 803. In another example, the wireless device 802 may be a network node configured to transmit the set of sensing signals 812 at the target object 803, and the wireless device 804 may be a UE configured to measure the reflected set of sensing signals 814 from the target object 803.

The wireless device 802 may conduct one or more sensing measurements on the reflected set of sensing signals 816 and/or the reflected set of sensing signals 820. In one aspect, the wireless device 802 may calculate a distance or a range between the wireless device 802 and the target object 803 based on a round trip time (RTT) between when the wireless device 802 transmits the set of sensing signals 812 and when the wireless device 802 receives the reflected set of sensing signals 816. In one aspect, the wireless device 802 may calculate a distance or a range that the set of sensing signals 818 and the reflected set of sensing signals 820 travels based on a time between when the wireless device 806 transmits the set of sensing signals 818 and when the wireless device 802 receives the reflected set of sensing signals 820. In one aspect, the wireless device 802 may calculate a location of the target object 803 based on a plurality or range or distance measurements, for example via triangulation using known positions of the wireless devices 802 and 806 and the calculated range or distance measurements. In one aspect, the wireless device 802 may calculate a velocity of the target object 803 based on a first calculated location of the target object 803 based on the reflected set of sensing signals 816 and/or the reflected set of sensing signals 820 measured at a first time, and a second calculated location of the target object 803 based on the reflected set of sensing signals 816 and/or the reflected set of sensing signals 820 measured at a second time. In one aspect, the wireless device 802 may calculate an AoA of the reflected set of sensing signals 816 and/or an AoD of the set of sensing signals 812 based on a plurality of ports that transmitted the set of sensing signals 812 and a plurality of ports that received the reflected set of sensing signals 816. In one aspect, the wireless device 802 may calculate an AoA of the reflected set of sensing signals 820 and/or an AoD of the set of sensing signals 818 based on a plurality of ports that transmitted the set of sensing signals 818 and a plurality of ports that received the reflected set of sensing signals 820.

Similarly, the wireless device 804 may conduct one or more sensing measurements on the reflected set of sensing signals 814 and/or the reflected set of sensing signals 824. In one aspect, the wireless device 804 may calculate a distance or a range that the set of sensing signals 812 and the reflected set of sensing signals 814 travels based on a time between when the wireless device 802 transmits the set of sensing signals 812 and when the wireless device 804 receives the reflected set of sensing signals 814. In one aspect, the wireless device 804 may calculate a distance or a range that the set of sensing signals 822 and the reflected set of sensing signals 824 travels based on a time between when the wireless device 808 transmits the set of sensing signals 822 and when the wireless device 804 receives the reflected set of sensing signals 824. In one aspect, the wireless device 804 may calculate a location of the target object 803 based on a plurality or range or distance measurements, for example via triangulation using the known positions of wireless devices 802, 804, and 808, and the calculated range or distance measurements. In one aspect, the wireless device 804 may calculate a velocity of the target object 803 based on a first calculated location of the target object 803 based on the reflected set of sensing signals 814 and/or the reflected set of sensing signals 824 measured at a first time, and a second calculated location of the target object 803 based on the reflected set of sensing signals 814 and/or the reflected set of sensing signals 824 measured at a second time. In one aspect, the wireless device 804 may calculate an AoA of the reflected set of sensing signals 814 and/or an AoD of the set of sensing signals 812 based on a plurality of ports that transmitted the set of sensing signals 812 and a plurality of ports that received the reflected set of sensing signals 814. In one aspect, the wireless device 804 may calculate an AoA of the reflected set of sensing signals 824 and/or an AoD of the set of sensing signals 822 based on a plurality of ports that transmitted the set of sensing signals 822 and a plurality of ports that received the reflected set of sensing signals 824.

While a wireless device may sense parameters of the target object 803 by measuring a reflected set of sensing signals originating from a transmitter node, such a wireless device may improve its sensing by measuring two or more reflected sets of sensing signals originating from two or more transmitter nodes. For example, the wireless device 802 may improve its sensing by measuring the reflected set of sensing signals 816 originating from the wireless device 802 as the set of sensing signals 812 in addition to measuring the reflected set of sensing signals 820 originating from the wireless device 806 as the set of sensing signals 818. In another example, the wireless device 804 may improve its sensing by measuring the reflected set of sensing signals 814 originating from the wireless device 802 as the set of sensing signals 812 in addition to measuring the reflected set of sensing signals 824 originating from the wireless device 808 as the set of sensing signals 822.

Such sensing operations may support commercial services, (e.g., driving assistance) and public safety services (e.g., police or fire department services), and thus may have a priority associated with a sensing operation. For example, a sensing signal transmitted for a public safety service may have a higher priority than a sensing operation for a driving assistance service. In another example, a sensing signal transmitted for driving assistance for a vehicle associated with the UE transmitting the sensing signal may have a higher priority than a sensing signal transmitted for driving assistance for a vehicle associated with a different UE than the UE transmitting the sensing signal. A sensing system may be configured to dynamically prioritize sensing transmissions, and enforce prioritization among sensing services (e.g., between a driving assistance service and a public safety service), and/or among users of the sensing services. Traffic prioritization may be enforced by adjusting resource utilization and/or by pre-empting lower priority traffic.

FIG. 9A is a diagram 910 illustrating an example of a wireless communications system having an RF transmitter 912 shown as device D1, an RF receiver 914 shown as device D2, and an ambient-power device 916 shown as a tag T that may reflect or backscatter a signal 913B from the RF transmitter 912 as a signal 917A to the RF receiver 914. The ambient-power device 916 may be a passive internet-of-things (IoT) device or a radio frequency identification (RFID) tag. In some aspects, the ambient-power device 916 may be a zero-power device that harvests energy from other devices around it, such as a zero-power IoT device (ZP-IoTD) or a zero-power personal IoT device (ZP-PIoTD). The ambient-power device 916 may include a passive ambient-power device (e.g., a device that has no battery, and harvests ambient energy to operate), a semi-passive ambient-power device (e.g., a device that has a battery, and harvests ambient energy to recharge its battery and/or to operate), or an active ambient-power device (e.g., a device that has a battery, and may operate without harvesting ambient energy to recharge its battery, or may operate while harvesting ambient energy to recharge its battery, and may transmit signals using backscattering even when operating without harvesting ambient energy).

An RF transmitter 912 or the RF receiver 914 may be, for example, a UE, a network entity, or a component of a network entity. The RF receiver 914 may monitor the ambient-power device 916 responses as the signal 917A and may also monitor the commands/queries sent to the ambient-power device 916 as the signal 913A to determine and adjust potential configurations and track time allocations, frequency allocations, and configurations to decode responses from the ambient-power device 916. The RF transmitter 912 may transmit a signal 913A to the RF receiver 914. The RF transmitter 912 may also transmit a signal 913B to the ambient-power device 916. The signal 913A and the signal 913B may be the same signal received contemporaneously by both the RF receiver 914 and the ambient-power device 916. In other words, the RF transmitter 912 may be considered an RF source for both the signal 913A and the signal 913B. The RF transmitter 912 may transmit a continuous wave (CW), such as a sine wave. While the RF transmitter 912 and the RF receiver 914 are depicted as two separate devices in the diagram 910, the RF transmitter 912 and the RF receiver 914 may be a full duplex (FD) UE that reads a reflected or backscattered signal from the ambient-power device 916.

The ambient-power device 916 may reflect or backscatter the signal 913B as the signal 917A to the RF receiver 914. If the ambient-power device 916 reflects the signal 913B as the signal 917A to the RF receiver 914, the signal 917A from the ambient-power device 916 to the RF receiver 914 may reinforce the signal 913A from the RF transmitter 912 to the RF receiver 914, strengthening the signal received by the RF receiver 914. If the ambient-power device 916 backscatters the signal 913B as the signal 917A to the RF receiver 914, the signal 917A from the ambient-power device 916 to the RF receiver 914 may include an embedded signal (i.e., information bits) from the backscattering-based communications device in addition to the signal received by the RF receiver 914. In other words, the ambient-power device 916 may modulate the signal 913B with its data sequence. The RF transmitter 912 may send one or more queries to the ambient-power device 916, and the ambient-power device 916 may respond to one or more queries by transmitting a re-modulated signal as the signal 917A. The ambient-power device 916 may transmit the signal 917A using any suitable resources, such as a CW resource. The CW resource may have a CW configuration having a single tone waveform, a multi-tone waveform, an OFDM waveform, or a single carrier (SC) waveform. The SC waveform may be, for example, a single carrier quadrature amplitude modulation (SC-QAM) waveform or a discrete Fourier transform spread orthogonal frequency division multiplexing (DFT-s-OFDM) waveform. The CW configuration may include at least one of a time, a frequency, a type of waveform, a type of modulation (e.g., Manchester coding, pulse-position modulation (PPM), pulse-width modulation (PWM), pulse-code modulation (PCM), chirp-based modulation, amplitude-shift keying (ASK), on-off keying (OOK), discrete Fourier transform (DFT), four-wave mixing (FWM)), or a type of coding (e.g., repetition, forward-error-correction, polar, low-density parity check (LDPC)).

The ambient-power device 916 may be a passive, an active, a semi-passive, or a semi-active IoT device. A passive IoT device may include an energy harvesting (EH) device configured to opportunistically harvest energy in the environment, such as solar, heat, and ambient RF. Such an EH device may have protocol enhancements that support one or more operations using intermittently available energy harvested from the environment. The passive IoT device may store harvested energy using a power storage unit, such as a capacitor or a supercapacitor, which may power RF components, such as the IC, an analog-to-digital converter (ADC), a mixer, and/or an oscillator. The passive IoT device may not have a battery. Variations on the amount of harvested energy and traffic may be expected using such devices. Passive IoT devices that operate using intermittently available energy harvested from the environment may not be able to sustain long, continuous transmission and/or reception. A semi-passive IoT device may have any of the capabilities of a passive IoT device, and may also have a power storage unit, such as a supercapacitor or a battery, that may power and/or turn on an IC of the device. A semi-passive IoT device may also reflect or backscatter an incident signal received by the passive IoT device.

The ambient-power device 916 may be a UE, such as the UE 104 in FIG. 1, that may contain an RFID tag radio or a backscattering-based communications radio. The UE may be configured to use the radio to communicate signals. In one aspect, a UE may be configured to use such a radio instead of an antenna to communicate in response to a condition, for example if the UE is in a low power state, or if the UE is configured to use less power for a task. In another aspect, a UE may provide its capability of using such a radio to communicate signals to a network node, for example a base station, and the network node may configure the UE to use such a radio for communications based on a schedule (e.g., during periodic times, scheduled times, or in response to a trigger indicated by the network node).

A semi-active IoT device may have any of the capabilities of a passive or a semi-passive IoT device, and may also use its power storage unit to strengthen a received signal, for example by using a power amplifier (PA) that increases an amplitude of the reflected or backscattered signal. An active IoT device may have a power storage unit, such as a battery, that may provide power to one or more active RF components to transmit a signal even when the active IoT device is not within range to receive a signal. An active RF component may strengthen a received signal, for example by using a power amplifier (PA) that increases an amplitude of the reflected or backscattered signal. An active IoT device may even provide a reflected or backscattered signal that is stronger than the signal received by the device, such as the signal 913B received by the ambient-power device 916. An active IoT device may also use its power storage unit to transmit a signal generated by the active IoT device that is not a reflected or a backscattered signal.

The ambient-power device 916 may modulate an incident wave and/or signal using a data sequence. For example, the ambient-power device 916 may use an amplitude shift keying (ASK) modulation method to switch on a reflection when transmitting an information bit "1" and switch off the reflection when transmitting an information bit "0." For example, FIG. 9B is a diagram 920 illustrating an example of a radio wave transmitted by a wireless communications device, such as the RF transmitter 912 in FIG. 9A. FIG. 9C is a diagram 930 illustrating an example of a backscattered signal where the backscattering-based communications device, such as the ambient-power device 916 in FIG. 9A, switches on a reflection when transmitting an information bit "1" and switches off the reflection when transmitting an information bit "0." FIG. 9D is a diagram 940 illustrating an example of a signal received at a UE, such as the RF receiver 914 in FIG. 9A, which may be a combination of a radio wave transmitted by a wireless communications device, such as the RF transmitter 912 in FIG. 9A, and a radio wave transmitted by a backscattering-based communications device, such as the ambient-power device 916 in FIG. 9A.

Each radio wave may be denoted as x(n), such that $h_{D1D2}(n)$ represents a radio wave from the RF transmitter 912 to the RF receiver 914, $h_{D1T}(n)$ represents a radio wave from the RF transmitter 912 to the ambient-power device 916, and $h_{TD2}(n)$ represents a radio wave from the ambient-power device 916 to the RF receiver 914. Diagram 920 in FIG. 9B shows a radio wave $h_{D1D2}(n)$ representing a radio wave x(n) transmitted by the RF transmitter 912 in FIG. 9A. The RF receiver 914 may receive the radio wave as the signal 913A, denoted as $h_{D1D2}(n)$, and the ambient-power device 916 may receive the radio wave as the signal 913B, denoted as $h_{D1T}(n)$.

The ambient-power device 916 may use an ASK modulation method to switch on a reflection when transmitting an information bit "1" and switch off the reflection when transmitting an information bit "0." The information bits of the ambient-power device 916 may be denoted as s(n) ∈{0.1}. Diagram 930 in FIG. 9C shows a radio wave $\sigma_f h_{D1T}(n)h_{TD2}(n)s(n)$ representing a backscattered radio wave of the radio wave in diagram 920 in FIG. 9B, where the ambient-power device 916 in FIG. 9A switches on reflection when transmitting an information bit "1" and switches off reflection when transmitting an information bit "0." $\sigma_f$ may denote the reflection coefficient of the ambient-power device 916. s(n) may represent the backscattered signal from ambient-power device 916 that reflects the signal from the RF transmitter 912. The ambient-power device 916 may transmit the radio wave as the signal 917A, denoted as $h_{TD2}(n)$, to the RF receiver 914.

The RF receiver 914 in FIG. 9A may receive a combination of the signal 913A, shown as the radio wave $h_{D1D2}(n)$ in FIG. 9B, and the signal 917A, shown as the radio wave $\sigma_f h_{D1T}(n)h_{TD2}(n)s(n)$ in FIG. 9C. Diagram 940 in FIG. 9D shows a radio wave $h_{D1D2}(n)+\sigma_f h_{D1T}(n)h_{TD2}(n)s(n)$ representing the combination of the radio wave=$h_{D1D2}(n)$ of diagram 910 in FIG. 9B and the radio wave $\sigma_f h_{D1T}(n)h_{TD2}(n)s(n)$ of diagram 920 in FIG. 9C. The RF receiver 914 may then decode the combination radio wave to read the transmission from the RF transmitter 912, and also read information bits from the ambient-power device 916. In other words, the RF receiver 914 may estimate the envelope of the signal 917A, and the envelope may represent information bits from the ambient-power device 916.

The complete signal received by the RF receiver 914 in FIG. 9A may be represented by $h_{D1D2}(n)+\sigma_f h_{D1T}(n)h_{TD2}(n)s(n)$+noise, where noise represents signals received from other wireless devices using resources that overlap the transmissions from the RF transmitter 912 and the ambient-power device 916. When s(n)=0, the ambient-power device 916 may switch off reflection, so that the RF receiver 914 may receive the signal 913A via a direct link from the RF transmitter 912, represented by $h_{D1D2}(n)$+noise. When s(n)=1, the ambient-power device 916 may switch on reflection, so that the RF receiver 914 receives the superposition of both the direct link signal as signal 913A from the RF transmitter 912 and the backscatter link signal as the signal 917A from the ambient-power device 916, represented by $h_{D1D2}(n)+\sigma_f h_{D1T}(n)h_{TD2}(n)s(n)$+noise.

The superposition of a direct link signal from a UE, such as the RF transmitter 912, and a backscattered signal from a low-power backscattering-based communications device, such as the ambient-power device 916, may not be significantly different from the direct link signal alone since the backscattered signal may be far weaker than the direct link signal (e.g., a backscattered CW signal may be 9× weaker than a direct link CW signal). For example, if the distance between the RF transmitter 912 in FIG. 9A and the ambient-power device 916 is 10 m, and the distance between the ambient-power device 916 and the RF receiver 914 is 10 m, then the power difference between the signal 913A and the signal 917A may be 16 dB. If the distance between the RF transmitter 912 in FIG. 9A and the ambient-power device 916 is 20 m, and the distance between the ambient-power device 916 and the RF receiver 914 is 20 m, then the power difference between the signal 913A and the signal 917A may be 30 dB.

The RF transmitter 912 may transmit the signal 913B, such as a CW resource, to assist the ambient-power device 916 in transmitting data to an RF receiver 914 via the signal 917A (e.g., a reflected signal, a backscattered signal, to assist in receiving data from the ambient-power device 916 via information bits. In some aspects, the RF transmitter 912 may transmit a CW signal to allow the ambient-power device 916 to harvest energy. Such aspects may be useful where the ambient-power device 916 includes an energy-harvesting device that cannot harvest and perform signal reception without a CW signal being transmitted to the device. The RF transmitter 912 may transmit the signal 913B, such as a PUSCH transmission, to transmit data to the ambient-power device 916. In some aspects, the RF transmitter 912 and the RF receiver 914 may be two panels or antennas of a common device, such as a full-duplex UE, which may be configured to both transmit and receive messages with the ambient-power device 916 during the same time period.

In some aspects, a transmitting wireless device, such as a UE or a network node, may be scheduled to transmit a data transmission to a receiving wireless device. For example, a UE may be scheduled to transmit a PSSCH message to another UE or a network node (e.g., via a mode 1 RA DG or a CG), a UE may be scheduled to transmit a PUSCH message to a network node, a UE may dynamically schedule resources to use for a sidelink transmission (e.g., via a mode 2 RA) to another UE or a network node, a network node may be scheduled to transmit a PSSCH message to a UE or another network node, a network node may be scheduled to transmit a PDSCH message to a UE, or a network node may dynamically schedule resource for use for a sidelink transmission to a UE or another network node. A data transmission may include a PSSCH message, a PUSCH message, a PDSCH message, a CG, or a DG. The data transmission may include a sidelink data transmission for a wireless device (e.g., a UE, a PLC, a network node/entity).

In some aspects, a wireless device may be scheduled to transmit a non-data service signal. For example, a wireless device may be scheduled to transmit a set of positioning signals (e.g., PRSs, SRSs) to another wireless device, a set of sensing signals at a target object, a set of ambient-power device signals (e.g., a CW at a backscattering device), a set of FL signals (e.g., a result of a CFN calculation), or a set of EH signals (e.g., a CW at an EH device). A network may schedule a non-data service signal in a periodic manner (e.g., transmit a sensing signal periodically), a semi-persistent manner (e.g., transmit a sensing signal in response to a trigger transmitted by a wireless device), or a dynamic manner (e.g., transmit a sensing signal in response to a trigger transmitted by a wireless device, and stop transmitting the sensing signal in response to a trigger transmitted by a wireless device). A semi-persistent trigger may be, for example, an RRC, a DCI, a MAC-CE, or a layer 1 control signal. A non-data service signal may be configured for RF tuning, and/or RF retuning. A non-data service signal may be configured to have a larger and/or wider bandwidth than a data transmission scheduled for the same UE during the same time period.

In some aspects, a wireless device may be scheduled to transmit both a data transmission and a non-data service signal in a same time period. The wireless device may be scheduled to transmit the data transmission and the non-data service signal by the same entity (e.g., the same network node) or by different entities (e.g., network nodes of different vendors, different services of the same network node, a network node and a UE). If the wireless device is scheduled to transmit both a data transmission and a non-data service signal in a same time period, a conflict may occur between the transmissions. For example, the wireless device may be configured to perform a non-data service (e.g., sensing transmission, perception transmission, FL task) during the same time period that the wireless device is configured to transmit a PSSCH CG to a UE. The wireless device may be configured to resolve such a conflict between a data transmission and a non-data service signal scheduled to be transmitted during the same time period.

In some aspects, a wireless device may receive a first configuration for transmitting at least one data transmission during a time period. For example, the wireless device may receive a mode 1 RA for transmitting a PSSCH during the time period. The wireless device may also receive a second configuration for transmitting a set of non-data service signals during the same time period. For example, the wireless device may receive a schedule to periodically transmit a positioning signal during the same time period. The wireless device may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. The wireless device may transmit the data transmission using a sidelink connection or a universal mobile telecommunications system (UMTS) air interface (Uu) connection.

In some aspects, a wireless device may receive a first configuration for receiving at least one data transmission during a time period. For example, the wireless device may receive a mode 1 RA for receiving a PSSCH during the time period. The wireless device may also receive a second configuration for receiving a set of non-data service signals during the time period. For example, the wireless device may receive a schedule to periodically receive a positioning signal during the same time period. The wireless device may receive (a) a third configuration of a schedule associated with the first configuration and the second configuration or (b) the at least one data transmission. The wireless device may then decode the at least one data transmission or the set of non-data service signals based on (1) the third configuration or (2) a decoded portion of the at least one data transmission.

Figure 10A:
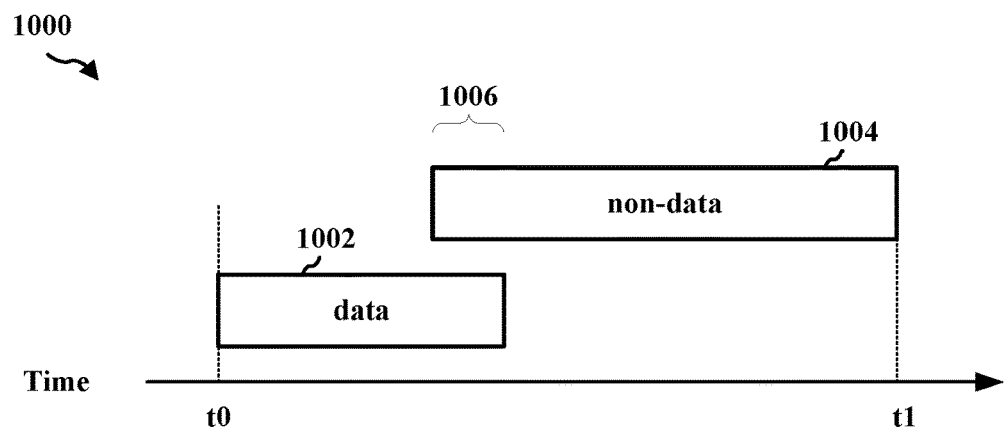
FIG. 10A is a diagram illustrating an example of scheduling for a data transmission and a non-data service signal within a time period.

FIG. 10A is a diagram 1000 illustrating an example of scheduling for a data transmission 1002 and a non-data service signal 1004 for a transmitter wireless device within a time period between the time t0 and the time t1. A data transmission may be, for example, a PSSCH message to another wireless device, a PUSCH message to a network node, a PDSCH message to a UE, a CG to another wireless device, or a DG to another wireless device. A non-data service signal may include a set of positioning signals (e.g., an SRS, a PRS), a set of RF sensing signals, a set of ambient-power device signals, a set of FL signals, or a set of EH signals. The wireless device may have a configuration to transmit the data transmission 1002 and the non-data service signal 1004 during the time period between the time t0 and the time t1. However, the schedule for the data transmission 1002 and the schedule for the non-data service signal 1004 may overlap shown by the indication 1006. As a result, the wireless device scheduled to transmit the data transmission 1002 and the non-data service signal 1004 during the time period between the time t0 and the time t1 may select either to transmit the data transmission 1002 or to transmit the non-data service signal 1004 during the time period between the time t0 and the time t1, but may not transmit both.

In some aspects, the wireless device may select to transmit the non-data service signal 1004 and not transmit the data transmission 1002 during the time period between the time t0 and the time t1. In some aspects, the wireless device may select to transmit the data transmission 1002 and not transmit the non-data service signal 1004 during the time period between the time t0 and the time t1. The wireless device may select which signal to transmit based on a configured threshold of a priority associated with each transmission (e.g., a layer 1 (L1) priority or a layer 2 (L2) priority). For example, the wireless device may select one transmission over the other based on which transmission is associated with a higher priority parameter. In another aspect, the wireless device may select the data transmission 1002 if the data transmission 1002 has a priority parameter greater or equal to a threshold value, and may select the non-data service signal 1004 if the data transmission 1002 has a priority parameter less than or equal to the threshold value. In another aspect, the wireless device may select the non-data service signal 1004 if the non-data service signal 1004 (or the non-data service that the non-data service signal 1004 is associated with) has a priority parameter greater or equal to a threshold value, and may select the data transmission 1002 if the non-data service signal 1004 (or the associated non-data service) has a priority parameter less than or equal to the threshold value. In some aspects, the wireless device may select which signal to transmit based on a QoS parameter. For example, the wireless device may select one transmission over the other based on which transmission is associated with a higher QoS parameter. In another aspect, the wireless device may select the non-data service signal 1004 if the non-data service signal 1004 (or the non-data service that the non-data service signal 1004 is associated with) has a QoS parameter greater or equal to a threshold value, and may select the data transmission 1002 if the non-data service signal 1004 (or the associated non-data service) has a QoS parameter less than or equal to the threshold value. In another aspect, the wireless device may select the data transmission 1002 if the data transmission 1002 has a QoS parameter greater or equal to a threshold value, and may select the non-data service signal 1004 if the data transmission 1002 has a QoS parameter less than or equal to the threshold value. In some aspects, the wireless device may select which signal to transmit based on a delay parameter (e.g., a remaining packet delay budget (PDB) parameter). For example, the wireless device may select one transmission over the other based on which transmission has a lower PDB parameter. In another aspect, the wireless device may select the non-data service signal 1004 if the non-data service signal 1004 (or the non-data service that the non-data service signal 1004 is associated with) has a PDB parameter less than or equal to a threshold value, and may select the data transmission 1002 if the non-data service signal 1004 (or the associated non-data service) has a PDB parameter greater than or equal to the threshold value. In another aspect, the wireless device may select the data transmission 1002 if the data transmission 1002 has a PDB parameter less than or equal to a threshold value, and may select the non-data service signal 1004 if the data transmission 1002 has a PDB parameter greater than or equal to the threshold value. In some aspects, the wireless device may use a table of configured thresholds to determine whether to prioritize transmitting the data transmission 1002 or to prioritize the non-data service signal 1004 during the time period between the time to and the time t1. For example, the table may include a set of configured thresholds, where each configured threshold is associated with a type of transmission, a service associated with a non-data service, and/or an entity that receives the transmission. A configured threshold may be compared with a parameter value, or may be based on a set of parameters, for example a value calculated as a function of both an L1 priority parameter and a QoS parameter. The wireless device may receive the set of configured thresholds from a network node, such as a serving base station. The wireless device may receive the set of configured thresholds in an RRC. The wireless device may receive the set of configured thresholds from a UE allocating a sidelink transmission via a mode 2 RA.

In some aspects, a table or a function may be used to select either the data transmission 1002 or the non-data service signal 1004 to transmit based on a set of parameters. The table or function may be defined per resource pool or BWP. In some aspects, the wireless device may receive the table or function from a network node (e.g., a serving base station), a controlling device (e.g., a PLC), or a UE (e.g., a UE receiving sidelink messages from the transmitting wireless device). The input to the table or function may be a set of parameters, for example an L1 priority parameter, an L2 priority parameter, a QoS of data, and/or a delay parameter of data (e.g., a remaining PDB parameter), for the data transmission 1002 and/or the non-data service signal 1004.

While diagram 1000 illustrates an example of scheduling the data transmission 1002 during the same time period as the non-data service signal 1004, in some aspects, the data transmission 1002 may be scheduled during the same time period as a plurality of non-data service signals. One or more parameters, such as an L1 priority parameter, an L2 priority parameter, a QoS parameter, or a remaining PDB parameter may be used to resolve conflict between two or more non-data service signals scheduled to be transmitted during the same time period. In some aspects, one or more non-data service signals may not be associated with a configured set of parameters that may be used to resolve a conflict. The wireless device may be configured to prioritize the non-data services signals associated with a configured set of parameters that may be used to resolve a conflict.

In some aspects, the wireless device may receive a configuration/schedule for a DG that cancels a non-data service occasion. For example, the wireless device may receive a DCI to schedule the data transmission 1002 that includes an indication to cancel transmission of the non-data service signal 1004. In another example, the wireless device may receive an L1, L2, and/or an L3 message that schedules the data transmission 1002 that includes an indication to cancel transmission of the non-data service signal 1004. In another example, the wireless device may receive a MAC control element (MAC-CE) from another wireless device, where the MAC-CE includes an indicator that triggers the data transmission 1002. In response to the wireless device receiving a configuration or a schedule for a DG that overlaps the non-data service signal 1004 (e.g., shown by the indication 1006), the wireless device may cancel transmission of the non-data service signal 1004 to transmit the data transmission 1002.

In some aspects, the wireless device may transmit an indication to another wireless device that the wireless device is not able to transmit the data transmission 1002, as the UE is transmitting the non-data service signal 1004 during the time period between the time to and the time t1. In some aspects, the wireless device may transmit an indication to another wireless device that the wireless device is not able to transmit the non-data service signal 1004, as the wireless device is transmitting the data transmission 1002 during the time period between the time to and the time t1. The wireless device may transmit the indication in a broadcast manner, a groupcast manner, a groupcast connection-less manner, or may transmit the indication in a unicast manner to indicate to other wireless devices that the wireless device is not transmitting a scheduled transmission (e.g., the data transmission 1002 or the non-data service signal 1004).

A transmitting wireless device may transmit this indication to the receiving wireless device scheduled to receive the cancelled transmission from the transmitting wireless device so that the receiving wireless device knows not to expect reception of the transmission. The transmitting wireless device may transmit this indication to the wireless device that scheduled the transmission (e.g., a base station or TRP serving the transmitting wireless device) so that the scheduling wireless device may reassign the transmission to a different device. The transmitting wireless device may transmit this indication to a wireless device scheduled to receive a response from the cancelled transmission (e.g., a reflected sensing signal from a target object, a backscattered CW signal from an ambient-power device). In some aspects, the wireless device receiving the indication may, in response, trigger a release of resource allocations (e.g., a CG occasion or another resource allocation) so that they may be used by other wireless devices. In some aspects, the indication may be transmitted using a L1, L2, and/or a L3 message, or may be multiplexed with an inter-UE coordination message or an L1, L2, and/or L3 message to the receiving wireless device scheduled to receive the cancelled transmission. For example, the transmitting wireless device may cancel transmission of the data transmission 1002 to transmit the non-data service signal 1004. The data transmission 1002 may be a PSSCH message. The transmitting wireless device may transmit an indication to other wireless devices (e.g., a wireless device scheduled to receive the PSSCH message, a wireless device that scheduled the PSSCH message) so that other wireless devices may use the resources associated with the data transmission 1002. In some aspects, the transmitting wireless device may transmit the indication to a CFN server, which may, in response, select a one or more other wireless devices to perform a FL task, or may reschedule the transmitting wireless device to perform the FL task in a different time period.

In some aspects, the indication may include a configuration of CGs that the wireless device is scheduling for transmission to another wireless device (e.g., for a set of sidelink data transmissions). The indication may include a current CG, or a set of CGs that the wireless device is scheduling for transmission, which may allow the receiving wireless device to skip reception of allocated resources that the transmitting wireless device will not use, for example because the transmitting wireless device is transmitting the non-data service signal 1004 and is cancelling transmission of the data transmission 1002). The indication may include a priority parameter (e.g., an L1 priority parameter or an L2 priority parameter), a QoS parameter, and/or a delay parameter (e.g., a remaining PDB parameter) associated with the traffic the wireless device expects to transmit via sidelink during CG occasions. This indication may be used by the receiving wireless device to resolve conflicts with non-data services as well, as the receiving wireless device may then use those cancelled occasions to perform non-data service transmissions, receptions, or computations. The receiving wireless device may use the one or more parameters to resolve priority between transmissions received by the receiving wireless device.

Figure 10B:
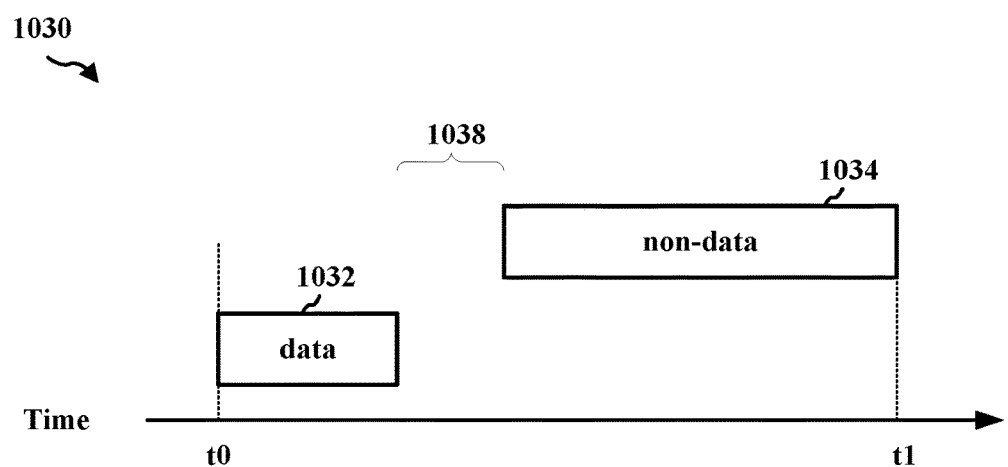
FIG. 10B is another diagram illustrating an example of scheduling for a data transmission and a non-data service signal within a time period.

FIG. 10B is a diagram 1030 illustrating an example of scheduling for a data transmission 1032 and a non-data service signal 1034 for a transmitter wireless device within a time period between the time to and the time t1. The wireless device may be able to transmit the data transmission 1032 and the non-data service signal 1034 within the time period between the time to and the time t1 with a gap 1038 between the data transmission 1032 and the non-data service signal 1034. While the diagram 1030 illustrates the wireless device transmitting the data transmission 1032 before the non-data service signal 1034, the wireless device may transmit the data transmission 1032 after the non-data service signal 1034. That is, the gap 1038 may be between the end of the transmission of the data transmission 1032 and the beginning of the transmission of the non-data service signal 1034, or the gap 1038 may be between the end of the transmission of the non-data service signal 1034 and the beginning of the transmission of the data transmission 1032. The gap 1038 may be referred to as a configured gap between the data transmission 1032 and the non-data service signal 1034. The wireless device may schedule transmission of the data transmission 1032 and the non-data service signal 1034 within the time period between the time t0 and the time t1 with the configured gap (gap 1038) between the data transmission 1032 and the non-data service signal 1034.

In some aspects, the wireless device may be configured to transmit both the data transmission 1032 and the non-data service signal 1034 within the time period between the time to and the time t1 in response to the gap 1038 being greater or equal to a minimum threshold gap. The minimum threshold gap may be the minimum threshold between the data transmission 1032 and the non-data service signal 1034 that may exist without the transmissions interfering with one another. The minimum threshold gap may be expressed in terms of a number of symbols, a number of slots, a number of frames, and/or a number of time units. In some aspects, the wireless device may calculate the minimum threshold gap as a function of the non-data service associated with the non-data service signal 1034. For example, an RF sensing service or an FL service may be associated with a minimum threshold gap. In some aspects, a wireless device may configure the minimum threshold gap using L1, L2, and/or layer 3 (L3) signaling, indicating that the data transmission 1032 and the non-data service signal 1034 may be transmitted within the same time period so long as a gap between the transmissions is greater or equal to the minimum threshold gap.

Figure 10C:
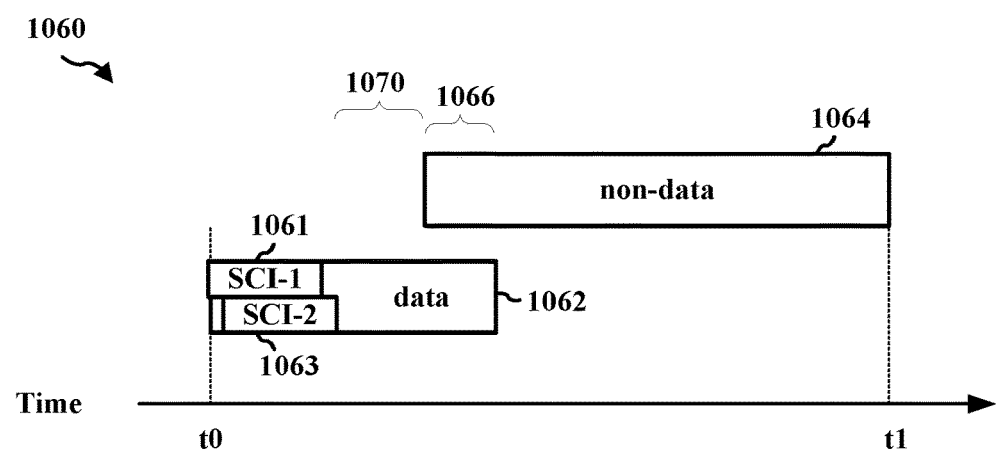
FIG. 10C is another diagram illustrating an example of scheduling for a data transmission and a non-data service signal within a time period.

FIG. 10C is a diagram 1060 illustrating an example of a data transmission 1062 and a non-data service signal 1064 received by a wireless device scheduled to receive the data transmission 1062 and the non-data service signal 1064 within a time period between the time to and the time t1. The data transmission 1062 and the non-data service signal 1064 may be transmitted by different wireless entities, such as different wireless devices. The wireless device may have a configuration to receive the data transmission 1062 and the non-data service signal 1064 during the time period between the time to and the time t1. However, the schedule for the data transmission 1062 and the schedule for the non-data service signal 1064 may overlap shown by the indication 1066. As a result, the wireless device scheduled to receive the data transmission 1062 and the non-data service signal 1064 during the time period between the time to and the time t1 may select either to receive and decode the data transmission 1062 or to receive and decode the non-data service signal 1064 during the time period between the time to and the time t1, but may not receive and decode both transmissions.

In some aspects, the wireless device may select to decode the non-data service signal 1064 and not decode the data transmission 1062 received during the time period between the time to and the time t1. In some aspects, the wireless device may select to decode the data transmission 1062 and not decode the non-data service signal 1064 received during the time period between the time to and the time t1. The wireless device may select which signal to decode based on a configured threshold of a priority associated with each transmission (e.g., an L1 priority or a layer 2 (L2) priority). For example, the wireless device may select one transmission over the other based on which transmission is associated with a higher priority parameter. In another aspect, the wireless device may select the data transmission 1062 if the data transmission 1062 has a priority parameter greater or equal to a threshold value, and may select the non-data service signal 1064 if the data transmission 1062 has a priority parameter less than or equal to the threshold value. In another aspect, the wireless device may select the non-data service signal 1064 if the non-data service signal 1064 (or the non-data service that the non-data service signal 1064 is associated with) has a priority parameter greater or equal to a threshold value, and may select the data transmission 1062 if the non-data service signal 1064 (or the associated non-data service) has a priority parameter less than or equal to the threshold value. In some aspects, the wireless device may select which signal to transmit based on a QoS parameter. For example, the wireless device may select one transmission over the other based on which transmission is associated with a higher QoS parameter. In another aspect, the wireless device may select the non-data service signal 1064 if the non-data service signal 1064 (or the non-data service that the non-data service signal 1064 is associated with) has a QoS parameter greater or equal to a threshold value, and may select the data transmission 1062 if the non-data service signal 1064 (or the associated non-data service) has a QoS parameter less than or equal to the threshold value. In another aspect, the wireless device may select the data transmission 1062 if the data transmission 1062 has a QoS parameter greater or equal to a threshold value, and may select the non-data service signal 1064 if the data transmission 1062 has a QoS parameter less than or equal to the threshold value. In some aspects, the wireless device may select which signal to transmit based on a delay parameter (e.g., a remaining PDB parameter). For example, the wireless device may select one transmission over the other based on which transmission has a lower PDB parameter. In another aspect, the wireless device may select the non-data service signal 1064 if the non-data service signal 1064 (or the non-data service that the non-data service signal 1064 is associated with) has a PDB parameter less than or equal to a threshold value, and may select the data transmission 1062 if the non-data service signal 1064 (or the associated non-data service) has a PDB parameter greater than or equal to the threshold value. In another aspect, the wireless device may select the data transmission 1062 if the data transmission 1062 has a PDB parameter less than or equal to a threshold value, and may select the non-data service signal 1064 if the data transmission 1062 has a PDB parameter greater than or equal to the threshold value. In some aspects, the wireless device may use a table of configured thresholds to determine whether to prioritize decoding the data transmission 1062 or to prioritize decoding the non-data service signal 1064 during the time period between the time to and the time t1. For example, the table may include a set of configured thresholds, where each configured threshold is associated with a type of transmission, a service associated with a non-data service, and/or an entity that receives the transmission. A configured threshold may be compared with a parameter value, or may be based on a set of parameters, for example a value calculated as a function of both an L1 priority parameter and a QoS parameter. The wireless device may receive the set of configured thresholds from a network node, such as a serving base station. The wireless device may receive the set of configured thresholds in an RRC. In some aspects, the wireless device may receive the set of parameters from the wireless device transmitting the data transmission 1062 and/or the wireless device transmitting the non-data service signal 1064. For example, the wireless device may receive an indication of a set of parameters associated with the data transmission, which the wireless device may use to prioritize which transmission to decode.

In some aspects, a table or a function may be used to select either the data transmission 1062 or the non-data service signal 1064 to decode based on a set of parameters. The table or function may be defined per resource pool or BWP. In some aspects, the wireless device may receive the table or function from a network node (e.g., a serving base station), a controlling device (e.g., a PLC), or a UE (e.g., a UE transmitting sidelink messages to the receiving wireless device). The input to the table or function may be a set of parameters, for example an L1 priority parameter, an L2 priority parameter, a QoS of data, and/or a delay parameter of data (e.g., a remaining PDB parameter), for the data transmission 1062 and/or the non-data service signal 1064.

While diagram 1060 illustrates an example of scheduling the data transmission 1062 during the same time period as the non-data service signal 1064, in some aspects, the data transmission 1062 may be scheduled during the same time period as a plurality of non-data service signals. One or more parameters, such as an L1 priority parameter, an L2 priority parameter, a QoS parameter, or a remaining PDB parameter may be used to resolve conflict between two or more non-data service signals scheduled to be transmitted during the same time period. In some aspects, one or more non-data service signals may not be associated with a configured set of parameters that may be used to resolve a conflict. The wireless device may be configured to prioritize the non-data services signals associated with a configured set of parameters that may be used to resolve a conflict.

In some aspects, the wireless device may determine a priority of the data transmission 1062 based on a header of the data transmission 1062. For example, in some aspects the data transmission 1062 may include a PSSCH transmission having an SCI-1 1061 and an SCI-2 1063. The wireless device may decode the SCI-1 1061 and/or the SCI-2 1063 to determine a priority of the data transmission 1062, and then may determine whether to continue decoding the data transmission 1062, or to cancel decoding the data transmission 1062 and decode the non-data service signal 1064 instead. For example, the wireless device may determine that the priority of the data transmission 1062 is lower than the priority of the non-data service signal 1064 in response to decoding the SCI-1 1061 and/or the SCI-2 1063. The wireless device may be able to select the priority of which transmission to decode based on the parameter determined from decoding the SCI-1 1061 and/or the SCI-2 1063 if the gap 1070 between the end of receiving the SCI-1 1061 and/or the SCI-2 1063 and the beginning of receiving the non-data service signal 1064 is greater or equal to a threshold value. The threshold value may be pre-configured, for example as a function of the service associated with the non-data service signal 1064, or may be configured as an RRC from a network node or a MAC-CE from another wireless device. The threshold value may allow the wireless device to have enough time to decode the SCI-1 1061 and/or the SCI-2 1063, and determine which transmission has a higher priority to decode. In some aspects, the threshold value may also add time to retune resources for receiving the non-data service signal 1064. Such a configuration may be useful if the transmitting wireless device does not share the configuration of the PSSCH transmission, or may share an occasion but does not share, or know, the priority/QoS/delay parameters of the PSSCH transmission, or for DGs from a network, or for when the wireless device schedules its own grants via mode 2 RA.

In some aspects, the wireless device may transmit an indication to another wireless device that the wireless device is not able to receive and decode the data transmission 1062, as the wireless device selects the non-data service signal 1004 to decode during the time period between the time t0 and the time t1. In some aspects, the wireless device may transmit an indication to another wireless device that the wireless device is not able to receive and decode the non-data service signal 1064, as the wireless device selected the data transmission 1002 to decode during the time period between the time t0 and the time t1. The wireless device may transmit the indication in a broadcast manner, a groupcast manner, a groupcast connection-less manner, or may transmit the indication in a unicast manner to indicate to other wireless devices that the wireless device is not receiving and decoding a scheduled transmission (e.g., the data transmission 1062 or the non-data service signal 1064).

Figure 11:
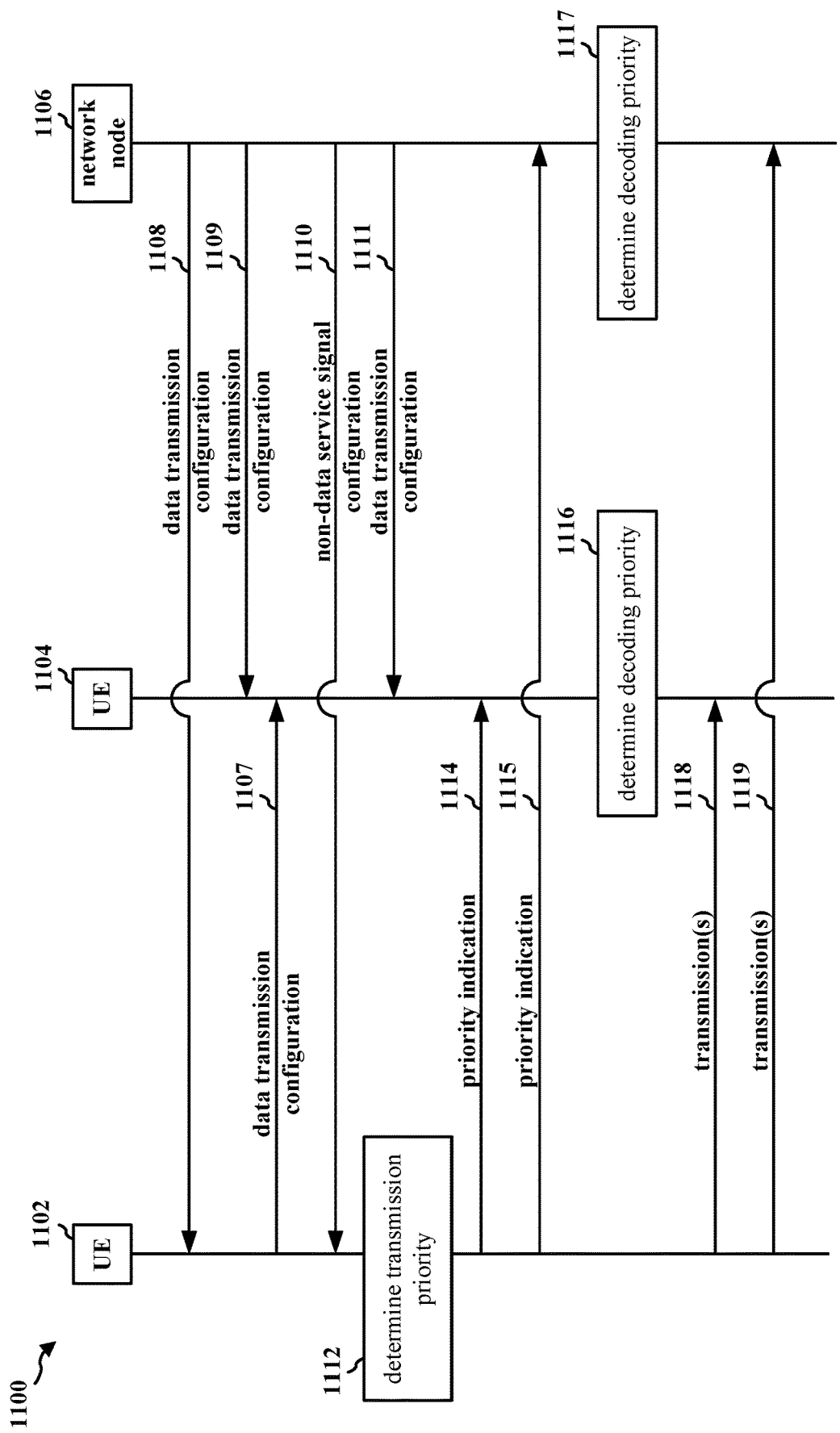
FIG. 11 is a connection flow diagram illustrating an example of a UE configured to resolve conflicts between a data transmission and a non-data service signal scheduled to be transmitted during a same time period.

FIG. 11 is a connection flow diagram 1100 illustrating an example of a UE 1102 configured to resolve conflicts between transmitting a data transmission to a UE 1104 and a non-data service signal scheduled to be transmitted during a same time period. The UE 1102 may be in sidelink communication with the UE 1104. The UE 1102 may be configured to transmit a set of transmissions 1118 at least some of which may be received by the UE 1104 as a sidelink transmission.

The network node 1106 may transmit a data transmission configuration 1108 to the UE 1102. The UE 1102 may receive the data transmission configuration 1108. The data transmission configuration 1108 may be for a sidelink data transmission for the UE 1102 to transmit a PSSCH message to the UE 1104. The data transmission configuration 1108 may be a mode 1 RA message. The data transmission configuration 1108 may be for a PUSCH transmission for the UE 1102 to transmit a PUSCH message to the network node 1106. The data transmission configuration 1108 may be for the UE 1102 to transmit a sidelink CG to the UE 1104 or a Uu CG to the network node 1106. The data transmission configuration 1108 may be for the UE 1102 to transmit a sidelink DG to the UE 1104 or a Uu DG to the network node 1106.

Where the network node 1106 schedules a PSSCH transmission from the UE 1102 to the UE 1104, the network node 1106 may transmit a data transmission configuration 1109 to the UE 1104. The UE 1104 may receive the data transmission configuration 1109. The data transmission configuration 1109 may be for a sidelink data transmission for the UE 1102 to transmit a PSSCH message to the UE 1104. The data transmission configuration 1109 may be a mode 1 RA message. The data transmission configuration 1109 may be for the UE 1102 to transmit a sidelink CG to the UE 1104. The data transmission configuration 1109 may be for the UE 1102 to transmit a sidelink DG to the UE 1104.

In another aspect, the UE 1104 may transmit a data transmission configuration 1107 to the UE 1102. The UE 1102 may receive the data transmission configuration 1107. The data transmission configuration 1107 may be for a sidelink data transmission for the UE 1102 to transmit a PSSCH message to the UE 1104. The data transmission configuration 1107 may be a mode 2 RA message. The data transmission configuration 1107 may be for the UE 1102 to transmit a sidelink CG to the UE 1104. The data transmission configuration 1107 may be for the UE 1102 to transmit a sidelink DG to the UE 1104.

The network node 1106 may transmit a non-data service signal configuration 1110 to the UE 1102. The UE 1102 may receive the non-data service signal configuration 1110. The non-data service signal configuration 1110 may be for the UE 1102 to transmit a set of positioning signals, for example a set of SRSs at a set of TRPs, to perform positioning. The non-data service signal configuration 1110 may be for the UE 1102 to transmit a set of RF sensing signals at a target object to perform sensing on the target object. The non-data service signal configuration 1110 may be for the UE 1102 to transmit a set of ambient-power device signals at an ambient-power device. The non-data service signal configuration 1110 may be for the UE 1102 to transmit a set of energy harvesting signals at an energy harvesting device. The non-data service signal configuration 1110 may be for the UE 1102 to perform a set of FL tasks, for example transmitting a set of FL results, receiving a set of FL inputs, or performing a FL calculation.

The network node 1106 may transmit a non-data service signal configuration 1111 to the UE 1104. The UE 1104 may receive the non-data service signal configuration 1111. The non-data service signal configuration 1111 may be for the UE 1102 to transmit a set of positioning signals, for example a set of SRSs at a set of TRPs, to perform positioning. The non-data service signal configuration 1111 may be for the UE 1102 to transmit a set of RF sensing signals at a target object to perform sensing on the target object. The non-data service signal configuration 1111 may be for the UE 1102 to transmit a set of ambient-power device signals at an ambient-power device. The non-data service signal configuration 1111 may be for the UE 1102 to transmit a set of energy harvesting signals at an energy harvesting device. The non-data service signal configuration 1111 may be for the UE 1102 to perform a set of FL tasks, for example transmitting a set of FL results, receiving a set of FL inputs, or performing a FL calculation.

The transmission of a scheduled data transmission and the transmission of a scheduled non-data service signal may be scheduled for the same time period. At 1112, the UE 1102 may determine a transmission priority for the data transmission and the non-data service signal. The UE 1102 may determine the transmission priority based on a configured set of parameters, for example an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The UE 1102 may determine the transmission priority using a table or a function based on one or more of the configured set of parameters. The UE 1102 may receive the table or function from the network node 1106, for example via an RRC message or a MAC-CE message.

In some aspects, the UE 1102 may determine to transmit the data transmission and not transmit the non-data service signal during the same time period. In other aspects, the UE 1102 may determine to transmit the non-data service signal and not transmit the data transmission during the same time period. In other aspects, the UE 1102 may determine that it may transmit both the data transmission and the non-data service signal during the same time period as there is enough of a gap between both transmissions within the same time period that the transmissions do not interfere with one another.

If the UE 1102 determines to transmit one transmission and not the other, the UE 1102 may transmit a priority indication 1114 to the UE 1104. The UE 1104 may receive the priority indication 1114 from the UE 1102. The priority indication 1114 may include an indication of whether or not the UE 1102 will transmit a data transmission to the UE 1104. The priority indication 1114 may include an indication of whether or not the UE 1102 will transmit a non-data service signal. The priority indication 1114 may include a set of parameters that may indicate to the UE 1104 a priority of a data transmission or a non-data service signal from the UE 1102. For example, the set of parameters may include an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The UE 1104 may use the set of parameters to determine whether the UE 1202 will transmit the data transmission or the non-data service signal, or may use the set of parameters to prioritize whether to decode the data transmission or the non-data service signal should one conflict with the other.

At 1116, the UE 1104 may determine the decoding priority for transmissions that the UE 1104 receives. For example, the UE 1104 may be scheduled to receive a data transmission and a non-data service signal (both from the UE 1102 or one from the UE 1102 and another from a different wireless device) during a same time period. In some aspects, the UE 1104 may be able to decode one, or the other, but not both during the same time period. The UE 1104 may prioritize decoding one of the received transmissions based on the priority indication 1114 received from the UE 1102.

If the UE 1102 determines to transmit one transmission and not the other, the UE 1102 may transmit a priority indication 1115 to the network node 1106. The network node 1106 may receive the priority indication 1115 from the UE 1102. The priority indication 1115 may include an indication of whether or not the UE 1102 will transmit a data transmission to the UE 1104 or to the network node 1106. The priority indication 1115 may include an indication of whether or not the UE 1102 will transmit a non-data service signal. The priority indication 1115 may include a set of parameters that may indicate to the network node 1106 a priority of a data transmission or a non-data service signal from the UE 1102.

At 1117, the network node 1106 may determine the decoding priority for transmissions from the UE 1102. For example, priority indication 1115 may indicate to the network node 1106 that the UE 1102 is not transmitting a scheduled non-data service signal, and the network node 1106 may then reschedule the non-data service signal for transmission by the UE 1102 during a different time period, or may reschedule the non-data service signal for transmission by a different wireless device. In another example, the priority indication 1115 may indicate to the network node that the UE 1102 is not transmitting a scheduled data transmission (e.g., a PSSCH CG), and the network node 1106 may reallocate those resources to another UE during that same time period.

The UE 1102 may transmit a set of transmissions 1118 at the UE 1104, a set of transmissions 1119 at the network node 1106, or to another entity (e.g., a sensing target device) based on the determined transmission priority at 1112. The UE 1104 may decode the set of transmissions 1118 based on the decoding priority determined at 1116. The network node 1106 may decode the set of transmissions 1119 based on the decoding priority determined at 1117.

Figure 12:
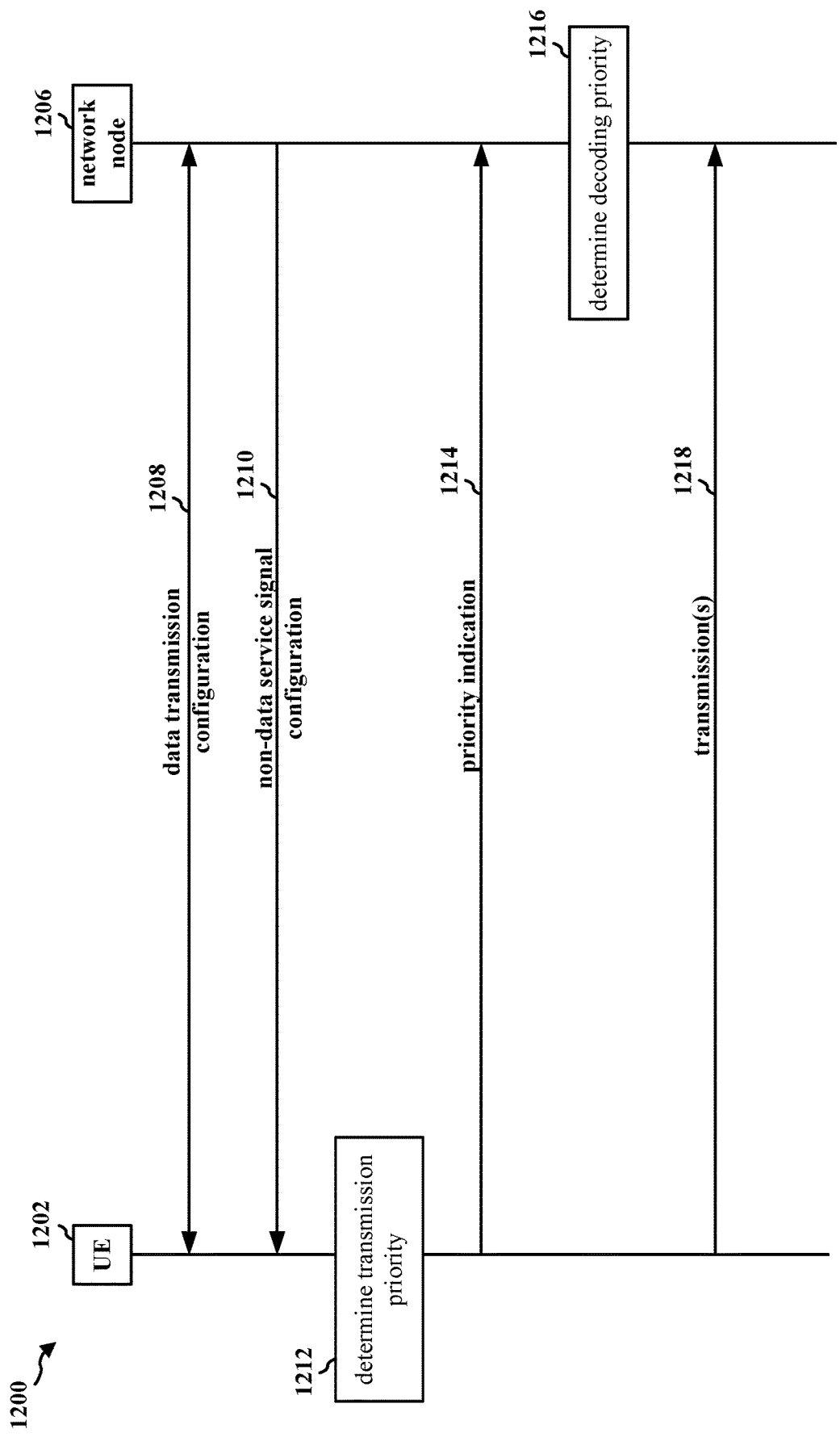
FIG. 12 is a connection flow diagram illustrating an example of a UE configured to resolve conflicts between a data transmission and a non-data service signal scheduled to be transmitted during a same time period.

FIG. 12 is a connection flow diagram 1200 illustrating an example of a UE 1202 configured to resolve conflicts between a data transmission to a network node 1206 and a non-data service signal scheduled to be transmitted during a same time period. The UE 1202 may be in sidelink communication with the network node 1206, or may communicate with the network node using a Uu link, for example via a PUSCH or a PSSCH message.

In some aspects, the network node 1206 may transmit a data transmission configuration 1208 to the UE 1202. The UE 1202 may receive the data transmission configuration 1208. The data transmission configuration 1208 may be for a sidelink data transmission for the UE 1202 to transmit a PSSCH message to the network node 1206 or for the UE 1202 to transmit a PUSCH message to the network node 1206. The data transmission configuration 1208 may be a mode 1 RA message. The data transmission configuration 1208 may be for a PUSCH transmission for the UE 1202 to transmit a PUSCH message to the network node 1206. The data transmission configuration 1208 may be for the UE 1202 to transmit a sidelink CG to the network node 1206 or a Uu CG to the network node 1206. The data transmission configuration 1208 may be for the UE 1202 to transmit a sidelink DG to the network node 1206 or a Uu DG to the network node 1206.

In another aspect, the UE 1202 may transmit a data transmission configuration 1208 to the network node 1206. The network node 1206 may receive the data transmission configuration 1208. The data transmission configuration 1208 may be for a sidelink data transmission for the UE 1202 to transmit a PSSCH message to the network node 1206. The data transmission configuration 1208 may be a mode 2 RA message. The data transmission configuration 1208 may be for the UE 1202 to transmit a sidelink CG to the network node 1206. The data transmission configuration 1208 may be for the UE 1202 to transmit a sidelink DG to the network node 1206.

The network node 1206 may transmit a non-data service signal configuration 1210 to the UE 1202. The UE 1202 may receive the non-data service signal configuration 1210. The non-data service signal configuration 1210 may be for the UE 1202 to transmit a set of positioning signals, for example a set of SRSs at a set of TRPs, to perform positioning. The non-data service signal configuration 1210 may be for the UE 1202 to transmit a set of RF sensing signals at a target object to perform sensing on the target object. The non-data service signal configuration 1210 may be for the UE 1202 to transmit a set of ambient-power device signals at an ambient-power device. The non-data service signal configuration 1210 may be for the UE 1202 to transmit a set of energy harvesting signals at an energy harvesting device. The non-data service signal configuration 1210 may be for the UE 1202 to perform a set of FL tasks, for example transmitting a set of FL results, receiving a set of FL inputs, or performing a FL calculation.

The transmission of a scheduled data transmission and the transmission of a scheduled non-data service signal may be scheduled for the same time period. At 1212, the UE 1202 may determine a transmission priority for the data transmission and the non-data service signal. The UE 1202 may determine the transmission priority based on a configured set of parameters, for example an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The UE 1202 may determine the transmission priority using a table or a function based on one or more of the configured set of parameters. The UE 1202 may receive the table or function from the network node 1206, for example via an RRC message or a MAC-CE message.

In some aspects, the UE 1202 may determine to transmit the data transmission and not transmit the non-data service signal during the same time period. In other aspects, the UE 1202 may determine to transmit the non-data service signal and not transmit the data transmission during the same time period. In other aspects, the UE 1202 may determine that it may transmit both the data transmission and the non-data service signal during the same time period as there is enough of a gap between both transmissions within the same time period that the transmissions do not interfere with one another.

If the UE 1202 determines to transmit one transmission and not the other, the UE 1202 may transmit a priority indication 1214 to the network node 1206. The network node 1206 may receive the priority indication 1214 from the UE 1202. The priority indication 1214 may include an indication of whether or not the UE 1202 will transmit a data transmission to the network node 1206. The priority indication 1214 may include an indication of whether or not the UE 1202 will transmit a non-data service signal. The priority indication 1214 may include a set of parameters that may indicate to the network node 1206 a priority of a data transmission or a non-data service signal from the UE 1202. For example, the set of parameters may include an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The network node 1206 may use the set of parameters to determine whether the UE 1202 will transmit the data transmission or the non-data service signal, or may use the set of parameters to prioritize whether to decode the data transmission or the non-data service signal should one conflict with the other.

At 1216, the network node 1206 may determine the decoding priority for transmissions that the network node 1206 receives. For example, the network node 1206 may be scheduled to receive a data transmission and a non-data service signal (both from the UE 1202 or one from the UE 1202 and another from a different wireless device) during a same time period. In some aspects, the network node 1206 may be able to decode one, or the other, but not both during the same time period. The network node 1206 may prioritize decoding one of the received transmissions based on the priority indication 1214 received from the UE 1202.

The UE 1202 may transmit a set of transmissions 1218 at the network node 1206 based on the determined transmission priority at 1212. The network node 1206 may decode the set of transmissions 1218 based on the decoding priority determined at 1216.

Figure 13:
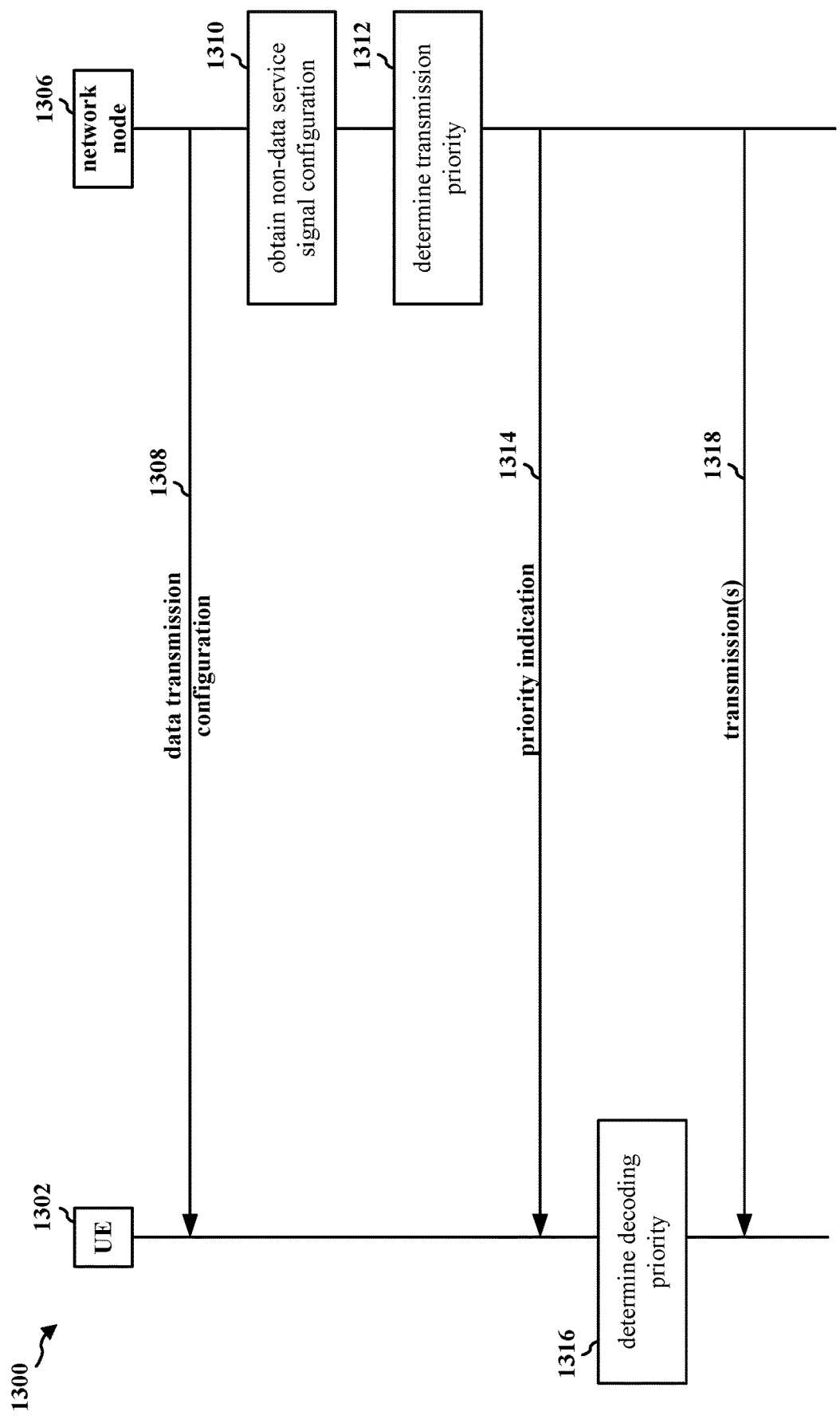
FIG. 13 is a connection flow diagram illustrating an example of a network node configured to resolve conflicts between a data transmission and a non-data service signal scheduled to be transmitted during a same time period.

FIG. 13 is a connection flow diagram 1300 illustrating an example of a network node configured to resolve conflicts between a data transmission to a UE 1302 and a non-data service signal scheduled to be transmitted during a same time period. The UE 1302 may be in sidelink communication with the network node 1306, or may communicate with the network node using a Uu link, for example via a PDSCH or a PSSCH message.

In some aspects, the network node 1306 may transmit a data transmission configuration 1308 to the UE 1302. The UE 1302 may receive the data transmission configuration 1308. The data transmission configuration 1308 may be for a sidelink data transmission for the network node 1306 to transmit a PSSCH message to the UE 1302 or for the network node 1306 to transmit a PDSCH message to UE 1302. The data transmission configuration 1308 may be a mode 1 RA message. The data transmission configuration 1308 may be for a PDSCH transmission for the network node 1306 to transmit a PDSCH message to the UE 1302. The data transmission configuration 1308 may be for the network node 1306 to transmit a sidelink CG to the UE 1302. The data transmission configuration 1308 may be for the network node 1306 to transmit a sidelink DG to the UE 1302.

At 1310, the network node 1306 may obtain a non-data service signal configuration. For example, the network node 1306 may configure the non-data service signal configuration. In another example, the network node 1306 may obtain the non-data service signal configuration from another network node or network entity via a backhaul connection. In another example, the network node 1306 may receive the non-data service signal configuration from another network node or network entity. The non-data service signal configuration obtained at 1310 may be for the network node 1306 to transmit a set of positioning signals, for example a set of PRSs at a set of UEs, to perform positioning. The non-data service signal configuration obtained at 1310 may be for the network node 1306 to transmit a set of RF sensing signals at a target object to perform sensing on the target object. The non-data service signal configuration obtained at 1310 may be for the network node 1306 to transmit a set of ambient-power device signals at an ambient-power device. The non-data service signal configuration obtained at 1310 may be for the network node 1306 to transmit a set of energy harvesting signals at an energy harvesting device. The non-data service signal configuration obtained at 1310 may be for the network node 1306 to perform a set of FL tasks, for example transmitting a set of FL results, receiving a set of FL inputs, or performing a FL calculation.

The transmission of a scheduled data transmission and the transmission of a scheduled non-data service signal may be scheduled for the same time period. At 1312, the network node 1306 may determine a transmission priority for the data transmission and the non-data service signal. The network node 1306 may determine the transmission priority based on a configured set of parameters, for example an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The network node 1306 may determine the transmission priority using a table or a function based on one or more of the configured set of parameters. The network node 1306 may obtain the table or function from another network node or a network entity, for example a core network or a location management function (LMF).

In some aspects, the network node 1306 may determine to transmit the data transmission and not transmit the non-data service signal during the same time period. In other aspects, the network node 1306 may determine to transmit the non-data service signal and not transmit the data transmission during the same time period. In other aspects, the network node 1306 may determine that it may transmit both the data transmission and the non-data service signal during the same time period as there is enough of a gap between both transmissions within the same time period that the transmissions do not interfere with one another.

If the network node 1306 determines to transmit one transmission and not the other, the network node 1306 may transmit a priority indication 1314 to the UE 1302. The UE 1302 may receive the priority indication 1314 from the network node 1306. The priority indication 1314 may include an indication of whether or not the network node 1306 will transmit a data transmission to the UE 1302. The priority indication 1314 may include an indication of whether or not the network node 1306 will transmit a non-data service signal. The priority indication 1314 may include a set of parameters that may indicate to the UE 1302 a priority of a data transmission or a non-data service signal from the network node 1306. For example, the set of parameters may include an L1 priority parameter associated with the data transmission, an L2 priority parameter associated with the data transmission, a QoS parameter associated with the data transmission, a remaining PDB parameter associated with the data transmission, an L1 priority parameter associated with the non-data service signal, an L2 priority parameter associated with the non-data service signal, a QoS parameter associated with the non-data service signal, and/or a remaining PDB parameter associated with the non-data service signal. The UE 1302 may use the set of parameters to determine whether the network node 1306 will transmit the data transmission or the non-data service signal, or may use the set of parameters to prioritize whether to decode the data transmission or the non-data service signal should one conflict with the other.

At 1316, the UE 1302 may determine the decoding priority for transmissions that the UE 1302 receives. For example, the UE 1302 may be scheduled to receive a data transmission and a non-data service signal (both from the network node 1306 or one from the network node 1306 and another from a different wireless device) during a same time period. In some aspects, the UE 1302 may be able to decode one, or the other, but not both during the same time period. The UE 1302 may prioritize decoding one of the received transmissions based on the priority indication 1314 received from the network node 1306.

The network node 1306 may transmit a set of transmissions 1318 at the UE 1302 based on the determined transmission priority at 1312. The UE 1302 may decode the set of transmissions 1318 based on the decoding priority determined at 1316.

Figure 14:
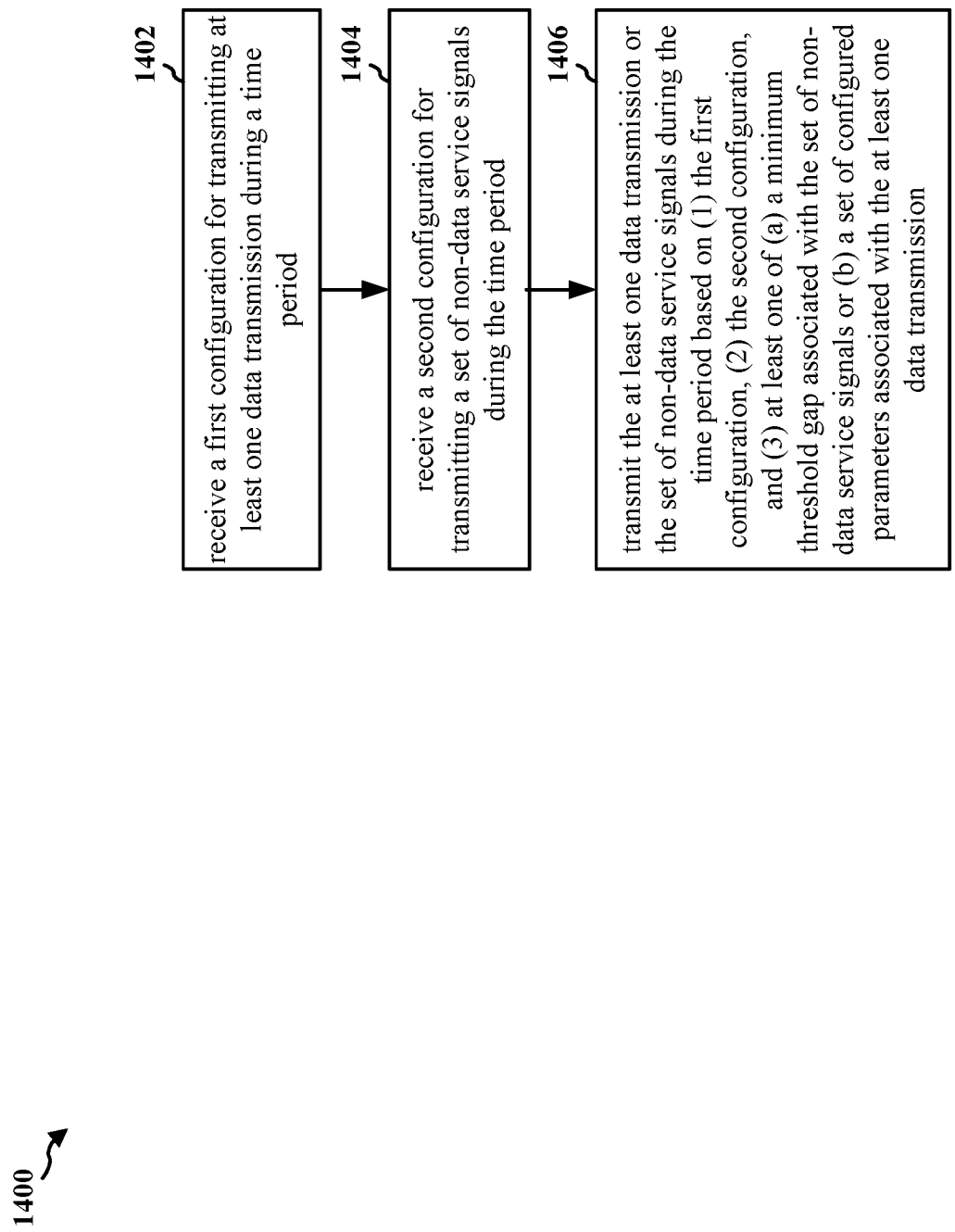
FIG. 14 is a flowchart of a method of wireless communication.

FIG. 14 is a flowchart 1400 of a method of wireless communication. The method may be performed by a wireless device (e.g., the UE 104, the UE 350, the UE 502, the UE 504, the UE 506, the UE 508, the UE 1102, the UE 1202; the wireless device 702, the wireless device 704, the wireless device 706, the wireless device 802, the wireless device 804, the wireless device 806, the wireless device 808; the RF transmitter 912; the RF receiver 914; the base station 102, the base station 310; the network node 1306; the apparatus 1804; the network entity 1902, the network entity 2060). At 1402, the wireless device may receive a first configuration for transmitting at least one data transmission during a time period. For example, 1402 may be performed by the UE 1102 in FIG. 11, which may receive a data transmission configuration 1108 from the network node 1106 or may receive a data transmission configuration 1109 from the UE 1104 for transmitting a data transmission during a time period. Moreover, 1402 may be performed by the component 198 in FIG. 1, 3, 18, 19, or 20.

At 1404, the wireless device may receive a second configuration for transmitting a set of non-data service signals during the time period. For example, 1404 may be performed by the UE 1102 in FIG. 11, which may receive a non-data service signal configuration 1110 from the network node 1106 for transmitting a set of non-data service signals during the same time period. Moreover, 1404 may be performed by the component 198 in FIG. 1, 3, 18, 19, or 20.

At 1406, the wireless device may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. For example, 1406 may be performed by the UE 1102 in FIG. 11, which may transmit the at least one data transmission or the set of non-data service signals during the time period based on (1) the data transmission configuration 1108 or the data transmission configuration 1109, (2) the non-data service signal configuration 1110, and (3) at least one of (a) the gap between the scheduled data transmission and the scheduled non-data service signal being greater or equal to a minimum threshold gap associated with the set of non-data service signals or (b) a set of parameters associated with the at least one data transmission indicating that the UE 1102 should prioritize either the data transmission or the non-data service signal over the other. Moreover, 1406 may be performed by the component 198 in FIG. 1, 3, 18, 19, or 20.

Figure 15:
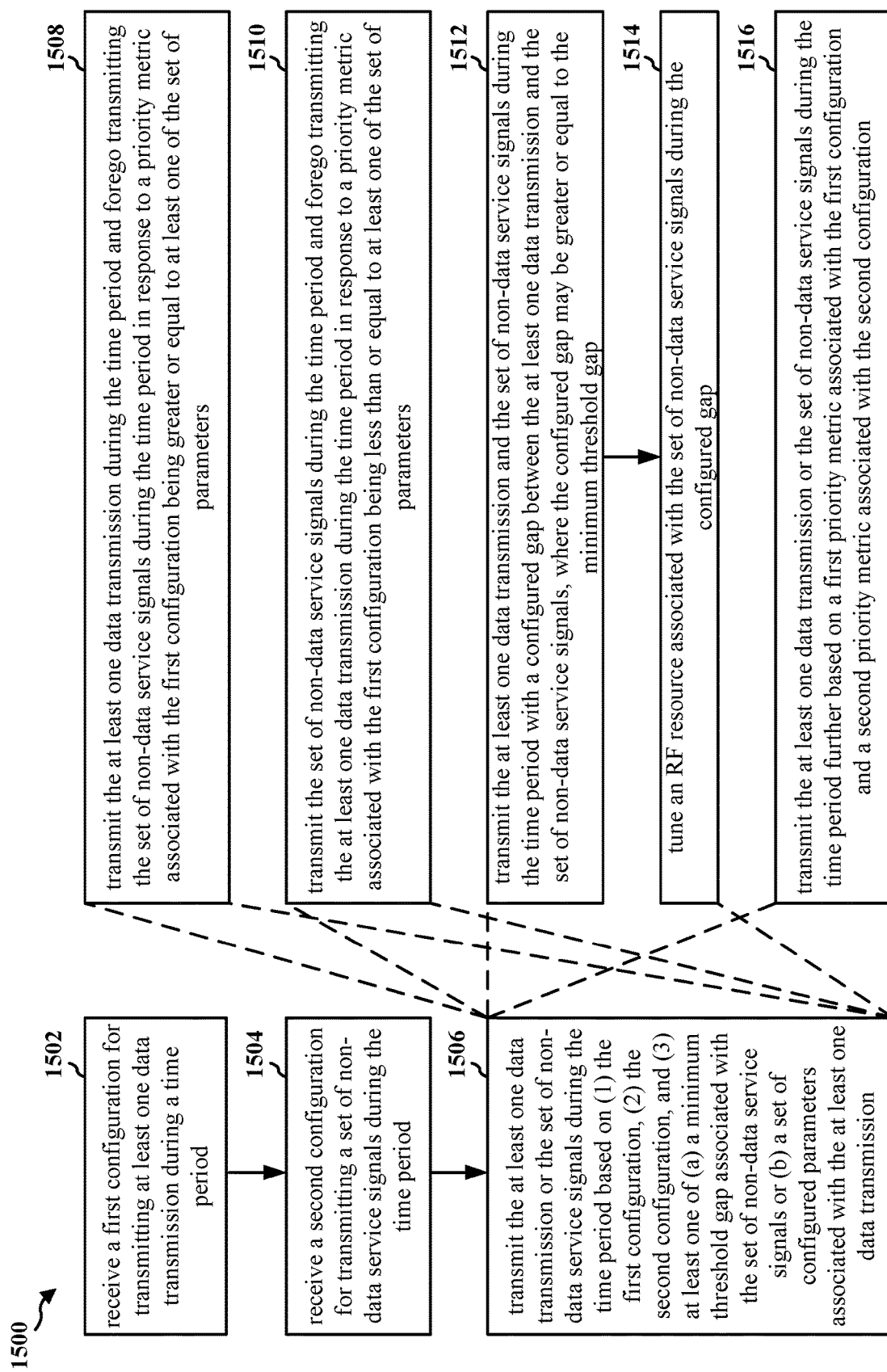
FIG. 15 is a flowchart of a method of wireless communication.

FIG. 15 is a flowchart 1500 of a method of wireless communication. The method may be performed by a wireless device (e.g., the UE 104, the UE 350, the UE 502, the UE 504, the UE 506, the UE 508, the UE 1102, the UE 1202; the wireless device 702, the wireless device 704, the wireless device 706, the wireless device 802, the wireless device 804, the wireless device 806, the wireless device 808; the RF transmitter 912; the RF receiver 914; the base station 102, the base station 310; the network node 1306; the apparatus 1804; the network entity 1902, the network entity 2060). At 1502, the wireless device may receive a first configuration for transmitting at least one data transmission during a time period. For example, 1502 may be performed by the UE 1102 in FIG. 11, which may receive a data transmission configuration 1108 from the network node 1106 or may receive a data transmission configuration 1109 from the UE 1104 for transmitting a data transmission during a time period. Moreover, 1502 may be performed by the component 198 in FIG. 1, 3, 18, 19, or 20.

At 1504, the wireless device may receive a second configuration for transmitting a set of non-data service signals during the time period. For example, 1504 may be performed by the UE 1102 in FIG. 11, which may receive a non-data service signal configuration 1110 from the network node 1106 for transmitting a set of non-data service signals during the same time period. Moreover, 1504 may be performed by the component 198 in FIG. 1, 3, 18, 19, or 20.

At 1506, the wireless device may transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. For example, 1506 may be performed by the UE 1102 in FIG. 11, which may transmit the at least one data transmission or the set of non-data service signals during the time period based on (1) the data transmission configuration 1108 or the data transmission configuration 1109, (2) the non-data service signal configuration 1110, and (3) at least one of (a) the gap between the scheduled data transmission and the scheduled non-data service signal being greater or equal to a minimum threshold gap associated with the set of non-data service signals or (b) a set of parameters associated with the at least one data transmission indicating that the UE 1102 should prioritize either the data transmission or the non-data service signal over the other. Moreover, 1506 may be performed by the component 198 in FIG. 1, 3, 18, 19, or 20.

At 1508, the wireless device may transmit the at least one data transmission during the time period and forego transmitting the set of non-data service signals during the time period in response to a priority metric associated with the first configuration being greater or equal to at least one of the set of parameters. For example, 1508 may be performed by the UE 1102 in FIG. 11, which may transmit the at least one data transmission as the set of transmissions 1118 during the time period and forego transmitting the set of non-data service signals during the time period that the set of transmissions 1118 are transmitted in response to a priority metric associated with the first configuration (e.g., a priority parameter) being greater or equal to at least one of the set of parameters (e.g., a L1 priority parameter). Moreover, 1508 may be performed by the component 198 in FIG. 1, 3, 18, 19, or 20.

At 1510, the wireless device may transmit the set of non-data service signals during the time period and forego transmitting the at least one data transmission during the time period in response to a priority metric associated with the first configuration being less than or equal to at least one of the set of parameters. For example, 1510 may be performed by the UE 1102 in FIG. 11, which may transmit the set of non-data service signals as the set of transmissions 1118 during the time period and forego transmitting the at least one data transmission during the time period that the set of transmissions 1118 are transmitted in response to a priority metric associated with the first configuration (e.g., a L1 priority) being less than or equal to at least one of the set of parameters (e.g., a L1 priority parameter). Moreover, 1510 may be performed by the component 198 in FIG. 1, 3, 18, 19, or 20.

At 1512, the wireless device may transmit the at least one data transmission and the set of non-data service signals during the time period with a configured gap between the at least one data transmission and the set of non-data service signals, where the configured gap may be greater or equal to the minimum threshold gap. For example, 1512 may be performed by the UE 1102 in FIG. 11, which may transmit the at least one data transmission and the set of non-data service signals as the set of transmissions 1118 during the time period with a configured gap between the at least one data transmission and the set of non-data service signals. The configured gap may be greater or equal to the minimum threshold gap indicated in the non-data service signal configuration 1110. Moreover, 1512 may be performed by the component 198 in FIG. 1, 3, 18, 19, or 20.

At 1514, the wireless device may tune an RF resource associated with the set of non-data service signals during the configured gap. For example, 1514 may be performed by the UE 1102 in FIG. 11, which may tune an RF resource associated with the set of non-data service signals during the configured gap to compensate for the different RF resources used to transmit the at least one data transmission and the set of non-data service signals. Moreover, 1514 may be performed by the component 198 in FIG. 1, 3, 18, 19, or 20.

At 1516, the wireless device may transmit the at least one data transmission or the set of non-data service signals during the time period further based on a first priority metric associated with the first configuration and a second priority metric associated with the second configuration. For example, 1516 may be performed by the UE 1102 in FIG. 11, which may transmit the at least one data transmission or the set of non-data service signals during the time period further based on a first priority metric associated with the first configuration and a second priority metric associated with the second configuration. The UE 1102 may transmit the at least one data transmission and forego transmitting the set of non-data service signals during the time period in response to the first priority metric being greater than or equal to the second priority metric, or may transmit the set of non-data service signals and forego transmitting the at least one data transmission during the time period in response to the second priority metric being greater than or equal to the first priority metric. Moreover, 1516 may be performed by the component 198 in FIG. 1, 3, 18, 19, or 20.

Figure 16:
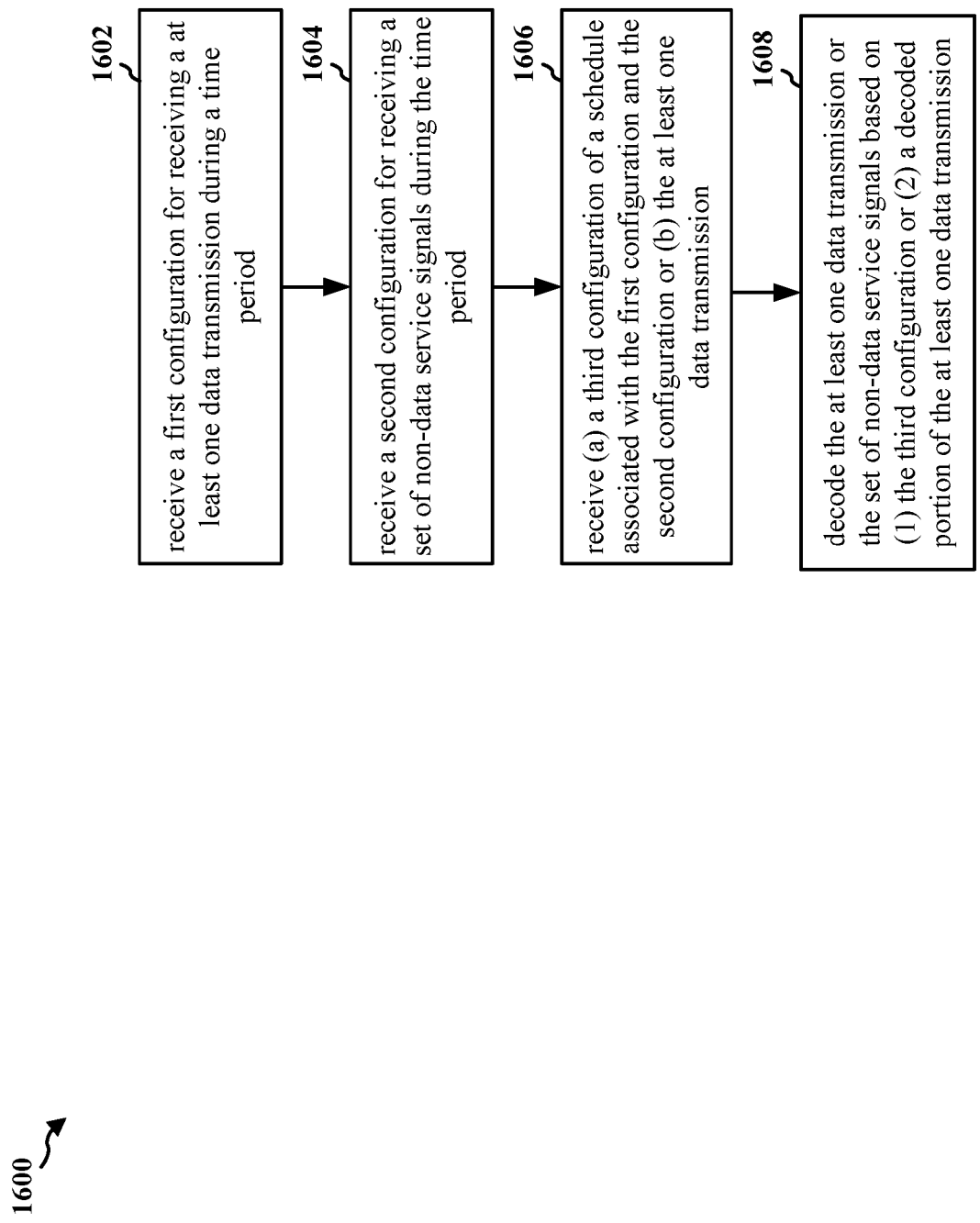
FIG. 16 is a flowchart of a method of wireless communication.

FIG. 16 is a flowchart 1600 of a method of wireless communication. The method may be performed by a UE (e.g., the UE 104, the UE 350, the UE 502, the UE 504, the UE 506, the UE 508, the UE 1104, the UE 1302; the wireless device 704, the wireless device 802, the wireless device 804, the wireless device 806, the wireless device 808; the RF transmitter 912; the RF receiver 914; the base station 102, the base station 310; the network node 1206; the apparatus 1804; the network entity 1902, the network entity 2060). At 1602, the UE may receive a first configuration for receiving at least one data transmission during a time period. For example, 1602 may be performed by the UE 1104 in FIG. 11, which may receive the data transmission configuration 1109 for receiving at least one data transmission during a time period. Moreover, 1602 may be performed by the component 199 in FIG. 1, 3, 18, 19, or 20.

At 1604, the UE may receive a second configuration for receiving a set of non-data service signals during the time period. For example, 1604 may be performed by the UE 1104 in FIG. 11, which may receive the non-data service signal configuration 1111 for receiving a set of non-data service signals during the same time period. Moreover, 1604 may be performed by the component 199 in FIG. 1, 3, 18, 19, or 20.

At 1606, the UE may receive (a) a third configuration of a schedule associated with the first configuration and the second configuration or (b) the at least one data transmission. For example, 1606 may be performed by the UE 1104 in FIG. 11, which may receive (a) the priority indication 1114 from the UE 1102, where the priority indication 1114 indicates a configuration of a schedule of whether the UE 1102 is transmitting the at least one data transmission and not the set of non-data service signals, is transmission the set of non-data service signals and not the at least one data transmission, or is transmitting both the at least one data transmission and the set of non-data service signals during the time period or (b) the at least one data transmission from the UE 1102 as the set of transmissions 1118. Moreover, 1606 may be performed by the component 199 in FIG. 1, 3, 18, 19, or 20.

At 1608, the UE may decode the at least one data transmission or the set of non-data service signals based on (1) the third configuration or (2) a decoded portion of the at least one data transmission. For example, 1608 may be performed by the UE 1104 in FIG. 11, which may decode the at least one data transmission or the set of non-data service signals based on (1) the priority indication 1114 or (2) a decoded portion of the at least one data transmission, which influences how the UE 1104 prioritizes decoding the at least one data transmission or the set of non-data service signals at 1116. Moreover, 1608 may be performed by the component 198 in FIG. 1, 3, 18, 19, or 20.

Figure 17:
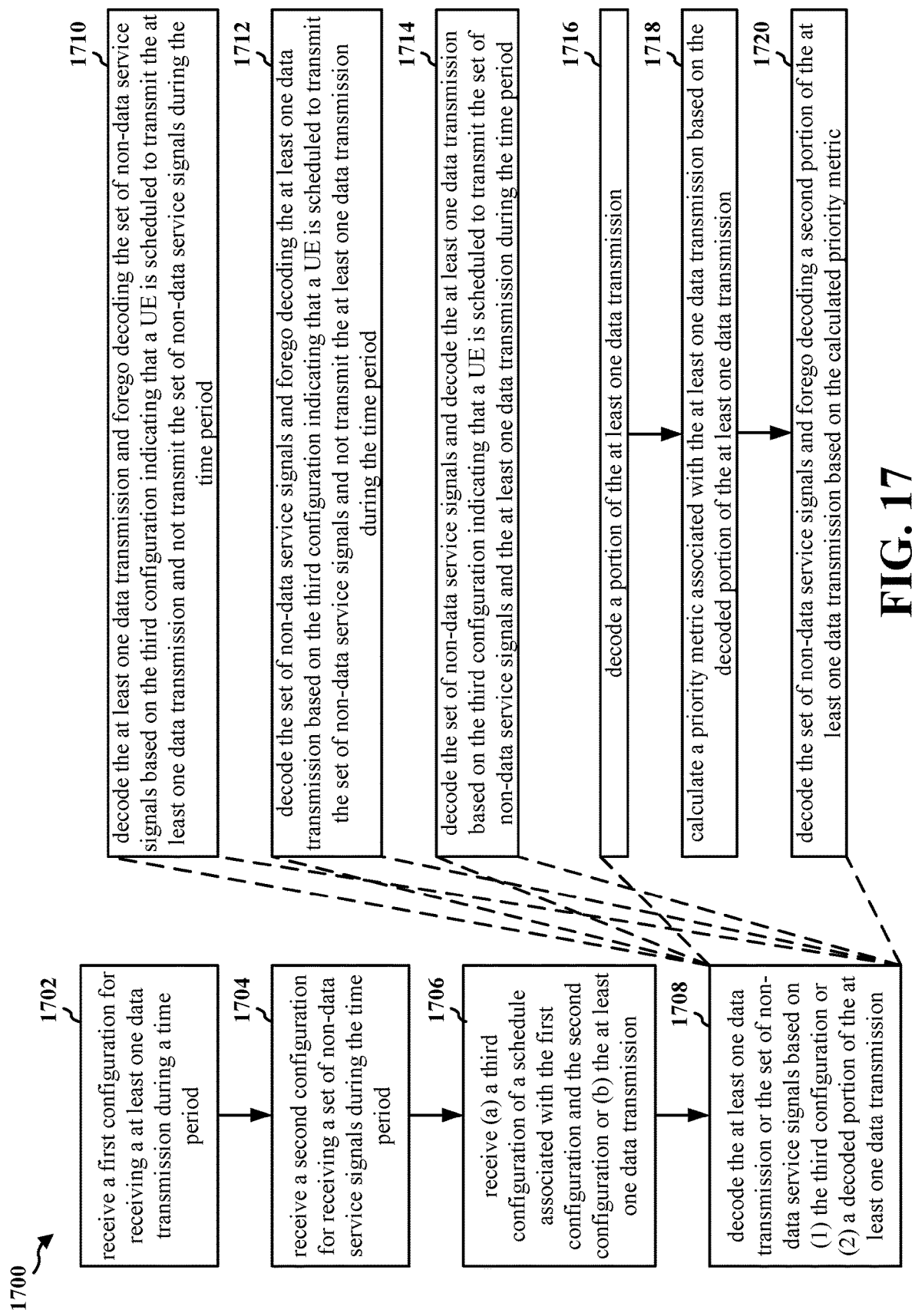
FIG. 17 is a flowchart of a method of wireless communication.

FIG. 17 is a flowchart 1700 of a method of wireless communication. The method may be performed by a UE (e.g., the UE 104, the UE 350, the UE 502, the UE 504, the UE 506, the UE 508, the UE 1104, the UE 1302; the wireless device 704, the wireless device 802, the wireless device 804, the wireless device 806, the wireless device 808; the RF transmitter 912; the RF receiver 914; the base station 102, the base station 310; the network node 1206; the apparatus 1804; the network entity 1902, the network entity 2060). At 1702, the UE may receive a first configuration for receiving at least one data transmission during a time period. For example, 1702 may be performed by the UE 1104 in FIG. 11, which may receive the data transmission configuration 1109 for receiving at least one data transmission during a time period. Moreover, 1702 may be performed by the component 199 in FIG. 1, 3, 18, 19, or 20.

At 1704, the UE may receive a second configuration for receiving a set of non-data service signals during the time period. For example, 1704 may be performed by the UE 1104 in FIG. 11, which may receive the non-data service signal configuration 1111 for receiving a set of non-data service signals during the same time period. Moreover, 1704 may be performed by the component 199 in FIG. 1, 3, 18, 19, or 20. At 1706, the UE may receive (a) a third configuration of a schedule associated with the first configuration and the second configuration or (b) the at least one data transmission. For example, 1706 may be performed by the UE 1104 in FIG. 11, which may receive (a) the priority indication 1114 from the UE 1102, where the priority indication 1114 indicates a configuration of a schedule of whether the UE 1102 is transmitting the at least one data transmission and not the set of non-data service signals, is transmission the set of non-data service signals and not the at least one data transmission, or is transmitting both the at least one data transmission and the set of non-data service signals during the time period or (b) the at least one data transmission from the UE 1102 as the set of transmissions 1118. Moreover, 1706 may be performed by the component 199 in FIG. 1, 3, 18, 19, or 20.

At 1708, the UE may decode the at least one data transmission or the set of non-data service signals based on (1) the third configuration or (2) a decoded portion of the at least one data transmission. For example, 1708 may be performed by the UE 1104 in FIG. 11, which may decode the at least one data transmission or the set of non-data service signals based on (1) the priority indication 1114 or (2) a decoded portion of the at least one data transmission, which influences how the UE 1104 prioritizes decoding the at least one data transmission or the set of non-data service signals at 1116. Moreover, 1708 may be performed by the component 198 in FIG. 1, 3, 18, 19, or 20.

At 1710, the UE may decode the at least one data transmission and forego decoding the set of non-data service signals based on the third configuration indicating that a UE is scheduled to transmit the at least one data transmission and not transmit the set of non-data service signals during the time period. For example, 1710 may be performed by the UE 1104 in FIG. 11, which may decode the at least one data transmission and forego decoding the set of non-data service signals of the set of transmissions 1118 based on the priority indication 1114 indicating that the UE 1102 is scheduled to transmit the at least one data transmission and not transmit the set of non-data service signals during the time period. Moreover, 1710 may be performed by the component 198 in FIG. 1, 3, 18, 19, or 20.

At 1712, the UE may decode the set of non-data service signals and forego decoding the at least one data transmission based on the third configuration indicating that a UE is scheduled to transmit the set of non-data service signals and not transmit the at least one data transmission during the time period. For example, 1712 may be performed by the UE 1104 in FIG. 11, which may decode the set of non-data service signals and forego decoding the at least one data transmission of the set of transmissions 1118 based on the priority indication 1114 indicating that a UE 1102 is scheduled to transmit the set of non-data service signals and not transmit the at least one data transmission during the time period. Moreover, 1712 may be performed by the component 198 in FIG. 1, 3, 18, 19, or 20.

At 1714, the UE may decode the set of non-data service signals and decode the at least one data transmission based on the third configuration indicating that a UE is scheduled to transmit the set of non-data service signals and the at least one data transmission during the time period. For example, 1714 may be performed by the UE 1104 in FIG. 11, which may decode the set of non-data service signals and decode the at least one data transmission of the set of transmissions 1118 based on the priority indication 1114 indicating that the UE 1102 is scheduled to transmit both the set of non-data service signals and the at least one data transmission during the same time period as the set of transmissions 1118. Moreover, 1714 may be performed by the component 198 in FIG. 1, 3, 18, 19, or 20.

At 1716, the UE may decode a portion of the at least one data transmission. For example, 1716 may be performed by the UE 1104 in FIG. 11, which may decode a portion of the at least one data transmission, such as the SCI-1 or the SCI-2 of a PSSCH. Moreover, 1716 may be performed by the component 198 in FIG. 1, 3, 18, 19, or 20.

At 1718, the UE may calculate a priority metric associated with the at least one data transmission based on the decoded portion of the at least one data transmission. For example, 1718 may be performed by the UE 1104 in FIG. 11, which may calculate a priority metric (e.g., a QoS) associated with the at least one data transmission based on the decoded portion of the at least one data transmission. Moreover, 1718 may be performed by the component 198 in FIG. 1, 3, 18, 19, or 20.

At 1720, the UE may decode the set of non-data service signals and forego decoding a second portion of the at least one data transmission based on the calculated priority metric. For example, 1720 may be performed by the UE 1104 in FIG. 11, which may decode the set of non-data service signals and forego decoding a second portion of the at least one data transmission based on the calculated priority metric. Moreover, 1720 may be performed by the component 198 in FIG. 1, 3, 18, 19, or 20.

Figure 18:
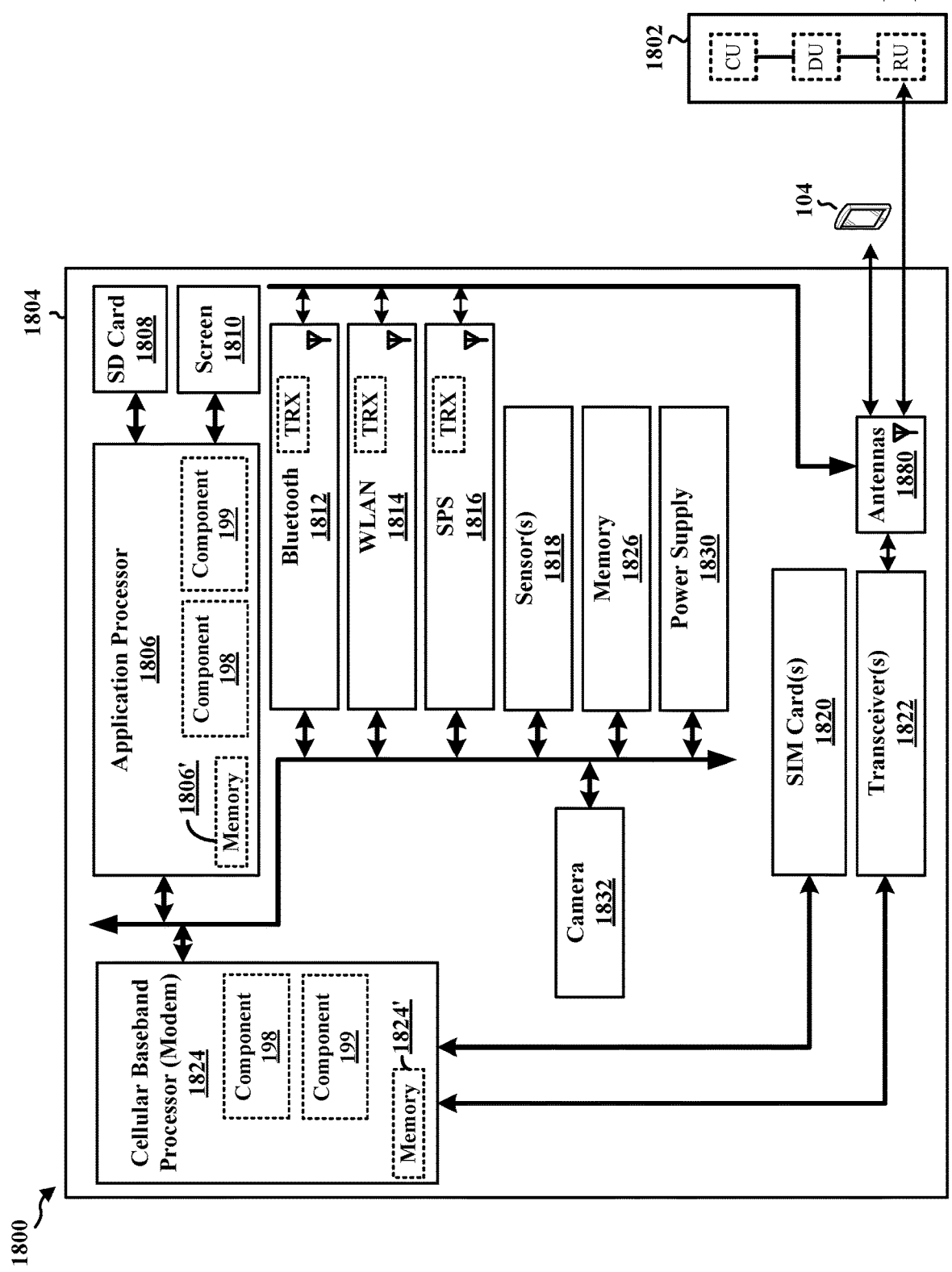
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1204 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see UE 350 of FIG. 3) and include the additional modules of the apparatus 1804.

As discussed supra, the component 198 may be configured to receive a first configuration for transmitting at least one data transmission during a time period. The component 198 may be configured to receive a second configuration for transmitting a set of non-data service signals during the time period. The component 198 may be configured to transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. The component 198 may be within the cellular baseband processor 1824, the application processor 1806, or both the cellular baseband processor 1824 and the application processor 1806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, may include means for receiving a first configuration for transmitting at least one data transmission during a time period. The apparatus 1804 may include means for receiving a second configuration for transmitting a set of non-data service signals during the time period. The apparatus 1804 may include means for transmitting the at least one data transmission or the set of non-data service signals during the time period based on the first configuration. The apparatus 1804 may include means for transmitting the at least one data transmission or the set of non-data service signals during the time period based on the second configuration. The apparatus 1804 may include means for transmitting the at least one data transmission or the set of non-data service signals during the time period based on a minimum threshold gap associated with the set of non-data service signals. The apparatus 1804 may include means for transmitting the at least one data transmission or the set of non-data service signals during the time period based on a set of parameters associated with the at least one data transmission. The at least one data transmission may include at least one of (a) a PSSCH message, (b) a PUSCH message, (c) a CG, or (d) a DG. The at least one data transmission may include at least one sidelink data transmission for a second UE, a programmable logic controller, or a network entity configured to communicate with the apparatus 1804 via a sidelink interface. The set of non-data service signals may include at least one of (a) a set of positioning signals, (b) a set of RF sensing signals, (c) a set of ambient-power device signals, (d) a set of federated learning signals, or (e) a set of energy harvesting signals. The configured set of parameters may include at least one of (a) an L1 priority parameter, (b) an L2 priority parameter, (c) a QoS parameter, or (d) a remaining PDB parameter. The apparatus 1804 may include means for transmitting the at least one data transmission or the set of non-data service signals during the time period by transmitting the at least one data transmission during the time period and foregoing transmitting the set of non-data service signals during the time period in response to a priority metric associated with the first configuration being greater or equal to at least one of the set of parameters. The apparatus 1804 may include means for transmitting the at least one data transmission or the set of non-data service signals during the time period by transmitting the set of non-data service signals during the time period and foregoing transmitting the at least one data transmission during the time period in response to a priority metric associated with the first configuration being less than or equal to at least one of the set of parameters. The apparatus 1804 may include means for transmitting the at least one data transmission or the set of non-data service signals during the time period by transmitting the at least one data transmission and the set of non-data service signals during the time period with a configured gap between the at least one data transmission and the set of non-data service signals. The configured gap may be greater or equal to the minimum threshold gap. The apparatus 1804 may include means for tuning an RF resource associated with the set of non-data service signals during the configured gap. The apparatus 1804 may include means for transmitting the at least one data transmission or the set of non-data service signals during the time period by transmitting the at least one data transmission or the set of non-data service signals during the time period further based on a first priority metric associated with the first configuration and a second priority metric associated with the second configuration. The apparatus 1804 may include means for receiving a third configuration for transmitting a second set of non-data service signals during the time period. The apparatus 1804 may include means for transmitting the set of non-data service signals or the second set of non-data service signals during the time period based on a first priority metric associated with the second configuration and a second priority metric associated with the third configuration. The apparatus 1804 may include means for receiving the first configuration by receiving a DG to transmit the at least one data transmission during the time period. The apparatus 1804 may include means for transmitting the at least one data transmission or the set of non-data service signals during the time period by foregoing transmitting the set of non-data service signals in response to receiving the DG to transmit the at least one data transmission during the time period. The apparatus 1804 may include means for receiving the first configuration by receiving DCI including the DG and an indication to forego transmitting the set of non-data service signals during the time period. The apparatus 1804 may include means for transmitting the at least one data transmission or the set of non-data service signals during the time period by foregoing transmitting the set of non-data service signals in response to receiving the indication to forego transmitting the set of non-data service signals. The apparatus 1804 may include means for transmitting the at least one data transmission or the set of non-data service signals during the time period by transmitting the set of non-data service signals during the time period and foregoing transmitting the at least one data transmission during the time period. The apparatus 1804 may include means for transmitting an indication that the apparatus 1804 is unable to communicate with a wireless entity during the time period. The indication that the apparatus 1804 is unable to communicate with the wireless entity may include at least one of: (a) a first indication that the apparatus 1804 is unable to transmit any data transmissions during the time period, (b) a second indication that the apparatus 1804 is unable to receive any data transmissions during the time period, (c) a third indication that the apparatus 1804 is unable to transmit any other non-data service signals during the time period, or (d) a fourth indication that the apparatus 1804 is unable to receive any other non-data service signals during the time period. The apparatus 1804 may include means for transmitting the indication that the apparatus 1804 is unable to communicate with the wireless entity during the time period by transmitting a broadcast message or a groupcast message including the indication that the apparatus 1804 is unable to communicate with the wireless entity during the time period. The apparatus 1804 may include means for transmitting a sidelink message to a second UE including a third configuration for transmitting the at least one data transmission or the set of non-data service signals during the time period. The third configuration may include a priority metric. The means may be the component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means. As discussed supra, the component 199 may be configured to receive a first configuration for receiving at least one data transmission during a time period. The component 199 may be configured to receive a second configuration for receiving a set of non-data service signals during the time period. The component 199 may be configured to receive (a) a third configuration of a schedule associated with the first configuration and the second configuration or (b) the at least one data transmission. The component 199 may be configured to decode the at least one data transmission or the set of non-data service signals based on (1) the third configuration or (2) a decoded portion of the at least one data transmission. The component 199 may be within the cellular baseband processor 1824, the application processor 1806, or both the cellular baseband processor 1824 and the application processor 1806. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, may include means for receiving a first configuration for receiving at least one data transmission during a time period. The apparatus 1804 may include means for receiving a second configuration for receiving a set of non-data service signals during the time period. The apparatus 1804 may include means for receiving a third configuration of a schedule associated with the first configuration and the second configuration. The apparatus 1804 may include means for receiving the at least one data transmission. The apparatus 1804 may include means for decoding the at least one data transmission or the set of non-data service signals based on the third configuration. The apparatus 1804 may include means for decoding the at least one data transmission or the set of non-data service signals based on a decoded portion of the at least one data transmission. The at least one data transmission may include at least one of (a) a PSSCH message, (b) a PUSCH message, (c) a CG, or (d) a DG. The at least one data transmission may include at least one sidelink data transmission from at least one of a second UE, a PLC, or a network entity configured to communicate with the apparatus 1804 via a sidelink interface. The set of non-data service signals may include at least one of (a) a set of positioning signals, (b) a set of ambient-power device signals, (d) a set of federated learning signals, or (e) a set of energy harvesting signals. A configured set of parameters associated with the at least one data transmission may include at least one of (a) an L1 priority parameter, (b) an L2 priority parameter, (c) a QoS parameter, or (d) a remaining PDB parameter. The apparatus 1804 may include means for decoding the at least one data transmission or the set of non-data service signals by decoding the at least one data transmission and foregoing decoding the set of non-data service signals based on the third configuration indicating that a second UE is scheduled to transmit the at least one data transmission and not transmit the set of non-data service signals during the time period. The apparatus 1804 may include means for decoding the at least one data transmission or the set of non-data service signals by decoding the set of non-data service signals and foregoing decoding the at least one data transmission based on the third configuration indicating that a second UE is scheduled to transmit the set of non-data service signals and not transmit the at least one data transmission during the time period. The apparatus 1804 may include means for decoding the at least one data transmission or the set of non-data service signals by decoding the set of non-data service signals and decoding the at least one data transmission based on the third configuration indicating that a second UE is scheduled to transmit the set of non-data service signals and the at least one data transmission during the time period. The apparatus 1804 may include means for decoding the at least one data transmission or the set of non-data service signals by decoding a portion of the at least one data transmission. The apparatus 1804 may include means for decoding the at least one data transmission or the set of non-data service signals by calculating a priority metric associated with the at least one data transmission based on the decoded portion of the at least one data transmission. The apparatus 1804 may include means for decoding the at least one data transmission or the set of non-data service signals by decoding the set of non-data service signals and foregoing decoding a second portion of the at least one data transmission based on the calculated priority metric. The apparatus 1804 may include means for receiving a table from a network node including a set of configured thresholds. The apparatus 1804 may include means for decoding the set of non-data service signals and foregoing decoding the second portion of the at least one data transmission based on the calculated priority metric by decoding the set of non-data service signals and foregoing decoding the second portion of the at least one data transmission in response to the calculated priority metric being less than or equal to at least one of the set of configured thresholds. The means may be the component 199 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
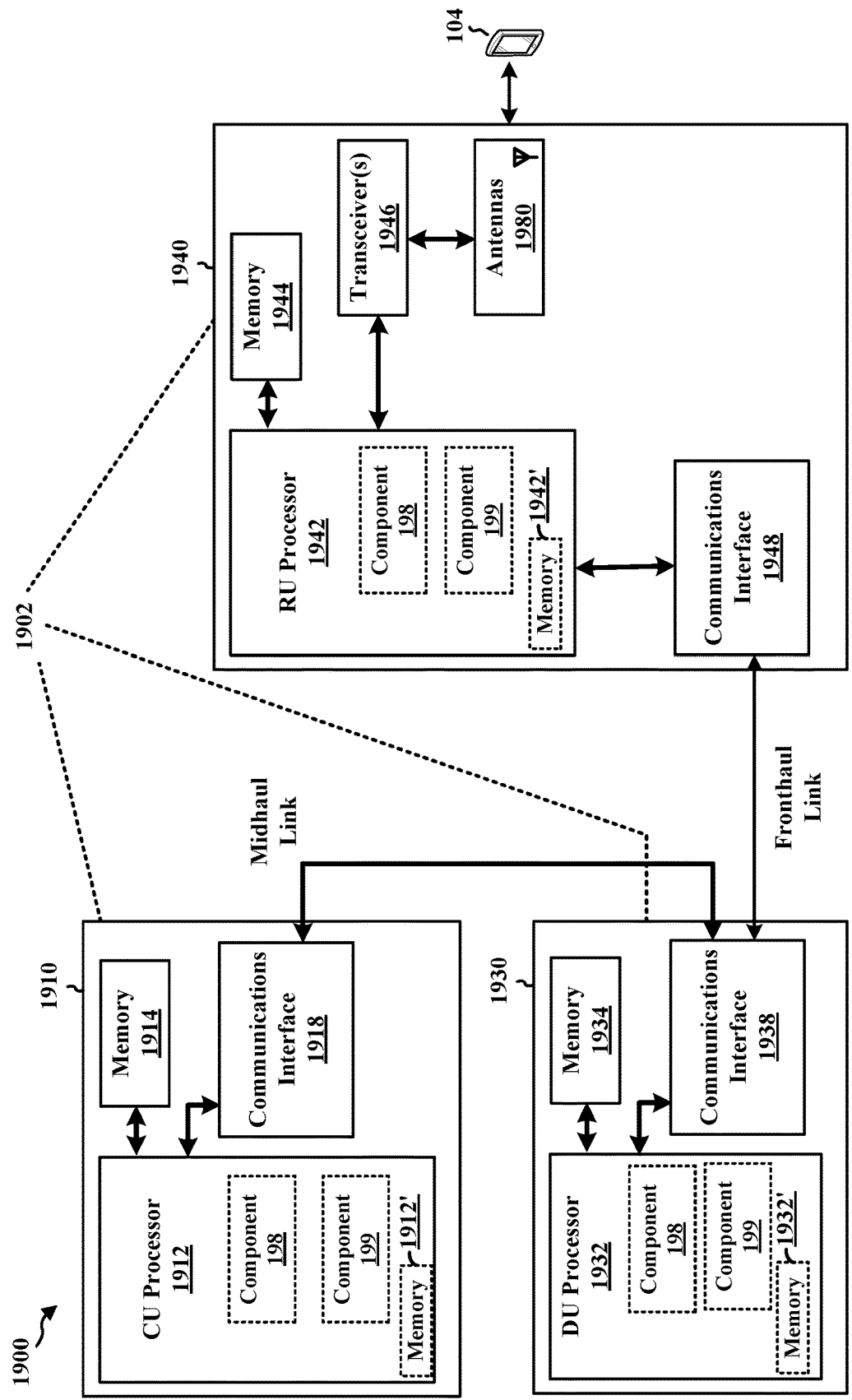
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a first configuration for transmitting at least one data transmission during a time period. The component 198 may be configured to receive a second configuration for transmitting a set of non-data service signals during the time period. The component 198 may be configured to transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. The component 198 may be within one or more processors of one or more of the CU 1910, DU 1930, and the RU 1940. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 may include means for receiving a first configuration for transmitting at least one data transmission during a time period. The network entity 1902 may include means for receiving a second configuration for transmitting a set of non-data service signals during the time period. The network entity 1902 may include means for transmitting the at least one data transmission or the set of non-data service signals during the time period based on the first configuration. The network entity 1902 may include means for transmitting the at least one data transmission or the set of non-data service signals during the time period based on the second configuration. The network entity 1902 may include means for transmitting the at least one data transmission or the set of non-data service signals during the time period based on a minimum threshold gap associated with the set of non-data service signals. The network entity 1902 may include means for transmitting the at least one data transmission or the set of non-data service signals during the time period based on a set of parameters associated with the at least one data transmission. The at least one data transmission may include at least one of (a) a PSSCH message, (b) a PUSCH message, (c) a CG, or (d) a DG. The at least one data transmission may include at least one sidelink data transmission for a second UE, a programmable logic controller, or a network entity configured to communicate with the network entity 1902 via a sidelink interface. The set of non-data service signals may include at least one of (a) a set of positioning signals, (b) a set of RF sensing signals, (c) a set of ambient-power device signals, (d) a set of federated learning signals, or (e) a set of energy harvesting signals. The configured set of parameters may include at least one of (a) an L1 priority parameter, (b) an L2 priority parameter, (c) a QoS parameter, or (d) a remaining PDB parameter. The network entity 1902 may include means for transmitting the at least one data transmission or the set of non-data service signals during the time period by transmitting the at least one data transmission during the time period and foregoing transmitting the set of non-data service signals during the time period in response to a priority metric associated with the first configuration being greater or equal to at least one of the set of parameters. The network entity 1902 may include means for transmitting the at least one data transmission or the set of non-data service signals during the time period by transmitting the set of non-data service signals during the time period and foregoing transmitting the at least one data transmission during the time period in response to a priority metric associated with the first configuration being less than or equal to at least one of the set of parameters. The network entity 1902 may include means for transmitting the at least one data transmission or the set of non-data service signals during the time period by transmitting the at least one data transmission and the set of non-data service signals during the time period with a configured gap between the at least one data transmission and the set of non-data service signals. The configured gap may be greater or equal to the minimum threshold gap. The network entity 1902 may include means for tuning an RF resource associated with the set of non-data service signals during the configured gap. The network entity 1902 may include means for transmitting the at least one data transmission or the set of non-data service signals during the time period by transmitting the at least one data transmission or the set of non-data service signals during the time period further based on a first priority metric associated with the first configuration and a second priority metric associated with the second configuration. The network entity 1902 may include means for receiving a third configuration for transmitting a second set of non-data service signals during the time period. The network entity 1902 may include means for transmitting the set of non-data service signals or the second set of non-data service signals during the time period based on a first priority metric associated with the second configuration and a second priority metric associated with the third configuration. The network entity 1902 may include means for receiving the first configuration by receiving a DG to transmit the at least one data transmission during the time period. The network entity 1902 may include means for transmitting the at least one data transmission or the set of non-data service signals during the time period by foregoing transmitting the set of non-data service signals in response to receiving the DG to transmit the at least one data transmission during the time period. The network entity 1902 may include means for receiving the first configuration by receiving DCI including the DG and an indication to forego transmitting the set of non-data service signals during the time period. The network entity 1902 may include means for transmitting the at least one data transmission or the set of non-data service signals during the time period by foregoing transmitting the set of non-data service signals in response to receiving the indication to forego transmitting the set of non-data service signals. The network entity 1902 may include means for transmitting the at least one data transmission or the set of non-data service signals during the time period by transmitting the set of non-data service signals during the time period and foregoing transmitting the at least one data transmission during the time period. The network entity 1902 may include means for transmitting an indication that the network entity 1902 is unable to communicate with a wireless entity during the time period. The indication that the network entity 1902 is unable to communicate with the wireless entity may include at least one of: (a) a first indication that the network entity 1902 is unable to transmit any data transmissions during the time period, (b) a second indication that the network entity 1902 is unable to receive any data transmissions during the time period, (c) a third indication that the network entity 1902 is unable to transmit any other non-data service signals during the time period, or (d) a fourth indication that the network entity 1902 is unable to receive any other non-data service signals during the time period. The network entity 1902 may include means for transmitting the indication that the network entity 1902 is unable to communicate with the wireless entity during the time period by transmitting a broadcast message or a groupcast message including the indication that the network entity 1902 is unable to communicate with the wireless entity during the time period. The network entity 1902 may include means for transmitting a sidelink message to a second UE including a third configuration for transmitting the at least one data transmission or the set of non-data service signals during the time period. The third configuration may include a priority metric. The means may be the component 198 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to receive a first configuration for receiving at least one data transmission during a time period. The component 199 may be configured to receive a second configuration for receiving a set of non-data service signals during the time period. The component 199 may be configured to receive (a) a third configuration of a schedule associated with the first configuration and the second configuration or (b) the at least one data transmission. The component 199 may be configured to decode the at least one data transmission or the set of non-data service signals based on (1) the third configuration or (2) a decoded portion of the at least one data transmission. The component 199 may be within one or more processors of one or more of the CU 1910, DU 1930, and the RU 1940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 may include means for receiving a first configuration for receiving at least one data transmission during a time period. The network entity 1902 may include means for receiving a second configuration for receiving a set of non-data service signals during the time period. The network entity 1902 may include means for receiving a third configuration of a schedule associated with the first configuration and the second configuration. The network entity 1902 may include means for receiving the at least one data transmission. The network entity 1902 may include means for decoding the at least one data transmission or the set of non-data service signals based on the third configuration. The network entity 1902 may include means for decoding the at least one data transmission or the set of non-data service signals based on a decoded portion of the at least one data transmission. The at least one data transmission may include at least one of (a) a PSSCH message, (b) a PUSCH message, (c) a CG, or (d) a DG. The at least one data transmission may include at least one sidelink data transmission from at least one of a second UE, a PLC, or a network entity configured to communicate with the network entity 1902 via a sidelink interface. The set of non-data service signals may include at least one of (a) a set of positioning signals, (b) a set of ambient-power device signals, (d) a set of federated learning signals, or (c) a set of energy harvesting signals. A configured set of parameters associated with the at least one data transmission may include at least one of (a) an L1 priority parameter, (b) an L2 priority parameter. (c) a QoS parameter, or (d) a remaining PDB parameter. The network entity 1902 may include means for decoding the at least one data transmission or the set of non-data service signals by decoding the at least one data transmission and foregoing decoding the set of non-data service signals based on the third configuration indicating that a second UE is scheduled to transmit the at least one data transmission and not transmit the set of non-data service signals during the time period. The network entity 1902 may include means for decoding the at least one data transmission or the set of non-data service signals by decoding the set of non-data service signals and foregoing decoding the at least one data transmission based on the third configuration indicating that a second UE is scheduled to transmit the set of non-data service signals and not transmit the at least one data transmission during the time period. The network entity 1902 may include means for decoding the at least one data transmission or the set of non-data service signals by decoding the set of non-data service signals and decoding the at least one data transmission based on the third configuration indicating that a second UE is scheduled to transmit the set of non-data service signals and the at least one data transmission during the time period. The network entity 1902 may include means for decoding the at least one data transmission or the set of non-data service signals by decoding a portion of the at least one data transmission. The network entity 1902 may include means for decoding the at least one data transmission or the set of non-data service signals by calculating a priority metric associated with the at least one data transmission based on the decoded portion of the at least one data transmission. The network entity 1902 may include means for decoding the at least one data transmission or the set of non-data service signals by decoding the set of non-data service signals and foregoing decoding a second portion of the at least one data transmission based on the calculated priority metric. The network entity 1902 may include means for receiving a table from a network node including a set of configured thresholds. The network entity 1902 may include means for decoding the set of non-data service signals and foregoing decoding the second portion of the at least one data transmission based on the calculated priority metric by decoding the set of non-data service signals and foregoing decoding the second portion of the at least one data transmission in response to the calculated priority metric being less than or equal to at least one of the set of configured thresholds. The means may be the component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
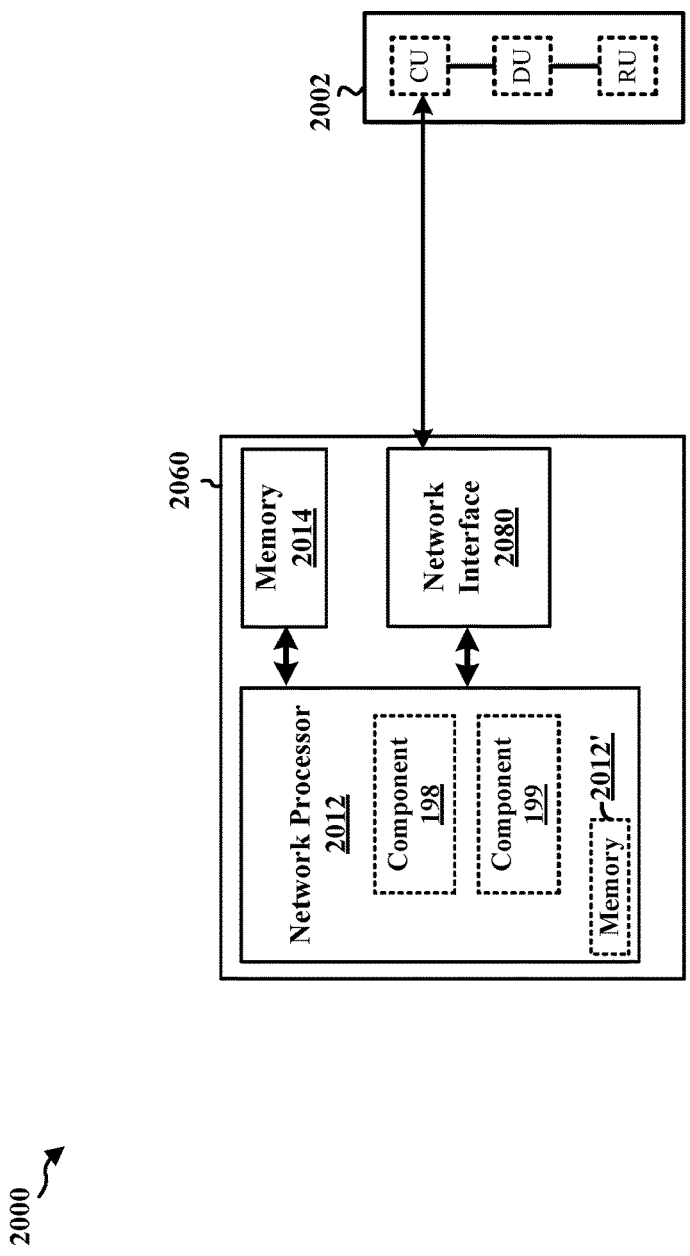
FIG. 20 is a diagram illustrating an example of a hardware implementation for an example network entity.

FIG. 20 is a diagram 2000 illustrating an example of a hardware implementation for a network entity 2060. In one example, the network entity 2060 may be within the core network 120. The network entity 2060 may include a network processor 2012. The network processor 2012 may include on-chip memory 2012'. In some aspects, the network entity 2060 may further include additional memory modules 2014. The network entity 2060 communicates via the network interface 2080 directly (e.g., backhaul link) or indirectly (e.g., through a RIC) with the CU 2002. The on-chip memory 2012' and the additional memory modules 2014 may each be considered a computer-readable medium/memory. Each computer-readable medium/memory may be non-transitory. The processor 2012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a first configuration for transmitting at least one data transmission during a time period. The component 198 may be configured to receive a second configuration for transmitting a set of non-data service signals during the time period. The component 198 may be configured to transmit the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission. The component 198 may be within the processor 2012. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2060 may include a variety of components configured for various functions. In one configuration, the network entity 2060 may include means for receiving a first configuration for transmitting at least one data transmission during a time period. The network entity 2060 may include means for receiving a second configuration for transmitting a set of non-data service signals during the time period. The network entity 2060 may include means for transmitting the at least one data transmission or the set of non-data service signals during the time period based on the first configuration. The network entity 2060 may include means for transmitting the at least one data transmission or the set of non-data service signals during the time period based on the second configuration. The network entity 2060 may include means for transmitting the at least one data transmission or the set of non-data service signals during the time period based on a minimum threshold gap associated with the set of non-data service signals. The network entity 2060 may include means for transmitting the at least one data transmission or the set of non-data service signals during the time period based on a set of parameters associated with the at least one data transmission. The at least one data transmission may include at least one of (a) a PSSCH message, (b) a PUSCH message, (c) a CG, or (d) a DG. The at least one data transmission may include at least one sidelink data transmission for a second UE, a programmable logic controller, or a network entity configured to communicate with the network entity 2060 via a sidelink interface. The set of non-data service signals may include at least one of (a) a set of positioning signals, (b) a set of RF sensing signals, (c) a set of ambient-power device signals, (d) a set of federated learning signals, or (e) a set of energy harvesting signals. The configured set of parameters may include at least one of (a) an L1 priority parameter, (b) an L2 priority parameter, (c) a QoS parameter, or (d) a remaining PDB parameter. The network entity 2060 may include means for transmitting the at least one data transmission or the set of non-data service signals during the time period by transmitting the at least one data transmission during the time period and foregoing transmitting the set of non-data service signals during the time period in response to a priority metric associated with the first configuration being greater or equal to at least one of the set of parameters. The network entity 2060 may include means for transmitting the at least one data transmission or the set of non-data service signals during the time period by transmitting the set of non-data service signals during the time period and foregoing transmitting the at least one data transmission during the time period in response to a priority metric associated with the first configuration being less than or equal to at least one of the set of parameters. The network entity 2060 may include means for transmitting the at least one data transmission or the set of non-data service signals during the time period by transmitting the at least one data transmission and the set of non-data service signals during the time period with a configured gap between the at least one data transmission and the set of non-data service signals. The configured gap may be greater or equal to the minimum threshold gap. The network entity 2060 may include means for tuning an RF resource associated with the set of non-data service signals during the configured gap. The network entity 2060 may include means for transmitting the at least one data transmission or the set of non-data service signals during the time period by transmitting the at least one data transmission or the set of non-data service signals during the time period further based on a first priority metric associated with the first configuration and a second priority metric associated with the second configuration. The network entity 2060 may include means for receiving a third configuration for transmitting a second set of non-data service signals during the time period. The network entity 2060 may include means for transmitting the set of non-data service signals or the second set of non-data service signals during the time period based on a first priority metric associated with the second configuration and a second priority metric associated with the third configuration. The network entity 2060 may include means for receiving the first configuration by receiving a DG to transmit the at least one data transmission during the time period. The network entity 2060 may include means for transmitting the at least one data transmission or the set of non-data service signals during the time period by foregoing transmitting the set of non-data service signals in response to receiving the DG to transmit the at least one data transmission during the time period. The network entity 2060 may include means for receiving the first configuration by receiving DCI including the DG and an indication to forego transmitting the set of non-data service signals during the time period. The network entity 2060 may include means for transmitting the at least one data transmission or the set of non-data service signals during the time period by foregoing transmitting the set of non-data service signals in response to receiving the indication to forego transmitting the set of non-data service signals. The network entity 2060 may include means for transmitting the at least one data transmission or the set of non-data service signals during the time period by transmitting the set of non-data service signals during the time period and foregoing transmitting the at least one data transmission during the time period. The network entity 2060 may include means for transmitting an indication that the network entity 2060 is unable to communicate with a wireless entity during the time period. The indication that the network entity 2060 is unable to communicate with the wireless entity may include at least one of: (a) a first indication that the network entity 2060 is unable to transmit any data transmissions during the time period, (b) a second indication that the network entity 2060 is unable to receive any data transmissions during the time period, (c) a third indication that the network entity 2060 is unable to transmit any other non-data service signals during the time period, or (d) a fourth indication that the network entity 2060 is unable to receive any other non-data service signals during the time period. The network entity 2060 may include means for transmitting the indication that the network entity 2060 is unable to communicate with the wireless entity during the time period by transmitting a broadcast message or a groupcast message including the indication that the network entity 2060 is unable to communicate with the wireless entity during the time period. The network entity 2060 may include means for transmitting a sidelink message to a second UE including a third configuration for transmitting the at least one data transmission or the set of non-data service signals during the time period. The third configuration may include a priority metric. The means may be the component 198 of the network entity 2060 configured to perform the functions recited by the means.

As discussed supra, the component 199 may be configured to receive a first configuration for receiving at least one data transmission during a time period. The component 199 may be configured to receive a second configuration for receiving a set of non-data service signals during the time period. The component 199 may be configured to receive (a) a third configuration of a schedule associated with the first configuration and the second configuration or (b) the at least one data transmission. The component 199 may be configured to decode the at least one data transmission or the set of non-data service signals based on (1) the third configuration or (2) a decoded portion of the at least one data transmission. The component 199 may be within the processor 2012. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2060 may include a variety of components configured for various functions. In one configuration, the network entity 2060 may include means for receiving a first configuration for receiving at least one data transmission during a time period. The network entity 2060 may include means for receiving a second configuration for receiving a set of non-data service signals during the time period. The network entity 2060 may include means for receiving a third configuration of a schedule associated with the first configuration and the second configuration. The network entity 2060 may include means for receiving the at least one data transmission. The network entity 2060 may include means for decoding the at least one data transmission or the set of non-data service signals based on the third configuration. The network entity 2060 may include means for decoding the at least one data transmission or the set of non-data service signals based on a decoded portion of the at least one data transmission. The at least one data transmission may include at least one of (a) a PSSCH message, (b) a PUSCH message, (c) a CG, or (d) a DG. The at least one data transmission may include at least one sidelink data transmission from at least one of a second UE, a PLC, or a network entity configured to communicate with the network entity 2060 via a sidelink interface. The set of non-data service signals may include at least one of (a) a set of positioning signals, (b) a set of ambient-power device signals, (d) a set of federated learning signals, or (e) a set of energy harvesting signals. A configured set of parameters associated with the at least one data transmission may include at least one of (a) an L1 priority parameter, (b) an L2 priority parameter, (c) a QoS parameter, or (d) a remaining PDB parameter. The network entity 2060 may include means for decoding the at least one data transmission or the set of non-data service signals by decoding the at least one data transmission and foregoing decoding the set of non-data service signals based on the third configuration indicating that a second UE is scheduled to transmit the at least one data transmission and not transmit the set of non-data service signals during the time period. The network entity 2060 may include means for decoding the at least one data transmission or the set of non-data service signals by decoding the set of non-data service signals and foregoing decoding the at least one data transmission based on the third configuration indicating that a second UE is scheduled to transmit the set of non-data service signals and not transmit the at least one data transmission during the time period. The network entity 2060 may include means for decoding the at least one data transmission or the set of non-data service signals by decoding the set of non-data service signals and decoding the at least one data transmission based on the third configuration indicating that a second UE is scheduled to transmit the set of non-data service signals and the at least one data transmission during the time period. The network entity 2060 may include means for decoding the at least one data transmission or the set of non-data service signals by decoding a portion of the at least one data transmission. The network entity 2060 may include means for decoding the at least one data transmission or the set of non-data service signals by calculating a priority metric associated with the at least one data transmission based on the decoded portion of the at least one data transmission. The network entity 2060 may include means for decoding the at least one data transmission or the set of non-data service signals by decoding the set of non-data service signals and foregoing decoding a second portion of the at least one data transmission based on the calculated priority metric. The network entity 2060 may include means for receiving a table from a network node including a set of configured thresholds. The network entity 2060 may include means for decoding the set of non-data service signals and foregoing decoding the second portion of the at least one data transmission based on the calculated priority metric by decoding the set of non-data service signals and foregoing decoding the second portion of the at least one data transmission in response to the calculated priority metric being less than or equal to at least one of the set of configured thresholds. The means may be the component 199 of the network entity 2060 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C." "one or more of A, B, or C." "at least one of A, B, and C." "one or more of A, B, and C." and "A, B, C. or any combination thereof" include any combination of A, B, and/or C, and may include multiples of A, multiples of B, or multiples of C. Specifically, combinations such as "at least one of A, B, or C." "one or more of A, B, or C," "at least one of A, B, and C." "one or more of A, B, and C." and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may output the data to a module or component of the device for processing the data. A device configured to "obtain" data, such as a transmission, signal, or message, may receive the data, for example with a transceiver, may obtain the data from a device that receives the data, or may obtain the data from a module or component of the device to process the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, wherein the method comprises receiving a first configuration for transmitting at least one data transmission during a time period. The method comprises receiving a second configuration for transmitting a set of non-data service signals during the time period. The method comprises transmitting the at least one data transmission or the set of non-data service signals during the time period based on (1) the first configuration, (2) the second configuration, and (3) at least one of (a) a minimum threshold gap associated with the set of non-data service signals or (b) a set of parameters associated with the at least one data transmission.

Aspect 2 is the method of aspect 1, wherein the at least one data transmission comprises at least one of (a) a physical sidelink shared channel (PSSCH) message, (b) a physical uplink shared channel (PUSCH) message, (c) a configured grant (CG), or (d) a dynamic grant (DG).

Aspect 3 is the method of either of aspects 1 or 2, wherein the at least one data transmission comprises at least one sidelink data transmission for a user equipment (UE), a programmable logic controller (PLC), or a network entity configured to communicate with the wireless device via a sidelink interface.

Aspect 4 is the method of any of aspects 1 to 3, wherein the set of non-data service signals comprises at least one of (a) a set of positioning signals, (b) a set of radio frequency (RF) sensing signals, (c) a set of ambient-power device signals, (d) a set of federated learning signals, or (e) a set of energy harvesting signals.

Aspect 5 is the method of any of aspects 1 to 4, wherein the configured set of parameters comprises at least one of (a) a layer 1 (L1) priority parameter, (b) a layer 2 (L2) priority parameter, (c) a quality of service (QOS) parameter, or (d) a remaining packet delay budget (PDB) parameter.

Aspect 6 is the method of any of aspects 1 to 5, wherein transmitting the at least one data transmission or the set of non-data service signals during the time period comprises transmitting the at least one data transmission during the time period and foregoing transmitting the set of non-data service signals during the time period in response to a priority metric associated with the first configuration being greater or equal to at least one of the set of parameters.

Aspect 7 is the method of any of aspects 1 to 6, wherein transmitting the at least one data transmission or the set of non-data service signals during the time period comprises transmitting the set of non-data service signals during the time period and foregoing transmitting the at least one data transmission during the time period in response to a priority metric associated with the first configuration being less than or equal to at least one of the set of parameters.

Aspect 8 is the method of any of aspects 1 to 7, wherein transmitting the at least one data transmission or the set of non-data service signals during the time period comprises transmitting the at least one data transmission and the set of non-data service signals during the time period with a configured gap between the at least one data transmission and the set of non-data service signals, wherein the configured gap is greater or equal to the minimum threshold gap.

Aspect 9 is the method of aspect 8, wherein the method comprises tuning a radio frequency (RF) resource associated with the set of non-data service signals during the configured gap.

Aspect 10 is the method of any of aspects 1 to 9, wherein transmitting the at least one data transmission or the set of non-data service signals during the time period comprises transmitting the at least one data transmission or the set of non-data service signals during the time period further based on a first priority metric associated with the first configuration and a second priority metric associated with the second configuration.

Aspect 11 is the method of any of aspects 1 to 10, wherein the method comprises receiving a third configuration for transmitting a second set of non-data service signals during the time period. The method comprises transmitting the set of non-data service signals or the second set of non-data service signals during the time period based on a first priority metric associated with the second configuration and a second priority metric associated with the third configuration.

Aspect 12 is the method of any of aspects 1 to 11, wherein receiving the first configuration comprises receiving a dynamic grant (DG) to transmit the at least one data transmission during the time period, wherein transmitting the at least one data transmission or the set of non-data service signals during the time period comprises foregoing transmitting the set of non-data service signals in response to receiving the DG to transmit the at least one data transmission during the time period.

Aspect 13 is the method of aspect 12, wherein receiving the first configuration comprises receiving downlink control information (DCI) including a first indication of the DG and a second indication to forego transmitting the set of non-data service signals during the time period, wherein transmitting the at least one data transmission or the set of non-data service signals during the time period comprises foregoing transmitting the set of non-data service signals in response to receiving the indication to forego transmitting the set of non-data service signals.

Aspect 14 is the method of any of aspects 1 to 13, wherein transmitting the at least one data transmission or the set of non-data service signals during the time period comprises transmitting the set of non-data service signals during the time period and foregoing transmitting the at least one data transmission during the time period. The method comprises transmitting an indication that the wireless device is unable to communicate with a wireless entity during the time period.

Aspect 15 is the method of aspect 14, wherein the indication that the wireless device is unable to communicate with the wireless entity comprises at least one of: (a) a first indication that the wireless device is unable to transmit any data transmissions during the time period, (b) a second indication that the wireless device is unable to receive any data transmissions during the time period. (c) a third indication that the wireless device is unable to transmit any other non-data service signals during the time period, or (d) a fourth indication that the wireless device is unable to receive any other non-data service signals during the time period.

Aspect 16 is the method of either of aspects 14 or 15, wherein transmitting the indication that the wireless device is unable to communicate with the wireless entity during the time period comprises transmitting a broadcast message or a groupcast message including the indication that the wireless device is unable to communicate with the wireless entity during the time period.

Aspect 17 is the method of any of aspects 1 to 16, wherein the method comprises transmitting a sidelink message to a UE including a third configuration for transmitting the at least one data transmission or the set of non-data service signals during the time period.

Aspect 18 is the method of aspect 17, wherein the third configuration comprises a priority metric.

Aspect 19 is a method of wireless communication at a wireless device, wherein the method comprises receiving a first configuration for receiving at least one data transmission during a time period. The method comprises receiving a second configuration for receiving a set of non-data service signals during the time period. The method comprises receiving (a) a third configuration of a schedule associated with the first configuration and the second configuration or (b) the at least one data transmission. The method comprises decoding the at least one data transmission or the set of non-data service signals based on (1) the third configuration or (2) a decoded portion of the at least one data transmission.

Aspect 20 is the method of aspect 19, wherein the at least one data transmission comprises at least one of (a) a physical sidelink shared channel (PSSCH) message, (b) a physical downlink shared channel (PDSCH) message, (c) a configured grant (CG), or (d) a dynamic grant (DG).

Aspect 21 is the method of either of aspects 19 or 20, wherein the at least one data transmission comprises at least one sidelink data transmission from at least one of a user equipment (UE), a programmable logic controller (PLC), or a network entity configured to communicate with the wireless device via a sidelink interface.

Aspect 22 is the method of any of aspects 19 to 21, wherein the set of non-data service signals comprises at least one of (a) a set of positioning signals, (b) a set of ambient-power device signals, (d) a set of federated learning signals, or (e) a set of energy harvesting signals.

Aspect 23 is the method of any of aspects 19 to 22, wherein a configured set of parameters associated with the at least one data transmission comprises at least one of (a) an layer 1 (L1) priority parameter, (b) an layer 2 (L2) priority parameter, (c) a quality of service (QOS) parameter, or (d) a remaining packet delay budget (PDB) parameter.

Aspect 24 is the method of any of aspects 19 to 23, wherein decoding the at least one data transmission or the set of non-data service signals comprises decoding the at least one data transmission and foregoing decoding the set of non-data service signals based on the third configuration indicating that a UE is scheduled to transmit the at least one data transmission and not transmit the set of non-data service signals during the time period.

Aspect 25 is the method of any of aspects 19 to 24, wherein decoding the at least one data transmission or the set of non-data service signals comprises decoding the set of non-data service signals and foregoing decoding the at least one data transmission based on the third configuration indicating that a UE is scheduled to transmit the set of non-data service signals and not transmit the at least one data transmission during the time period.

Aspect 26 is the method of any of aspects 19 to 25, wherein decoding the at least one data transmission or the set of non-data service signals comprises decoding the set of non-data service signals and decoding the at least one data transmission based on the third configuration indicating that a UE is scheduled to transmit the set of non-data service signals and the at least one data transmission during the time period.

Aspect 27 is the method of any of aspects 19 to 26, wherein decoding the at least one data transmission or the set of non-data service signals comprises decoding a portion of the at least one data transmission, calculating a priority metric associated with the at least one data transmission based on the decoded portion of the at least one data transmission, and decoding the set of non-data service signals and foregoing decoding a second portion of the at least one data transmission based on the calculated priority metric.

Aspect 28 is the method of any of aspects 19 to 27, wherein the method comprises receiving a table from a network node including a set of configured thresholds. Decoding the set of non-data service signals and foregoing decoding the second portion of the at least one data transmission based on the calculated priority metric comprises decoding the set of non-data service signals and foregoing decoding the second portion of the at least one data transmission in response to the calculated priority metric being less than or equal to at least one of the set of configured thresholds.

Aspect 29 is an apparatus for wireless communication, including: a memory; and at least one processor coupled to the memory and, based at least in part on information stored in the memory, the at least one processor is configured to implement any of aspects 1 to 28.

Aspect 30 is the apparatus of aspect 29, further including at least one of an antenna or a transceiver coupled to the at least one processor.

Aspect 31 is an apparatus for wireless communication including means for implementing any of aspects 1 to 28.

Aspect 32 is a computer-readable medium (e.g., a non-transitory computer-readable medium) storing computer executable code, wherein the code, when executed by a processor, causes the processor to implement any of aspects 1 to 28.

What is claimed is:

1. An apparatus for wireless communication at a wireless device, comprising:
 memory; and
 at least one processor coupled to the memory and, based at least in part on information stored in the memory, the at least one processor is configured to:
  receive, from a second wireless device, a first configuration for transmitting a set of data transmissions;
  receive, from the second wireless device, a second configuration for transmitting a set of non-data service signals, wherein the set of data transmissions and the set of non-data service signals overlap during a time period; and
  transmit the set of data transmissions or the set of non-data service signals during the overlapping time period based on (1) the first configuration, (2) the second configuration, and (3) at least one of (a) a minimum threshold gap associated with the set of non-data service signals or (b) a set of parameters associated with the at set of data transmissions.

2. The apparatus of claim 1, wherein the set of data transmissions comprises at least one of:
 a physical sidelink shared channel (PSSCH) message;
 a physical uplink shared channel (PUSCH) message;
 a configured grant (CG); or
 a dynamic grant (DG).

3. The apparatus of claim 1, wherein the set of data transmissions comprises at least one sidelink data transmission for a user equipment (UE), a programable logic controller (PLC), or a network entity configured to communicate with the wireless device via a sidelink interface.

4. The apparatus of claim 1, wherein the set of non-data service signals comprises at least one of:
 a set of positioning signals;
 a set of radio frequency (RF) sensing signals;
 a set of ambient-power device signals;
 a set of federated learning signals; or
 a set of energy harvesting signals.

5. The apparatus of claim 1, wherein the set of parameters comprises at least one of:
 a layer 1 (L1) priority parameter;
 a layer 2 (L2) priority parameter;
 a quality of service (QOS) parameter; or
 a remaining packet delay budget (PDB) parameter.

6. The apparatus of claim 1, wherein, to transmit the set of data transmissions or the set of non-data service signals during the overlapping time period, the at least one processor is configured to:
 transmit the set of data transmissions during the overlapping time period and forego transmitting the set of non-data service signals during the overlapping time period in response to a priority metric associated with the first configuration being greater or equal to at least one of the set of parameters.

7. The apparatus of claim 1, wherein, to transmit the set of data transmissions or the set of non-data service signals during the overlapping time period, the at least one processor is configured to:
 transmit the set of non-data service signals during the overlapping time period and forego transmitting the set of data transmissions during the overlapping time period in response to a priority metric associated with the first configuration being less than or equal to at least one of the set of parameters.

8. The apparatus of claim 1, wherein, to transmit the set of data transmissions or the set of non-data service signals during the overlapping time period, the at least one processor is configured to:
 transmit the set of data transmissions and the set of non-data service signals during the overlapping time period with a configured gap between the set of data transmissions and the set of non-data service signals, wherein the configured gap is greater or equal to the minimum threshold gap.

9. The apparatus of claim 8, the at least one processor is further configured to:
 tune a radio frequency (RF) resource associated with the set of non-data service signals during the configured gap.

10. The apparatus of claim 1, wherein, to transmit the set of data transmissions or the set of non-data service signals during the overlapping time period, the at least one processor is configured to:
 transmit the set of data transmissions or the set of non-data service signals during the overlapping time period further based on a first priority metric associated with the first configuration and a second priority metric associated with the second configuration.

11. The apparatus of claim 1, the at least one processor is further configured to:
 receive a third configuration for transmitting a second set of non-data service signals, wherein the set of data transmissions, the set of non-data service signals, and the second set of non-data service signals overlap during the overlapping time period; and
 transmit the set of non-data service signals or the second set of non-data service signals during the overlapping time period based on a first priority metric associated with the second configuration and a second priority metric associated with the third configuration.

12. The apparatus of claim 1, wherein, to receive the first configuration, the at least one processor is configured to:
 receive a dynamic grant (DG) to transmit the set of data transmissions during the overlapping time period, wherein, to transmit the set of data transmissions or the set of non-data service signals during the overlapping time period, wherein the at least one processor is configured to:
  forego transmitting the set of non-data service signals in response to a reception of the DG to transmit the set of data transmissions during the overlapping time period.

13. The apparatus of claim 12, wherein, to receive the first configuration, the at least one processor is further configured to:
 receive downlink control information (DCI) comprising a first indication of the DG and a second indication to forego transmitting the set of non-data service signals during the overlapping time period, wherein, to transmit the set of data transmissions or the set of non-data service signals during the overlapping time period, the at least one processor is configured to:
  forego transmitting the set of non-data service signals in response to receiving the second indication to forego transmitting the set of non-data service signals.

14. The apparatus of claim 1, wherein, to transmit the set of data transmissions or the set of non-data service signals during the overlapping time period, the at least one processor is configured to:
 transmit the set of non-data service signals during the overlapping time period; and
 forego transmitting the set of data transmissions during the overlapping time period, wherein the at least one processor is further configured to:
  transmit an indication that the wireless device is unable to communicate with a wireless entity during the overlapping time period.

15. The apparatus of claim 14, wherein the indication that the wireless device is unable to communicate with the wireless entity comprises at least one of:
 a first indication that the wireless device is unable to transmit any data transmissions during the overlapping time period;
 a second indication that the wireless device is unable to receive any data transmissions during the overlapping time period;
 a third indication that the wireless device is unable to transmit any other non-data service signals during the overlapping time period; or
 a fourth indication that the wireless device is unable to receive any other non-data service signals during the overlapping time period.

16. The apparatus of claim 14, wherein, to transmit the indication that the wireless device is unable to communicate with the wireless entity during the overlapping time period, the at least one processor is configured to:
transmit a broadcast message or a groupcast message comprising the indication that the wireless device is unable to communicate with the wireless entity during the overlapping time period.

17. The apparatus of claim 1, further comprising a transceiver coupled to the at least one processor, wherein the at least one processor is further configured to:
transmit, via the transceiver, a sidelink message to a UE comprising a third configuration for transmitting the set of data transmissions or the set of non-data service signals during the overlapping time period.

18. The apparatus of claim 17, wherein the third configuration comprises a priority metric.

19. An apparatus for wireless communication at a wireless device, comprising:
memory; and
at least one processor coupled to the memory and, based at least in part on information stored in the memory, the at least one processor is configured to:
receive a first configuration for receiving a set of data transmissions;
receive a second configuration for receiving a set of non-data service signals, wherein the set of data transmissions and the set of non-data service signals overlap during a time period;
receive (a) a third configuration of a schedule associated with the first configuration and the second configuration or (b) the set of data transmissions; and
decode the set of data transmissions or process the set of non-data service signals based on (1) the third configuration or (2) a decoded portion of the set of data transmissions.

20. The apparatus of claim 19, wherein the set of data transmissions comprises at least one of:
a physical sidelink shared channel (PSSCH) message;
a physical downlink shared channel (PDSCH) message;
a configured grant (CG); or
a dynamic grant (DG).

21. The apparatus of claim 19, wherein the set of data transmissions comprises at least one sidelink data transmission from at least one of a user equipment (UE), a programmable logic controller (PLC), or a network entity configured to communicate with the wireless device via a sidelink interface.

22. The apparatus of claim 19, wherein the set of non-data service signals comprises at least one of:
a set of positioning signals;
a set of ambient-power device signals; or
a set of federated learning signals.

23. The apparatus of claim 19, wherein a set of parameters associated with the set of data transmissions comprises at least one of:
a layer 1 (L1) priority parameter;
a layer 2 (L2) priority parameter;
a quality of service (QOS) parameter; or
a remaining packet delay budget (PDB) parameter.

24. The apparatus of claim 19, wherein, to decode the set of data transmissions or the set of non-data service signals, the at least one processor is configured to:
decode the set of data transmissions and forego processing the set of non-data service signals based on the third configuration indicating that a UE is scheduled to transmit the set of data transmissions and not transmit the set of non-data service signals during the overlapping time period.

25. The apparatus of claim 19, wherein, to decode the set of data transmissions or the set of non-data service signals, the at least one processor is configured to:
process the set of non-data service signals and forego decoding the set of data transmissions based on the third configuration indicating that a UE is scheduled to transmit the set of non-data service signals and not transmit the set of data transmissions during the overlapping time period.

26. The apparatus of claim 19, wherein, to decode the set of data transmissions or the set of non-data service signals, the at least one processor is configured to:
process the set of non-data service signals and decode the set of data transmissions based on the third configuration indicating that a UE is scheduled to transmit the set of non-data service signals and the set of data transmissions during the overlapping time period.

27. The apparatus of claim 19, wherein, to decode the set of data transmissions or the set of non-data service signals, the at least one processor is configured to:
decode a portion of the set of data transmissions;
calculate a priority metric associated with the set of data transmissions based on the decoded portion of the set of data transmissions; and
process the set of non-data service signals and forego decoding a second portion of the set of data transmissions based on the calculated priority metric.

28. The apparatus of claim 27, further comprising a transceiver, the at least one processor is further configured to:
receive, via the transceiver, a table from a network node comprising a set of configured thresholds, wherein, to process the set of non-data service signals and forego decoding the second portion of the set of data transmissions based on the calculated priority metric, the at least one processor is configured to:
process the set of non-data service signals and forego decoding the second portion of the set of data transmissions in response to the calculated priority metric being less than or equal to at least one of the set of configured thresholds.

29. A method of wireless communication at a wireless device, comprising:
receiving, from a second wireless device, a first configuration for transmitting a set of data transmissions;
receiving, from the second wireless device, a second configuration for transmitting a set of non-data service signals, wherein the set of data transmissions and the set of non-data service signals overlap during a time period; and
transmitting the set of data transmissions or the set of non-data service signals during the overlapping time period based on (1) the first configuration, (2) the second configuration, and (3) at least one of (a) a minimum threshold gap associated with the set of non-data service signals or (b) a set of parameters associated with the set of data transmissions.

30. A method of wireless communication at a wireless device, comprising:
receiving a first configuration for receiving a set of data transmissions;

receiving a second configuration for receiving a set of non-data service signals, wherein the set of data transmissions and the set of non-data service signals overlap during a time period;

receiving (a) a third configuration of a schedule associated with the first configuration and the second configuration or (b) the set of data transmissions; and decoding the set of data transmissions or processing the set of non-data service signals based on (1) the third configuration or (2) a decoded portion of the set of data transmissions.

\* \* \* \* \*